(12) United States Patent
Jin et al.

(10) Patent No.: US 12,513,608 B2
(45) Date of Patent: Dec. 30, 2025

(54) HANDOVER METHOD AND APPARATUS

(71) Applicant: HUAWEI TECHNOLOGIES CO., LTD., Shenzhen (CN)

(72) Inventors: Yinghao Jin, Boulogne Billancourt (FR); Haibin Yu, Shenzhen (CN); Chenchen Yang, Ottawa (CA); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 861 days.

(21) Appl. No.: 17/583,752

(22) Filed: Jan. 25, 2022

(65) Prior Publication Data
US 2022/0150783 A1 May 12, 2022

Related U.S. Application Data

(63) Continuation of application No. PCT/CN2020/102985, filed on Jul. 20, 2020.

(30) Foreign Application Priority Data

Jul. 25, 2019 (CN) .......................... 201910677802.9

(51) Int. Cl.
*H04W 48/18* (2009.01)
*H04W 36/00* (2009.01)
(Continued)

(52) U.S. Cl.
CPC .......... *H04W 48/18* (2013.01); *H04W 36/13* (2023.05); *H04W 36/00222* (2023.05); *H04W 36/087* (2023.05); *H04W 84/042* (2013.01)

(58) Field of Classification Search
CPC ............. H04W 36/13; H04W 48/18; H04W 36/00222; H04W 36/087; H04W 84/042;
(Continued)

(56) References Cited

U.S. PATENT DOCUMENTS

2019/0053104 A1* 2/2019 Qiao ..................... H04W 28/24
2019/0053148 A1* 2/2019 Lee et al. .............. H04W 48/18
(Continued)

FOREIGN PATENT DOCUMENTS

CN      106851589 A      6/2017
CN      108696910 A     10/2018
(Continued)

OTHER PUBLICATIONS

Electronic English translation for WO 2018/228480, date published Dec. 20, 2018 (Year: 2018).*
(Continued)

*Primary Examiner* — Marisol Figueroa
(74) *Attorney, Agent, or Firm* — HAUPTMAN HAM, LLP

(57) ABSTRACT

A handover method includes receiving a handover requirement message from a source access network device, and sending a handover request message to the target access network device. The handover requirement message includes an identifier of a session of a terminal device. The session is to be handed over from the source access network device to a target access network device. The handover request message includes first single network slice selection assistance information (S-NSSAI). A first network slice of the target access network device that corresponds to the first S-NSSAI serves the session. The first S-NSSAI is determined based on second S-NSSAI and the first network slice supported by the target access network device, and the second S-NSSAI is of a second network slice of the source access network device and that corresponds to the identifier of the session.

15 Claims, 10 Drawing Sheets

(51) Int. Cl.
*H04W 36/08* (2009.01)
*H04W 84/04* (2009.01)

(58) Field of Classification Search
CPC ....... H04W 36/00837; H04W 36/0061; H04W 36/04
See application file for complete search history.

(56) References Cited

U.S. PATENT DOCUMENTS

| | | | |
|---|---|---|---|
| 2019/0306761 A1 | 10/2019 | Jin et al. | |
| 2020/0059817 A1* | 2/2020 | Baek | H04W 28/0273 |
| 2020/0314701 A1* | 10/2020 | Talebi Fard | H04W 36/0016 |

FOREIGN PATENT DOCUMENTS

| | | | | |
|---|---|---|---|---|
| CN | 108924884 A | 11/2018 | | |
| CN | 109151924 A | 1/2019 | | |
| CN | 109804671 A | 5/2019 | | |
| CN | 110035461 A | 7/2019 | | |
| WO | 2018171904 A1 | 9/2018 | | |
| WO | WO-2018194971 A1 * | 10/2018 | ............ | H04W 12/06 |
| WO | WO-2018228480 A1 * | 12/2018 | ............ | H04W 24/10 |
| WO | 2019029674 A1 | 2/2019 | | |
| WO | 2019137471 A1 | 7/2019 | | |

OTHER PUBLICATIONS

Huawei: "Further Discussion on Slice Re-mapping", 3GPP DraftR3-171251, Apr. 3, 2017, total 7 pages. ;

Chinese Office Action issued in corresponding Chinese Application No. 201910677802.9, dated Jan. 29, 2022, pp. 1-26.
ZTE, NW Slice Availability Handling Approaches during Mobility. 3GPP TSG RAN WG3 Meeting #95bis, Spokane, USA, Apr. 3-7, 2017, R3-171029, 6 pages.
Huawei, HiSilicon, Ericsson, OI#4h: TS 23.501: Selection of a Target AMF supporting the Network Slices due to UE mobility. SA WG2 Meeting #124, Nov. 27-Dec. 1, 2017, Reno, Nevada, USA , S2-179431, 4 pages.
Ericsson, Slice re-mapping or removal during mobility. 3GPP TSG-RAN WG3 #95bis, Spokane WA, USA, Apr. 3-7, 2017, R3-171143, 5 pages.
ZTE, Selection RAN Part Network Slice during UE mobility . 3GPP TSG RAN WG3 NR-adhoc, Spokane, USA, Jan. 17-19, 2017, R3-170065, 7 pages.
LG Electronics Inc., Xn-based handover across registration areas. 3GPP TSG-RAN WG3 Meeting #97bis, Prague, Czech Republic, Oct. 9-13, 2017, R3-173873, 6 pages.
International Search Report issued in corresponding International Application No. PCT/CN2020/102985, dated Oct. 28, 2020, pp. 1-10.
Chinese Office Action issued in corresponding Chinese Application No. 201910677802.9, dated May 18, 2021, pp. 1-11.
Chinese Office Action issued in corresponding Chinese Application No. 201910677802.9, dated Sep. 15, 2021, pp. 1-9.
Extended European Search Report issued in corresponding European Application No. 20845004.9, dated Jul. 28, 2022, pp. 1-16.

* cited by examiner

HANDOVER METHOD AND APPARATUS

CROSS-REFERENCE TO RELATED APPLICATIONS

This application is a continuation of International Application No. PCT/CN2020/102985, filed on Jul. 20, 2020, which claims priority to Chinese Patent Application No. 201910677802.9, filed on Jul. 25, 2019, the disclosures of the aforementioned applications are hereby incorporated by reference in their entireties.

TECHNICAL FIELD

This application relates to the communication field, and more specifically, to a handover method and apparatus.

BACKGROUND

To meet requirements of future vertical industries, a concept of a non-public network (NPN), that is, an NPN of a vertical industry, is proposed, and the NPN is specially used to serve a terminal device of the vertical industry. The NPN has two network architectures. One network architecture is standalone (SA) networking, and the other network architecture is non-standalone (NSA) networking. When a session is handed over between an NPN cell and a PLMN cell, improving session continuity becomes an urgent problem to be resolved.

SUMMARY

This application provides a handover method and apparatus, to improve session continuity.

According to a first aspect, a handover method is provided, and includes: A core network device receives a handover requirement message sent by a source access network device, where the handover requirement message includes an identifier of a session, and the session is a session that is of a terminal device and that needs to be handed over from the source access network device to a target access network device; and the core network device sends a handover request message to the target access network device, where the handover request message includes first single network slice selection assistance information S-NSSAI, the first S-NSSAI is determined based on second S-NSSAI and a network slice supported by the target access network device, a network slice that is in the target access network device and that corresponds to the first S-NSSAI serves the session, and the second S-NSSAI is S-NSSAI corresponding to the identifier of the session in the source access network device.

According to the handover method provided in at least this embodiment of this application, after receiving the handover requirement message sent by the source access network device, the core network device learns that the session is to be handed over from the source access network device to the target access network device, and that a network slice in the target access network device serves the session. The core network device notifies the target access network device of the first S-NSSAI of the network slice that can serve the session, so that when the session is handed over to the target access network device, the network slice corresponding to the first S-NSSAI can provide the service, to improve session continuity.

In at least this embodiment of this application, when the terminal device is handed over between an NPN cell in an NSA architecture and a PLMN cell, the first S-NSSAI, different from the second S-NSSAI, of the network slice that is in the source access network device and that serves the session is determined in the target access network device. The network slice corresponding to the first S-NSSAI serves the session when the session is handed over from the source access network device to the target access network device, to improve session continuity.

It should be understood that, in at least this embodiment of this application, the core network device includes a core network control plane device, which may be an access and mobility management function (AMF) in a core network or another apparatus that can implement a function of the AMF in at least this embodiment.

It should be further understood that, in at least this embodiment of this application, the source access network device refers to an access network device that serves the terminal device, and the target access network device refers to an access network device to which the terminal device is to be handed over from the source access network device. The source access network device and the target access network device are named only from a perspective of the terminal device, and do not constitute any limitation on the protection scope of this application. For example, the source access network device may be referred to as a first access network device, and the target access network device may be referred to as a second access network device.

It should be further understood that, in at least this embodiment of this application, the network slice supported by the target access network device includes a network slice that serves a session in a cell of the source access network device.

The first S-NSSAI and the second S-NSSAI are different S-NSSAI, and are used to identify different network slices. "First", "second", and various numbers in the embodiments of this application are merely used for differentiation for ease of description, and are not used to limit the scope of the embodiments of this application, for example, for differentiation between different S-NSSAI.

It should be further understood that a name of signaling is not limited in at least this embodiment of this application. For example, the handover requirement message and the handover request message are merely names of signaling, and may also have other names, for example, a first message and a second message.

It should be further understood that, in at least this embodiment of this application, the session that is of the terminal device and that needs to be handed over from the source access network device to the target access network device is used as an example for description. A handover procedure of another session that needs to be handed over is similar to that of the foregoing session. Details are not described herein again.

With reference to the first aspect, in some embodiments of the first aspect, the handover requirement message further includes a target identifier, and the method further includes: The core network device determines the target access network device based on the target identifier; and the core network device determines the first S-NSSAI based on the second S-NSSAI and a mapping relationship, where the mapping relationship is a correspondence between S-NSSAI of a network slice in the source access network device and S-NSSAI of a network slice in the target access network device; or the core network device determines the first S-NSSAI, where the network slice that is in the target access network device and that corresponds to the first S-NSSAI serves all sessions that need to be handed over from the source access network device to the target access network device.

According to the handover method provided in at least this embodiment of this application, the core network device can determine the target access network device based on the target identifier included in the handover requirement message, and further determine the first S-NSSAI based on the second S-NSSAI and the mapping relationship. The mapping relationship is the correspondence between the S-NSSAI of the network slices in the source access network device and in the target access network device. In other words, the core network device can determine the first S-NSSAI of the network slice in the target access network device when knowing the mapping relationship and the second S-NSSAI of the network slice in the source access network device.

Alternatively, the core network device can directly determine the first S-NSSAI without based on the second S-NSSAI and the mapping relationship. For example, S-NSSAI of a network slice that is in the target access network device and that serves all the sessions that need to be handed over from the source access network device to the target access network device is the first S-NSSAI. In this case, the core network device can learn, by only receiving the handover requirement message from the source access network device, that the session that is of the terminal device and that is to be handed over from the source access network device to the target access network device is to be served by the network slice whose S-NSSAI in the target access network device is the first S-NSSAI. This provides a flexible solution for the core network device to determine the first S-NSSAI.

It should be understood that the target identifier may be an identifier of the target access network device, for example, the target identifier is a global network device identifier of the target access network device. Alternatively, the target identifier may be a cell identifier, for example, the target identifier is an identifier of a cell to which the terminal device is to be handed over. The target access network device can also be determined based on the cell identifier.

With reference to the first aspect, in some embodiments of the first aspect, before the core network device determines the first S-NSSAI based on the second S-NSSAI and the mapping relationship, the method further includes: The core network device receives the handover requirement message sent by the source access network device, where the handover requirement message includes the second S-NSSAI; or the core network device determines the second S-NSSAI based on the identifier of the session.

According to the handover method provided in at least this embodiment of this application, the core network device may learn of the second S-NSSAI because the handover requirement message sent by the source access network device includes the second S-NSSAI. Alternatively, the handover requirement message does not include the second S-NSSAI but includes the identifier of the session, and the core network device determines the second S-NSSAI based on the identifier of the session included in the handover requirement message and a correspondence between the identifier of the session and the S-NSSAI of the network slice in the source access network device. This provides a flexible solution for the core network device to learn of the second S-NSSAI.

With reference to the first aspect, in some embodiments of the first aspect, the method further includes: The core network device sends the identifier of the session to a network slice selection device, where the identifier of the session is used to indicate the network slice selection device to determine the second S-NSSAI; and the core network device receives the first S-NSSAI sent by the network slice selection device, where the first S-NSSAI is determined by the network slice selection device based on the second S-NSSAI.

According to the handover method provided in at least this embodiment of this application, the core network device can learn of the first S-NSSAI by receiving the first S-NSSAI from the network slice selection device. Specifically, the core network device may send the identifier of the session to the network slice selection device, and the network slice selection device determines the second S-NSSAI based on the correspondence between the identifier of the session and the S-NSSAI of the network slice in the source access network device, determines the first S-NSSAI based on the second S-NSSAI, and sends the determined first S-NSSAI to the core network device. This provides a flexible solution for the core network device to learn of the first S-NSSAI.

It should be understood that, in at least this embodiment of this application, the network slice selection device may be a network slice selection function (NSSF) in the core network, or another apparatus that can implement a function of the NSSF in at least this embodiment.

It should be further understood that, in at least this embodiment of this application, that the network slice selection device can determine the first S-NSSAI based on the second S-NSSAI may be similar to that the core network device determines the first S-NSSAI based on the second S-NSSAI. For example, the network slice selection device determines the first S-NSSAI based on the second S-NSSAI and the foregoing mapping relationship. Alternatively, the network slice selection device already knows that there is only one network slice that is in the target access network device and that can serve the session that needs to be handed over from the source access network device to the target access network device, and S-NSSAI of the network slice is the first S-NSSAI.

With reference to the first aspect, in some embodiments of the first aspect, the handover method further includes: The core network device determines the second S-NSSAI based on the identifier of the session; the core network device sends the second S-NSSAI to a network slice selection device; and the core network device receives the first S-NSSAI sent by the network slice selection device.

According to the handover method provided in at least this embodiment of this application, the core network device can learn of the first S-NSSAI by receiving the first S-NSSAI from the network slice selection device. Specifically, the core network device may determine the second S-NSSAI based on the identifier of the session, and send the second S-NSSAI to the network slice selection device. The network slice selection device determines the first S-NSSAI based on the second S-NSSAI, and sends the determined first S-NSSAI to the core network device. This provides a flexible solution for the core network device to learn of the first S-NSSAI.

With reference to the first aspect, in some embodiments of the first aspect, the method further includes: The core network device receives an interface setup request message sent by the target access network device, where the interface setup request message includes the first S-NSSAI, and the network slice that is in the target access network device and that corresponds to the first S-NSSAI serves all the sessions that need to be handed over from the source access network device to the target access network device; or the interface setup request message includes the mapping relationship and the S-NSSAI of the network slice in the target access network device, where the mapping relationship is the correspondence between the S-NSSAI of the network slice in the source access network device and the S-NSSAI of the network slice in the target access network device.

According to the handover method provided in at least this embodiment of this application, the core network device may receive the interface setup request message sent by the target access network device, so that the core network device can learn that the target access network device has the first S-NSSAI of the network slice that serves the session that needs to be handed over from the source access network device to the target access network device, or the core network device can learn of the foregoing mapping relationship and S-NSSAI of a plurality of network slices, in the target access network device, serving sessions that need to be handed over from the source access network device to the target access network device. This provides a feasible solution for the core network device to learn of the first S-NSSAI, or to learn of the mapping relationship and the S-NSSAI of the plurality of network slices in the target access network device.

With reference to the first aspect, in some embodiments of the first aspect, the method further includes: The core network device determines the first S-NSSAI based on a preset policy, where the network slice that is in the target access network device and that corresponds to the first S-NSSAI serves all the sessions that need to be handed over from the source access network device to the target access network device; or the core network device determines the mapping relationship and the S-NSSAI of the network slice in the target access network device based on a preset policy, where the mapping relationship is the correspondence between the S-NSSAI of the network slice in the source access network device and the S-NSSAI of the network slice in the target access network device.

According to the handover method provided in at least this embodiment of this application, the core network device can learn, based on the preset policy, that the target access network device has the first S-NSSAI of the network slice that serves the session that needs to be handed over from the source access network device to the target access network device, or the core network device can learn of, based on the preset policy, the foregoing mapping relationship and S-NSSAI of a plurality of network slices, in the target access network device, serving sessions that need to be handed over from the source access network device to the target access network device. This provides a feasible solution for the core network device to learn of the first S-NSSAI, or to learn of the mapping relationship and the S-NSSAI of the plurality of network slices in the target access network device.

It should be understood that the preset policy in at least this embodiment of this application may be specified by an operator.

With reference to the first aspect, in some embodiments of the first aspect, the method further includes: The core network device sends an interface setup response message to the target access network device, where the interface setup request message includes the first S-NSSAI, or the interface setup response message includes the mapping relationship and the S-NSSAI of the network slice in the target access network device.

According to the handover method provided in at least this embodiment of this application, after determining the first S-NSSAI or determining the mapping relationship and the S-NSSAI of the plurality of network slices in the target access network device based on the preset policy, the core network device may send the information to the target access network device by using the interface setup response message.

With reference to the first aspect, in some embodiments of the first aspect, before the terminal device is handed over from the source access network device to the target access network device, the method further includes: The terminal device hands over from the target access network device to the source access network device. The handover requirement message further includes third S-NSSAI, and the third S-NSSAI is S-NSSAI of a network slice that is in the target access network device and that serves the session when the session is handed over from the target access network device to the source access network device.

According to the handover method provided in at least this embodiment of this application, before the terminal device currently needs to be handed over from the source access network device to the target access network device, if the terminal device was handed over from the target access network device to the source access network device, in the process in which the terminal device was handed over from the target access network device to the source access network device, the S-NSSAI of the network slice that is in the target access network device and that serves the session is the third S-NSSAI. In this case, in a process in which the terminal device currently needs to be handed over from the source access network device to the target access network device, the source access network device may include the third S-NSSAI in the handover requirement message. In this way, the core network device can directly determine that the network slice corresponding to the third S-NSSAI serves the session.

It should be understood that the third S-NSSAI may be the first S-NSSAI.

With reference to the first aspect, in some embodiments of the first aspect, the handover requirement message further includes first indication information, and the first indication information is used to indicate a type of the handover of the terminal device from the source access network device to the target access network device.

According to the handover method provided in at least this embodiment of this application, the handover requirement message may include the first indication information indicating the handover type, so that the core network device can learn of a handover type of current handover between cells.

For example, the handover type may be handover from a non-standalone NSA non-public network NPN to a land public mobile network PLMN, or the handover type may be handover from a PLMN to an NSA NPN.

With reference to the first aspect, in some embodiments of the first aspect, the handover request message further includes the second S-NSSAI.

According to the handover method provided in at least this embodiment of this application, the core network device may include, in the handover request message, the second S-NSSAI of the network slice that is in the source access network device and that serves the session, and notify the target access network device of the handover request message, so that the target access network device can learn of the second S-NSSAI.

Optionally, when the target access network device already learns of the second S-NSSAI, after the terminal device is handed over to the target access network device and then is handed over from the target access network device to the source access network device, the target access network device may notify the core network device of the second S-NSSAI.

With reference to the first aspect, in some embodiments of the first aspect, the handover request message further includes second indication information, and the second indication information is used to indicate that the handover request is from the source access network device.

According to the handover method provided in at least this embodiment of this application, the core network device may include, in the handover request message, the second indication information indicating that the handover request is from the source access network device, and notify the target access network device of the handover request message, so that the target access network device learns that the handover request is from the source access network device.

With reference to the first aspect, in some embodiments of the first aspect, the source access network device supports a non-standalone NSA non-public network NPN, and the target access network device supports a land public mobile network PLMN; or the target access network device supports an NSA NPN, and the source access network device supports a PLMN.

According to the handover method provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

For example, if the source access network device supports an NSA NPN and a PLMN, and the target access network device supports only a PLMN, in at least this embodiment of this application, the terminal device is handed over from an NSA NPN cell of the source access network device to a PLMN cell of the target access network device.

According to a second aspect, a handover method is provided, and includes: A source access network device sends a handover requirement message to a core network device, where the handover requirement message includes an identifier of a session, the session is a session that is of a terminal device and that needs to be handed over from the source access network device to a target access network device, and second single network slice selection assistance information S-NSSAI corresponding to the identifier of the session is S-NSSAI of a network slice that is in the source access network device and that serves the session; and the source access network device receives a handover command message sent by the core network device, where the handover command message is used to indicate the terminal device to be handed over from the source access network device to the target access network device, and S-NSSAI of a network slice that is in the target access network device and that serves the session is first S-NSSAI.

According to the handover method provided in at least this embodiment of this application, after the source access network device determines that the terminal device needs to be handed over from the source access network device to the target access network device, the source access network device sends the handover requirement message to the core network device, and includes the identifier of the session in the handover requirement message. The second S-NSSAI corresponding to the identifier of the session is the S-NSSAI of the network slice that is in the source access network device and that serves the session, the S-NSSAI of the network slice that is in the target access network device and that serves the session is the first S-NSSAI, and the first S-NSSAI is different from the second S-NSSAI. In this way, when the session is handed over to the target access network device, the network slice corresponding to the first S-NSSAI can serve the session, to improve session continuity.

With reference to the second aspect, in some embodiments of the second aspect, the handover requirement message further includes the second S-NSSAI.

According to the handover method provided in at least this embodiment of this application, to enable the core network device to learn of the second S-NSSAI, the handover requirement message sent by the source access network device to the core network device may include the second S-NSSAI. This provides a feasible solution for the core network device to learn of the second S-NSSAI.

With reference to the second aspect, in some embodiments of the second aspect, the handover requirement message further includes a target identifier.

The target identifier is used to identify the target access network device.

With reference to the second aspect, in some embodiments of the second aspect, before the terminal device is handed over from the source access network device to the target access network device, the method further includes: The terminal device hands over from the target access network device to the source access network device. The handover requirement message further includes third S-NSSAI, and the third S-NSSAI is S-NSSAI of a network slice that is in the target access network device and that serves the session when the session is handed over from the target access network device to the source access network device.

According to the handover method provided in at least this embodiment of this application, before the terminal device currently needs to be handed over from the source access network device to the target access network device, if the terminal device was handed over from the target access network device to the source access network device, in the process in which the terminal device was handed over from the target access network device to the source access network device, the S-NSSAI of the network slice that is in the target access network device and that serves the session is the third S-NSSAI. In this case, in a process in which the terminal device currently needs to be handed over from the source access network device to the target access network device, the source access network device may include the third S-NSSAI in the handover requirement message. In this way, the core network device can directly determine that the network slice corresponding to the third S-NSSAI serves the session.

With reference to the second aspect, in some embodiments of the second aspect, the handover requirement message further includes first indication information, and the first indication information is used to indicate a type of the handover of the terminal device from the source access network device to the target access network device.

According to the handover method provided in at least this embodiment of this application, the handover requirement message may include the first indication information indicating the handover type, so that the core network device can learn of a handover type of current handover between cells.

With reference to the second aspect, in some embodiments of the second aspect, the source access network device supports a non-standalone NSA non-public network NPN, and the target access network device supports a land public mobile network PLMN; or the target access network device supports an NSA NPN, and the source access network device supports a PLMN.

According to the handover method provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

According to a third aspect, a handover method is provided, and includes: A target access network device receives a handover request message sent by a core network device, where the handover request message includes first S-NSSAI, the first S-NSSAI is determined based on second S-NSSAI and a network slice supported by the target access network device, a network slice that is in the target access network device and that corresponds to the first S-NSSAI serves the session, the second S-NSSAI is S-NSSAI that is in the source access network device and that corresponds to an identifier of the session, and the session is a session that is of a terminal device and that needs to be handed over from the source access network device to the target access network device; and the target access network device sends a handover response message to the core network device, where the handover response message is used to indicate that the terminal device can be handed over to the target access network device.

According to the handover method provided in at least this embodiment of this application, the target access network device receives the handover request message sent by the core network device, where the handover request message includes the first S-NSSAI. In this way, the target access network device determines that a network slice whose S-NSSAI is the first S-NSSAI in the target access network device serves the session. Therefore, when the session is handed over to the target access network device, the network slice corresponding to the first S-NSSAI can serve the session, to improve session continuity.

With reference to the third aspect, in some embodiments of the third aspect, the method further includes: The target access network device receives configuration information sent by a management device, where the configuration information includes the first S-NSSAI, and the network slice that is in the target access network device and that corresponds to the first S-NSSAI serves all sessions that need to be handed over from the source access network device to the target access network device; or the target access network device receives configuration information sent by a management device, where the configuration information includes a mapping relationship and S-NSSAI of a network slice in the target access network device, and the mapping relationship is a correspondence between S-NSSAI of a network slice in the source access network device and the S-NSSAI of the network slice in the target access network device.

According to the handover method provided in at least this embodiment of this application, the target access network device can learn, by receiving the configuration information sent by the management device, that the target access network device has the first S-NSSAI of the network slice that serves the session that needs to be handed over from the source access network device to the target access network device, or the target access network device can learn of, by receiving the configuration information sent by the management device, the foregoing mapping relationship and S-NSSAI of a plurality of network slices, in the target access network device, serving sessions that need to be handed over from the source access network device to the target access network device. This provides a feasible solution for the target access network device to learn of the first S-NSSAI, or to learn of the mapping relationship and the S-NSSAI of the plurality of network slices in the target access network device.

With reference to the third aspect, in some embodiments of the third aspect, the method further includes: The target access network device sends an interface setup request message to the core network device, where the interface setup request message includes the first S-NSSAI, or the interface setup request message includes the mapping relationship and the S-NSSAI of the network slice in the target access network device.

According to the handover method provided in at least this embodiment of this application, after learning of the first S-NSSAI or learning of the mapping relationship and the S-NSSAI of the plurality of network slices in the target access network device, the target access network device may send the information to the core network device by using the interface setup request message.

With reference to the third aspect, in some embodiments of the third aspect, the method further includes: The target access network device receives an interface setup response message sent by the core network device, where the interface setup response message includes the first S-NSSAI, and the network slice that is in the target access network device and that corresponds to the first S-NSSAI serves all the sessions that need to be handed over from the source access network device to the target access network device; or the target access network device receives an interface setup response message sent by the core network device, where the interface setup response message includes the mapping relationship and the S-NSSAI of the network slice in the target access network device, and the mapping relationship is the correspondence between the S-NSSAI of the network slice in the source access network device and the S-NSSAI of the network slice in the target access network device.

According to the handover method provided in at least this embodiment of this application, the target access network device can learn, by receiving the interface setup response message sent by the core network device, that the target access network device has the first S-NSSAI of the network slice that serves the session that needs to be handed over from the source access network device to the target access network device, or the target access network device can learn of, by receiving the interface setup response message sent by the core network device, the foregoing mapping relationship and S-NSSAI of a plurality of network slices, in the target access network device, serving sessions that need to be handed over from the source access network device to the target access network device. This provides a feasible solution for the target access network device to learn of the first S-NSSAI, or to learn of the mapping relationship and the S-NSSAI of the plurality of network slices in the target access network device.

With reference to the third aspect, in some embodiments of the third aspect, the handover request message further includes the second S-NSSAI.

According to the handover method provided in at least this embodiment of this application, the core network device may include, in the handover request message, the second S-NSSAI of the network slice that is in the source access network device and that serves the session, and notify the target access network device of the handover request message, so that the target access network device can learn of the second S-NSSAI.

With reference to the third aspect, in some embodiments of the third aspect, the handover request message further includes second indication information, and the second indication information is used to indicate that the handover request is from the source access network device.

According to the handover method provided in at least this embodiment of this application, the core network device may include, in the handover request message, the second indication information indicating that the handover request is from the source access network device, and notify the target access network device of the handover request message, so that the target access network device learns that the handover request is from the source access network device.

With reference to the third aspect, in some embodiments of the third aspect, the source access network device supports a non-standalone NSA non-public network NPN, and the target access network device supports a land public mobile network PLMN; or the target access network device supports an NSA NPN, and the source access network device supports a PLMN.

According to the handover method provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

According to a fourth aspect, a communication method is provided, and includes: A management device determines first single network slice selection assistance information S-NSSAI, where a network slice that is in a target access network device and that corresponds to the first S-NSSAI serves a session that needs to be handed over from a source access network device to the target access network device; or the management device determines a mapping relationship and S-NSSAI of a network slice in a target access network device, where the mapping relationship is a correspondence between S-NSSAI of a network slice in a source access network device and the S-NSSAI of the network slice in the target access network device.

According to the communication method provided in at least this embodiment of this application, the management device may learn of, based on a preset policy, the first S-NSSAI of the only network slice, in the target access network device, serving all the sessions that need to be handed over from the source access network device to the target access network device, or the management device can learn of the mapping relationship and S-NSSAI of a plurality of network slices in the target access network device based on a preset policy. This provides a feasible solution for the management device to learn of the first S-NSSAI or to learn of the mapping relationship and the S-NSSAI of the plurality of network slices in the target access network device.

With reference to the fourth aspect, in some embodiments of the fourth aspect, the method further includes: The management device sends configuration information to the target access network device, where the configuration information includes the first S-NSSAI, or the configuration information includes the mapping relationship and the S-NSSAI of the network slice in the target access network device.

According to the communication method provided in at least this embodiment of this application, after determining the first S-NSSAI or determining the mapping relationship and the S-NSSAI of the plurality of network slices in the target access network device based on the preset policy, the management device may send the configuration information including the information to the target access network device.

According to a fifth aspect, a handover method is provided, and includes: A network slice selection device receives second single network slice selection assistance information S-NSSAI sent by a core network device, where the second S-NSSAI is S-NSSAI that is of a network slice in a source access network device and that corresponds to an identifier of a session, and the session is a session that is of a terminal device and that needs to be handed over from the source access network device to a target access network device; the network slice selection device determines first S-NSSAI based on the second S-NSSAI, where a network slice that is in the target access network device and that corresponds to the first S-NSSAI serves the session; and the network slice selection device sends the first S-NSSAI to the core network device.

According to the handover method provided in at least this embodiment of this application, the core network device can learn of the first S-NSSAI by receiving the first S-NSSAI from the network slice selection device. Specifically, the core network device may determine the second S-NSSAI based on the identifier of the session, and send the second S-NSSAI to the network slice selection device. The network slice selection device determines the first S-NSSAI based on the second S-NSSAI, and sends the determined first S-NSSAI to the core network device. This provides a flexible solution for the core network device to learn of the first S-NSSAI.

According to a sixth aspect, a handover method is provided, and includes: A network slice selection device receives an identifier of a session sent by a core network device, where the session is a session that is of a terminal device and that needs to be handed over from a source access network device to a target access network device; the network slice selection device determines second single network slice selection assistance information S-NSSAI based on the identifier of the session, where the second S-NSSAI is S-NSSAI that is of a network slice in the source access network device and that corresponds to the identifier of the session; the network slice selection device determines first S-NSSAI based on the second S-NSSAI, where a network slice that is in the target access network device and that corresponds to the first S-NSSAI serves the session; and the network slice selection device sends the first S-NSSAI to the core network device.

According to the handover method provided in at least this embodiment of this application, the core network device can learn of the first S-NSSAI by receiving the first S-NSSAI from the network slice selection device. Specifically, the core network device may send the identifier of the session to the network slice selection device, and the network slice selection device determines the second S-NSSAI based on the correspondence between the identifier of the session and the S-NSSAI of the network slice in the source access network device, determines the first S-NSSAI based on the second S-NSSAI, and sends the determined first S-NSSAI to the core network device. This provides a flexible solution for the core network device to learn of the first S-NSSAI.

According to a seventh aspect, a handover method is provided, and includes: A target access network device receives a handover request message sent by a source access network device, where the handover request message includes an identifier of a session, and the session is a session that is of a terminal device and that needs to be handed over from the source access network device to the target access network device; the target access network device determines first S-NSSAI based on second S-NSSAI corresponding to the identifier of the session and a network slice supported by the target access network device, where a network slice that is in the target access network device and that corresponds to the first S-NSSAI serves the session, and the second S-NSSAI is S-NSSAI corresponding to the identifier of the session in the source access network device; and sending, by the target access network device, a path switch request message to a core network device, where the path switch request message includes the first S-NSSAI.

According to the handover method provided in at least this embodiment of this application, after receiving the handover request message sent by the source access network device, the target access network device learns that the session is to be handed over from the source access network device to the target access network device, and that a network slice in the target access network device serves the session. The target access network device determines the first S-NSSAI of the network slice that can serve the session, so that when the session is handed over to the target access network device, the network slice corresponding to the first S-NSSAI can provide the service, to improve session continuity.

With reference to the seventh aspect, in some embodiments of the seventh aspect, the path switch request message further includes the second S-NSSAI.

According to the handover method provided in at least this embodiment of this application, the target access network device may notify the core network device of the path switch request message including the second S-NSSAI, so that the core network device can learn of the S-NSSAI of the network slice that is in the source access network device and that serves the session.

With reference to the seventh aspect, in some embodiments of the seventh aspect, the method further includes: the target access network device determines the first S-NSSAI based on the second S-NSSAI and a mapping relationship, where the mapping relationship is a correspondence between S-NSSAI of a network slice in the source access network device and S-NSSAI of a network slice in the target access network device; or the target access network device determines the first S-NSSAI, where the network slice that is in the target access network device and that corresponds to the first S-NSSAI serves all sessions that need to be handed over from the source access network device to the target access network device.

According to the handover method provided in at least this embodiment of this application, the target access network device determines the first S-NSSAI based on the second S-NSSAI and the mapping relationship. The mapping relationship is the correspondence between the S-NSSAI of the network slices in the source access network device and in the target access network device. In other words, the target access network device can determine the first S-NSSAI of the network slice in the target access network device when knowing the mapping relationship and the second S-NSSAI of the network slice in the source access network device.

Alternatively, the target access network device can directly determine the first S-NSSAI without based on the second S-NSSAI and the mapping relationship. For example, S-NSSAI of a network slice that is in the target access network device and that serves all the sessions that need to be handed over from the source access network device to the target access network device is the first S-NSSAI. In this case, the target access network device can learn, by only receiving the handover requirement message from the source access network device, that the session that is of the terminal device and that is to be handed over from the source access network device to the target access network device is to be served by the network slice whose S-NSSAI in the target access network device is the first S-NSSAI. This provides a flexible solution for the target access network device to determine the first S-NSSAI.

With reference to the seventh aspect, in some embodiments of the seventh aspect, the method further includes: The target access network device receives configuration information sent by a management device, where the configuration information includes the first S-NSSAI, and the network slice that is in the target access network device and that corresponds to the first S-NSSAI serves all sessions that need to be handed over from the source access network device to the target access network device; or the target access network device receives configuration information sent by a management device, where the configuration information includes a mapping relationship and S-NSSAI of a network slice in the target access network device, and the mapping relationship is a correspondence between S-NSSAI of a network slice in the source access network device and the S-NSSAI of the network slice in the target access network device.

According to the handover method provided in at least this embodiment of this application, the target access network device can learn, by receiving the configuration information sent by the management device, that the target access network device has the first S-NSSAI of the network slice that serves the session that needs to be handed over from the source access network device to the target access network device, or the target access network device can learn of, by receiving the configuration information sent by the management device, the foregoing mapping relationship and S-NSSAI of a plurality of network slices, in the target access network device, serving sessions that need to be handed over from the source access network device to the target access network device. This provides a feasible solution for the target access network device to learn of the first S-NSSAI, or to learn of the mapping relationship and the S-NSSAI of the plurality of network slices in the target access network device.

With reference to the seventh aspect, in some embodiments of the seventh aspect, the method further includes: The target access network device receives an interface setup response message sent by the core network device, where the interface setup response message includes the first S-NSSAI, and the network slice that is in the target access network device and that corresponds to the first S-NSSAI serves all the sessions that need to be handed over from the source access network device to the target access network device; or the interface setup response message includes the mapping relationship and the S-NSSAI of the network slice in the target access network device, where the mapping relationship is the correspondence between the S-NSSAI of the network slice in the source access network device and the S-NSSAI of the network slice in the target access network device.

According to the handover method provided in at least this embodiment of this application, the target access network device can learn, by receiving the interface setup response message sent by the core network device, that the target access network device has the first S-NSSAI of the network slice that serves the session that needs to be handed over from the source access network device to the target access network device, or the target access network device can learn of, by receiving the interface setup response message sent by the core network device, the foregoing mapping relationship and S-NSSAI of a plurality of network slices, in the target access network device, serving sessions that need to be handed over from the source access network device to the target access network device. This provides a feasible solution for the target access network device to learn of the first S-NSSAI, or to learn of the mapping relationship and the S-NSSAI of the plurality of network slices in the target access network device.

With reference to the seventh aspect, in some embodiments of the seventh aspect, before the terminal device is handed over from the source access network device to the target access network device, the method further includes: The terminal device hands over from the target access network device to the source access network device. The path switch request message further includes third S-NSSAI, and the third S-NSSAI is S-NSSAI of a network slice that is in the target access network device and that serves the session when the session is handed over from the target access network device to the source access network device.

According to the handover method provided in at least this embodiment of this application, before the terminal device currently needs to be handed over from the source access network device to the target access network device, if the terminal device was handed over from the target access network device to the source access network device, in the process in which the terminal device was handed over from the target access network device to the source access network device, the S-NSSAI of the network slice that is in the target access network device and that serves the session is the third S-NSSAI. In this case, in a process in which the terminal device currently needs to be handed over from the source access network device to the target access network device, the target access network device may include the third S-NSSAI in the path switch request message.

With reference to the seventh aspect, in some embodiments of the seventh aspect, the path switch request message further includes first indication information, and the first indication information is used to indicate a type of the handover of the terminal device from the source access network device to the target access network device.

According to the handover method provided in at least this embodiment of this application, the path switch request message may include the first indication information indicating the handover type, so that the core network device can learn of a handover type of current handover between cells.

With reference to the seventh aspect, in some embodiments of the seventh aspect, the source access network device supports a non-standalone NSA non-public network NPN, and the target access network device supports a land public mobile network PLMN; or the target access network device supports an NSA NPN, and the source access network device supports a PLMN.

According to the handover method provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

According to an eighth aspect, a handover method is provided, and includes: A source access network device sends a handover request message to a target access network device, where the handover request message includes an identifier of a session, the session is a session that is of a terminal device and that needs to be handed over from the source access network device to the target access network device, and second single network slice selection assistance information S-NSSAI corresponding to the identifier of the session is S-NSSAI of a network slice that is in the source access network device and that serves the session; and the source access network device receives a handover request response message sent by the target access network device, where the handover request response message is used to indicate the terminal device to be handed over from the source access network device to the target access network device, and S-NSSAI of a network slice that is in the target access network device and that serves the session is first S-NSSAI.

According to the handover method provided in at least this embodiment of this application, after the source access network device determines that the terminal device needs to be handed over from the source access network device to the target access network device, the source access network device sends the handover request message to the target access network device, and includes the identifier of the session in the handover request message. The second S-NSSAI corresponding to the identifier of the session is the S-NSSAI of the network slice that is in the source access network device and that serves the session, the S-NSSAI of the network slice that is in the target access network device and that serves the session is the first S-NSSAI, and the first S-NSSAI is different from the second S-NSSAI. In this way, when the session is handed over to the target access network device, the network slice corresponding to the first S-NSSAI can serve the session, to improve session continuity.

With reference to the eighth aspect, in some embodiments of the eighth aspect, the handover request message further includes the second S-NSSAI.

According to the handover method provided in at least this embodiment of this application, to enable the target access network device to learn of the second S-NSSAI, the handover request message sent by the source access network device to the target access network device may include the second S-NSSAI. This provides a feasible solution for the target access network device to learn of the second S-NSSAI.

With reference to the eighth aspect, in some embodiments of the eighth aspect, before the terminal device is handed over from the source access network device to the target access network device, the method further includes: The terminal device hands over from the target access network device to the source access network device. The handover request message further includes third S-NSSAI, and the third S-NSSAI is S-NSSAI of a network slice that is in the target access network device and that serves the session when the session is handed over from the target access network device to the source access network device.

According to the handover method provided in at least this embodiment of this application, before the terminal device currently needs to be handed over from the source access network device to the target access network device, if the terminal device was handed over from the target access network device to the source access network device, in the process in which the terminal device was handed over from the target access network device to the source access network device, the S-NSSAI of the network slice that is in the target access network device and that serves the session is the third S-NSSAI. In this case, in a process in which the terminal device currently needs to be handed over from the source access network device to the target access network device, the source access network device may include the third S-NSSAI in the handover request message. In this way, the target access network device can directly determine that the network slice corresponding to the third S-NSSAI serves the session.

With reference to the eighth aspect, in some embodiments of the eighth aspect, the handover request message further includes first indication information, and the first indication information is used to indicate a type of the handover of the terminal device from the source access network device to the target access network device.

According to the handover method provided in at least this embodiment of this application, the handover request message may include the first indication information indicating the handover type, so that the target access network device can learn of a handover type of current handover between cells.

With reference to the eighth aspect, in some embodiments of the eighth aspect, the source access network device supports a non-standalone NSA non-public network NPN, and the target access network device supports a land public mobile network PLMN; or the target access network device supports an NSA NPN, and the source access network device supports a PLMN.

According to the handover method provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

According to a ninth aspect, a handover method is provided, and includes: A core network device receives a path switch request message sent by a target access network device, where the path switch request message includes first S-NSSAI, the first S-NSSAI is determined based on second S-NSSAI and a network slice supported by the target access network device, a network slice that is in the target access network device and that corresponds to the first S-NSSAI serves a session, the second S-NSSAI is S-NSSAI that is of a network slice in a source access network device and that corresponds to an identifier of the session, and the session is a session that is of a terminal device and that needs to be handed over from the source access network device to the target access network device; and the core network device sends a path switch request response message to the target access network device, where the path switch request response message is used to indicate that the core network device learns that a downlink transmission path changes.

According to the handover method provided in at least this embodiment of this application, the core network device receives the path switch request message sent by the target access network device, and learns that the session is to be handed over from the source access network device to the target access network device, and that a network slice in the target access network device serves the session. When the session is handed over to the target access network device, the network slice corresponding to the first S-NSSAI can provide the service, to improve session continuity.

With reference to the ninth aspect, in some embodiments of the ninth aspect, the path switch request message further includes the second S-NSSAI.

According to the handover method provided in at least this embodiment of this application, to enable the core network device to learn of the second S-NSSAI, the path switch request message sent by the target access network device to the core network device may include the second S-NSSAI. This provides a feasible solution for the core network device to learn of the second S-NSSAI.

With reference to the ninth aspect, in some embodiments of the ninth aspect, the method further includes: The core network device receives an interface setup request message sent by the target access network device, where the interface setup request message includes the first S-NSSAI, and the network slice that is in the target access network device and that corresponds to the first S-NSSAI serves all the sessions that need to be handed over from the source access network device to the target access network device; or the interface setup request message includes the mapping relationship and the S-NSSAI of the network slice in the target access network device, where the mapping relationship is the correspondence between the S-NSSAI of the network slice in the source access network device and the S-NSSAI of the network slice in the target access network device.

According to the handover method provided in at least this embodiment of this application, the core network device may receive the interface setup request message sent by the target access network device, so that the core network device can learn that the target access network device has the first S-NSSAI of the network slice that serves the session that needs to be handed over from the source access network device to the target access network device, or the core network device can learn of the foregoing mapping relationship and S-NSSAI of a plurality of network slices, in the target access network device, serving sessions that need to be handed over from the source access network device to the target access network device. This provides a feasible solution for the core network device to learn of the first S-NSSAI, or to learn of the mapping relationship and the S-NSSAI of the plurality of network slices in the target access network device.

With reference to the ninth aspect, in some embodiments of the ninth aspect, the method further includes: The core network device determines the first S-NSSAI based on a preset policy, where the network slice that is in the target access network device and that corresponds to the first S-NSSAI serves all the sessions that need to be handed over from the source access network device to the target access network device; or the core network device determines the mapping relationship and the S-NSSAI of the network slice in the target access network device based on a preset policy, where the mapping relationship is the correspondence between the S-NSSAI of the network slice in the source access network device and the S-NSSAI of the network slice in the target access network device.

According to the handover method provided in at least this embodiment of this application, the core network device can learn, based on the preset policy, that the target access network device has the first S-NSSAI of the network slice that serves the session that needs to be handed over from the source access network device to the target access network device, or the core network device can learn of, based on the preset policy, the foregoing mapping relationship and S-NSSAI of a plurality of network slices, in the target access network device, serving sessions that need to be handed over from the source access network device to the target access network device. This provides a feasible solution for the core network device to learn of the first S-NSSAI, or to learn of the mapping relationship and the S-NSSAI of the plurality of network slices in the target access network device.

With reference to the ninth aspect, in some embodiments of the ninth aspect, the method further includes: The core network device sends an interface setup response message to the target access network device, where the interface setup request message includes the first S-NSSAI, or the interface setup response message includes the mapping relationship and the S-NSSAI of the network slice in the target access network device.

According to the handover method provided in at least this embodiment of this application, after determining the first S-NSSAI or determining the mapping relationship and the S-NSSAI of the plurality of network slices in the target access network device based on the preset policy, the core network device may send the information to the target access network device by using the interface setup response message.

With reference to the ninth aspect, in some embodiments of the ninth aspect, the path switch request message further includes second indication information, and the second indication information is used to indicate that the handover request is from the first network device.

According to the handover method provided in at least this embodiment of this application, the target access network device may include, in the handover request message, the second indication information indicating that the handover request is from the source access network device, and notify the core network device of the handover request message, so that the core network device learns that the handover request is from the source access network device.

With reference to the ninth aspect, in some embodiments of the ninth aspect, the source access network device supports a non-standalone NSA non-public network NPN, and the target access network device supports a land public mobile network PLMN; or the target access network device supports an NSA NPN, and the source access network device supports a PLMN.

According to the handover method provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

According to a tenth aspect, a communication method is provided, and includes: A management device determines first single network slice selection assistance information S-NSSAI, where a network slice that is in a target access network device and that corresponds to the first S-NSSAI serves a session that needs to be handed over from a source access network device to the target access network device; or the management device determines a mapping relationship and S-NSSAI of a network slice in a target access network device, where the mapping relationship is a correspondence between S-NSSAI of a network slice in a source access network device and the S-NSSAI of the network slice in the target access network device.

According to the communication method provided in at least this embodiment of this application, the management device may learn of, based on a preset policy, the first S-NSSAI of the only network slice, in the target access network device, serving all the sessions that need to be handed over from the source access network device to the target access network device, or the management device can learn of the mapping relationship and S-NSSAI of a plurality of network slices in the target access network device based on a preset policy. This provides a feasible solution for the management device to learn of the first S-NSSAI or to learn of the mapping relationship and the S-NSSAI of the plurality of network slices in the target access network device.

With reference to the tenth aspect, in some embodiments of the tenth aspect, the method further includes: The management device sends configuration information to the target access network device, where the configuration information includes the first S-NSSAI, or the configuration information includes the mapping relationship and the S-NSSAI of the network slice in the target access network device.

According to the communication method provided in at least this embodiment of this application, after determining the first S-NSSAI or determining the mapping relationship and the S-NSSAI of the plurality of network slices in the target access network device based on the preset policy, the management device may send the configuration information including the information to the target access network device.

According to an eleventh aspect, a handover method is provided, and includes: A core network device receives an interface setup request message sent by a target access network device, where the interface setup request message includes first single network slice selection assistance information S-NSSAI, and a network slice that is in the target access network device and that corresponds to the first S-NSSAI serves all sessions that need to be handed over from a source access network device to the target access network device; or the interface setup request message includes a mapping relationship and S-NSSAI of a network slice in the target access network device, where the mapping relationship is a correspondence between S-NSSAI of a network slice in a source access network device and the S-NSSAI of the network slice in the target access network device.

According to the handover method provided in at least this embodiment of this application, the core network device may receive the interface setup request message sent by the target access network device, so that the core network device can learn that the target access network device has the first S-NSSAI of the network slice that serves the session that needs to be handed over from the source access network device to the target access network device, or the core network device can learn of the foregoing mapping relationship and S-NSSAI of a plurality of network slices, in the target access network device, serving sessions that need to be handed over from the source access network device to the target access network device. This provides a feasible solution for the core network device to learn of the first S-NSSAI, or to learn of the mapping relationship and the S-NSSAI of the plurality of network slices in the target access network device.

According to a twelfth aspect, a handover method is provided, and includes: A target access network device receives configuration information sent by a management device, where the configuration information includes first S-NSSAI, and a network slice that is in the target access network device and that corresponds to the first S-NSSAI serves all sessions that need to be handed over from a source access network device to the target access network device; or the target access network device receives configuration information sent by a management device, where the configuration information includes a mapping relationship and S-NSSAI of a network slice in the target access network device, and the mapping relationship is a correspondence between S-NSSAI of a network slice in a source access network device and the S-NSSAI of the network slice in the target access network device.

According to the handover method provided in at least this embodiment of this application, the target access network device can learn, by receiving the configuration information sent by the management device, that the target access network device has the first S-NSSAI of the network slice that serves the session that needs to be handed over from the source access network device to the target access network device, or the target access network device can learn of, by receiving the configuration information sent by the management device, the foregoing mapping relationship and S-NSSAI of a plurality of network slices, in the target access network device, serving sessions that need to be handed over from the source access network device to the target access network device. This provides a feasible solution for the target access network device to learn of the first S-NSSAI, or to learn of the mapping relationship and the S-NSSAI of the plurality of network slices in the target access network device.

With reference to the twelfth aspect, in some embodiments of the twelfth aspect, the method further includes: The target access network device sends an interface setup request message to a core network device, where the interface setup request message includes the first S-NSSAI, or the interface setup request message includes the mapping relationship and the S-NSSAI of the network slice in the target access network device.

According to the handover method provided in at least this embodiment of this application, after learning of the first S-NSSAI or learning of the mapping relationship and the S-NSSAI of the plurality of network slices in the target access network device, the target access network device may send the information to the core network device by using the interface setup request message.

According to a thirteenth aspect, a communication method is provided, and includes: A management device determines first single network slice selection assistance information S-NSSAI, where a network slice that is in a target access network device and that corresponds to the first S-NSSAI serves all sessions that need to be handed over from a source access network device to the target access network device; or the management device determines a mapping relationship and S-NSSAI of a network slice in a target access network device, where the mapping relationship is a correspondence between S-NSSAI of a network slice in a source access network device and the S-NSSAI of the network slice in the target access network device.

According to the communication method provided in at least this embodiment of this application, the management device may learn of, based on a preset policy, the first S-NSSAI of the only network slice, in the target access network device, serving all the sessions that need to be handed over from the source access network device to the target access network device, or the management device can learn of the mapping relationship and S-NSSAI of a plurality of network slices in the target access network device based on a preset policy. This provides a feasible solution for the management device to learn of the first S-NSSAI or to learn of the mapping relationship and the S-NSSAI of the plurality of network slices in the target access network device.

With reference to the thirteenth aspect, in some embodiments of the thirteenth aspect, the method further includes: The management device sends configuration information to the target access network device, where the configuration information includes the first S-NSSAI, or the configuration information includes the mapping relationship and the S-NSSAI of the network slice in the target access network device.

According to the communication method provided in at least this embodiment of this application, after determining the first S-NSSAI or determining the mapping relationship and the S-NSSAI of the plurality of network slices in the target access network device based on the preset policy, the management device may send the configuration information including the information to the target access network device.

According to a fourteenth aspect, a communication method is provided, and includes: A core network device determines first S-NSSAI, where a network slice that is in a target access network device and that corresponds to the first S-NSSAI serves all sessions that need to be handed over from a source access network device to the target access network device; or the core network device determines a mapping relationship and S-NSSAI of a network slice in a target access network device, where the mapping relationship is a correspondence between S-NSSAI of a network slice in a source access network device and the S-NSSAI of the network slice in the target access network device.

According to the communication method provided in at least this embodiment of this application, the core network device can learn, based on a preset policy, that the target access network device has the first S-NSSAI of the network slice that serves a session that needs to be handed over from the source access network device to the target access network device, or the core network device can learn of, based on the preset policy, the foregoing mapping relationship and S-NSSAI of a plurality of network slices, in the target access network device, serving sessions that need to be handed over from the source access network device to the target access network device. This provides a feasible solution for the core network device to learn of the first S-NSSAI, or to learn of the mapping relationship and the S-NSSAI of the plurality of network slices in the target access network device.

It should be understood that the preset policy in at least this embodiment of this application may be specified by an operator.

With reference to the fourteenth aspect, in some embodiments of the fourteenth aspect, the method further includes: The core network device sends an interface setup response message to the target access network device, where the interface setup request message includes the first S-NSSAI, or the interface setup response message includes the mapping relationship and the S-NSSAI of the network slice in the target access network device.

According to the communication method provided in at least this embodiment of this application, after determining the first S-NSSAI or determining the mapping relationship and the S-NSSAI of the plurality of network slices in the target access network device based on the preset policy, the core network device may send the information to the target access network device by using the interface setup response message.

According to a fifteenth aspect, a communication method is provided, and includes: A target access network device receives an interface setup response message sent by a core network device, where the interface setup response message includes first S-NSSAI, and a network slice that is in a target access network device and that corresponds to the first S-NSSAI serves all sessions that need to be handed over from a source access network device to the target access network device; or the target access network device receives an interface setup response message sent by a core network device, where the interface setup response message includes a mapping relationship and S-NSSAI of a network slice in the target access network device, and the mapping relationship is a correspondence between S-NSSAI of a network slice in a source access network device and the S-NSSAI of the network slice in the target access network device.

According to the communication method provided in at least this embodiment of this application, the target access network device can learn, by receiving the interface setup response message sent by the core network device, that the target access network device has the first S-NSSAI of the network slice that serves the session that needs to be handed over from the source access network device to the target access network device, or the target access network device can learn of, by receiving the interface setup response message sent by the core network device, the foregoing mapping relationship and S-NSSAI of a plurality of network slices, in the target access network device, serving sessions that need to be handed over from the source access network device to the target access network device. This provides a feasible solution for the target access network device to learn of the first S-NSSAI, or to learn of the mapping relationship and the S-NSSAI of the plurality of network slices in the target access network device.

According to a sixteenth aspect, a handover apparatus is provided, and includes: a receiving unit, configured to receive a handover requirement message sent by a source access network device, where the handover requirement message includes an identifier of a session, and the session is a session that is of a terminal device and that needs to be handed over from the source access network device to a target access network device; and a sending unit, configured to send a handover request message to the target access network device, where the handover request message includes first single network slice selection assistance information S-NSSAI, the first S-NSSAI is determined based on second S-NSSAI and a network slice supported by the target access network device, a network slice that is in the target access network device and that corresponds to the first S-NSSAI serves the session, and the second S-NSSAI is S-NSSAI corresponding to the identifier of the session in the source access network device.

With reference to the sixteenth aspect, in some embodiments of the sixteenth aspect, the apparatus further includes a processing unit, configured to determine the target access network device based on a target identifier. The processing unit determines the first S-NSSAI based on the second S-NSSAI and a mapping relationship, where the mapping relationship is a correspondence between S-NSSAI of a network slice in the source access network device and S-NSSAI of a network slice in the target access network device; or the processing unit determines the first S-NSSAI, where the network slice that is in the target access network device and that corresponds to the first S-NSSAI serves all sessions that need to be handed over from the source access network device to the target access network device.

With reference to the sixteenth aspect, in some embodiments of the sixteenth aspect, before the processing unit determines the first S-NSSAI based on the second S-NSSAI and the mapping relationship, the receiving unit is further configured to receive the handover requirement message sent by the source access network device, where the handover requirement message includes the second S-NSSAI; or the processing unit determines the second S-NSSAI based on the identifier of the session.

With reference to the sixteenth aspect, in some embodiments of the sixteenth aspect, the sending unit is further configured to send the identifier of the session to a network slice selection device, where the identifier of the session is used to indicate the network slice selection device to determine the second S-NSSAI; and the receiving unit is further configured to receive the first S-NSSAI sent by the network slice selection device, where the first S-NSSAI is determined by the network slice selection device based on the second S-NSSAI.

With reference to the sixteenth aspect, in some embodiments of the sixteenth aspect, the processing unit is further configured to determine the second S-NSSAI based on the identifier of the session; the sending unit is further configured to send the second S-NSSAI to a network slice selection device; and the core network device receives the first S-NSSAI sent by the network slice selection device.

With reference to the sixteenth aspect, in some embodiments of the sixteenth aspect, the receiving unit is further configured to receive an interface setup request message sent by the target access network device, where the interface setup request message includes the first S-NSSAI, and the network slice that is in the target access network device and that corresponds to the first S-NSSAI serves all the sessions that need to be handed over from the source access network device to the target access network device; or the interface setup request message includes the mapping relationship and the S-NSSAI of the network slice in the target access network device, where the mapping relationship is the correspondence between the S-NSSAI of the network slice in the source access network device and the S-NSSAI of the network slice in the target access network device.

With reference to the sixteenth aspect, in some embodiments of the sixteenth aspect, the processing unit is further configured to determine the first S-NSSAI based on a preset policy, where the network slice that is in the target access network device and that corresponds to the first S-NSSAI serves all the sessions that need to be handed over from the source access network device to the target access network device; or the processing unit is further configured to determine the mapping relationship and the S-NSSAI of the network slice in the target access network device based on a preset policy, where the mapping relationship is the correspondence between the S-NSSAI of the network slice in the source access network device and the S-NSSAI of the network slice in the target access network device.

With reference to the sixteenth aspect, in some embodiments of the sixteenth aspect, the sending unit is further configured to send an interface setup response message to the target access network device, where the interface setup request message includes the first S-NSSAI, or the interface setup response message includes the mapping relationship and the S-NSSAI of the network slice in the target access network device.

With reference to the sixteenth aspect, in some embodiments of the sixteenth aspect, before the terminal device is handed over from the source access network device to the target access network device, the terminal device hands over from the target access network device to the source access network device. The handover requirement message further includes third S-NSSAI, and the third S-NSSAI is S-NSSAI of a network slice that is in the target access network device and that serves the session when the session is handed over from the target access network device to the source access network device.

With reference to the sixteenth aspect, in some embodiments of the sixteenth aspect, the handover requirement message further includes first indication information, and the first indication information is used to indicate a type of the handover of the terminal device from the source access network device to the target access network device.

With reference to the sixteenth aspect, in some embodiments of the sixteenth aspect, the handover request message further includes the second S-NSSAI.

With reference to the sixteenth aspect, in some embodiments of the sixteenth aspect, the handover request message further includes second indication information, and the second indication information is used to indicate that the handover request is from the source access network device.

With reference to the sixteenth aspect, in some embodiments of the sixteenth aspect, the source access network device supports a non-standalone NSA non-public network NPN, and the target access network device supports a land public mobile network PLMN; or the target access network device supports an NSA NPN, and the source access network device supports a PLMN.

The handover apparatus provided in the sixteenth aspect and any possible implementation of the sixteenth aspect may be configured to perform operations of the core network device in the first aspect and any possible implementation of the first aspect. Specifically, the handover apparatus includes a corresponding means (means) configured to perform the steps or functions described in the first aspect or any possible implementation of the first aspect. The means may be the core network device in the first aspect or a chip or a function module inside the core network device. The steps or functions may be implemented by software, hardware, or a combination of hardware and software.

According to a seventeenth aspect, a handover apparatus is provided, and includes: a sending unit, configured to send a handover requirement message to a core network device, where the handover requirement message includes an identifier of a session, the session is a session that is of a terminal device and that needs to be handed over from a source access network device to a target access network device, and second single network slice selection assistance information S-NSSAI corresponding to the identifier of the session is S-NSSAI of a network slice that is in the source access network device and that serves the session; and the source access network device receives a handover command message sent by the core network device, where the handover command message is used to indicate the terminal device to be handed over from the source access network device to the target access network device, and S-NSSAI of a network slice that is in the target access network device and that serves the session is first S-NSSAI.

With reference to the seventeenth aspect, in some embodiments of the seventeenth aspect, the handover requirement message further includes the second S-NSSAI.

With reference to the seventeenth aspect, in some embodiments of the seventeenth aspect, before the terminal device is handed over from the source access network device to the target access network device, the apparatus further includes: The terminal device hands over from the target access network device to the source access network device. The handover requirement message further includes third S-NSSAI, and the third S-NSSAI is S-NSSAI of a network slice that is in the target access network device and that serves the session when the session is handed over from the target access network device to the source access network device.

With reference to the seventeenth aspect, in some embodiments of the seventeenth aspect, the handover requirement message further includes first indication information, and the first indication information is used to indicate a type of the handover of the terminal device from the source access network device to the target access network device.

With reference to the seventeenth aspect, in some embodiments of the seventeenth aspect, the source access network device supports a non-standalone NSA non-public network NPN, and the target access network device supports a land public mobile network PLMN; or the target access network device supports an NSA NPN, and the source access network device supports a PLMN.

The handover apparatus provided in the seventeenth aspect and any possible implementation of the seventeenth aspect may be configured to perform operations of the source access network device in the second aspect and any possible implementation of the second aspect. Specifically, the handover apparatus includes a corresponding means (means) configured to perform the steps or functions described in the second aspect or any possible implementation of the second aspect. The means may be the source access network device in the second aspect or a chip or a function module inside the source access network device. The steps or functions may be implemented by software, hardware, or a combination of hardware and software.

According to an eighteenth aspect, a handover apparatus is provided, and includes: a receiving unit, configured to receive a handover request message sent by a core network device, where the handover request message includes first S-NSSAI, the first S-NSSAI is determined based on second S-NSSAI and a network slice supported by a target access network device, a network slice that is in the target access network device and that corresponds to the first S-NSSAI serves the session, the second S-NSSAI is S-NSSAI that is in a source access network device and that corresponds to an identifier of the session, and the session is a session that is of a terminal device and that needs to be handed over from the source access network device to the target access network device; and a sending unit, configured to send a handover response message to the core network device, where the handover response message is used to indicate that the terminal device can be handed over to the target access network device.

With reference to the eighteenth aspect, in some embodiments of the eighteenth aspect, the receiving unit is further configured to receive configuration information sent by a management device, where the configuration information includes the first S-NSSAI, and the network slice that is in the target access network device and that corresponds to the first S-NSSAI serves all sessions that need to be handed over from the source access network device to the target access network device; or the receiving unit is further configured to receive configuration information sent by a management device, where the configuration information includes a mapping relationship and S-NSSAI of a network slice in the target access network device, and the mapping relationship is a correspondence between S-NSSAI of a network slice in the source access network device and the S-NSSAI of the network slice in the target access network device.

With reference to the eighteenth aspect, in some embodiments of the eighteenth aspect, the sending unit is further configured to send an interface setup request message to the core network device, where the interface setup request message includes the first S-NSSAI, or the interface setup request message includes the mapping relationship and the S-NSSAI of the network slice in the target access network device.

With reference to the eighteenth aspect, in some embodiments of the eighteenth aspect, the receiving unit is further configured to receive an interface setup response message sent by the core network device, where the interface setup response message includes the first S-NSSAI, and the network slice that is in the target access network device and that corresponds to the first S-NSSAI serves all the sessions that need to be handed over from the source access network device to the target access network device; or the receiving unit is further configured to receive an interface setup response message sent by the core network device, where the interface setup response message includes the mapping relationship and the S-NSSAI of the network slice in the target access network device, and the mapping relationship is the correspondence between the S-NSSAI of the network slice in the source access network device and the S-NSSAI of the network slice in the target access network device.

With reference to the eighteenth aspect, in some embodiments of the eighteenth aspect, the handover request message further includes the second S-NSSAI.

With reference to the eighteenth aspect, in some embodiments of the eighteenth aspect, the handover request message further includes second indication information, and the second indication information is used to indicate that the handover request is from the source access network device.

With reference to the eighteenth aspect, in some embodiments of the eighteenth aspect, the source access network device supports a non-standalone NSA non-public network NPN, and the target access network device supports a land public mobile network PLMN; or the target access network device supports an NSA NPN, and the source access network device supports a PLMN.

The handover apparatus provided in the eighteenth aspect and any possible implementation of the eighteenth aspect may be configured to perform operations of the target access network device in the third aspect and any possible implementation of the third aspect. Specifically, the handover apparatus includes a corresponding means (means) configured to perform the steps or functions described in the third aspect or any possible implementation of the third aspect. The means may be the target access network device in the third aspect or a chip or a function module inside the target access network device. The steps or functions may be implemented by software, hardware, or a combination of hardware and software.

According to a nineteenth aspect, a handover apparatus is provided, and includes: a processing unit, configured to determine first single network slice selection assistance information S-NSSAI based on a preset policy, where a network slice that is in a target access network device and that corresponds to the first S-NSSAI serves all sessions that need to be handed over from a source access network device to the target access network device. The processing unit is alternatively configured to determine a mapping relationship and S-NSSAI of a network slice in a target access network device based on a preset policy, where the mapping relationship is a correspondence between S-NSSAI of a network slice in a source access network device and the S-NSSAI of the network slice in the target access network device.

With reference to the nineteenth aspect, in some embodiments of the nineteenth aspect, the apparatus further includes a sending unit, configured to send configuration information to the target access network device, where the configuration information includes the first S-NSSAI, or the configuration information includes the mapping relationship and the S-NSSAI of the network slice in the target access network device.

The communication apparatus provided in the nineteenth aspect and any possible implementation of the nineteenth aspect may be configured to perform operations of the management device in the fourth aspect and any possible implementation of the fourth aspect. Specifically, the handover apparatus includes a corresponding means (means) configured to perform the steps or functions described in the fourth aspect or any possible implementation of the fourth aspect. The means may be the management device in the fourth aspect or a chip or a function module inside the management device. The steps or functions may be implemented by software, hardware, or a combination of hardware and software.

According to a twentieth aspect, a handover apparatus is provided, and includes: a receiving unit, configured to receive second single network slice selection assistance information S-NSSAI sent by a core network device, where the second S-NSSAI is S-NSSAI that is of a network slice in a source access network device and that corresponds to an identifier of a session, and the session is a session that is of a terminal device and that needs to be handed over from the source access network device to a target access network device; a processing unit, configured to determine first S-NSSAI based on the second S-NSSAI, where a network slice that is in the target access network device and that corresponds to the first S-NSSAI serves the session; and a sending unit, configured to send the first S-NSSAI to the core network device.

The handover apparatus provided in the twentieth aspect may be configured to perform operations of the network slice selection device in the fifth aspect or any possible implementation of the fifth aspect. Specifically, the handover apparatus includes a corresponding means (means) configured to perform the steps or functions described in the fifth aspect or any possible implementation of the fifth aspect. The means may be the network slice selection device in the fifth aspect or a chip or a function module inside the network slice selection device. The steps or functions may be implemented by software, hardware, or a combination of hardware and software.

According to a twenty-first aspect, a handover apparatus is provided, and includes: a receiving unit, configured to receive an identifier of a session sent by a core network device, where the session is a session that is of a terminal device and that needs to be handed over from a source access network device to a target access network device; a processing unit, configured to determine second single network slice selection assistance information S-NSSAI based on the identifier of the session, where the second S-NSSAI is S-NSSAI that is of a network slice in the source access network device and that corresponds to the identifier of the session, where the processing unit is further configured to determine first S-NSSAI based on the second S-NSSAI, where a network slice that is in the target access network device and that corresponds to the first S-NSSAI serves the session; and a sending unit, configured to send the first S-NSSAI to the core network device.

The handover apparatus provided in the twenty-first aspect may be configured to perform operations of the network slice selection device in the sixth aspect or any possible implementation of the sixth aspect. Specifically, the handover apparatus includes a corresponding means (means) configured to perform the steps or functions described in the sixth aspect or any possible implementation of the sixth aspect. The means may be the network slice selection device in the sixth aspect or a chip or a function module inside the network slice selection device. The steps or functions may be implemented by software, hardware, or a combination of hardware and software.

According to a twenty-second aspect, a handover apparatus is provided, and includes: a receiving unit, configured to receive a handover request message sent by a source access network device, where the handover request message includes an identifier of a session, and the session is a session that is of a terminal device and that needs to be handed over from the source access network device to a target access network device; a processing unit, configured to determine first S-NSSAI based on second S-NSSAI corresponding to the identifier of the session and a network slice supported by the target access network device, where a network slice that is in the target access network device and that corresponds to the first S-NSSAI serves the session, and the second S-NSSAI is S-NSSAI corresponding to the identifier of the session in the source access network device; and a sending unit, configured to send a path switch request message to a core network device, where the path switch request message includes the first S-NSSAI.

With reference to the twenty-second aspect, in some embodiments of the twenty-second aspect, the path switch request message further includes the second S-NSSAI.

With reference to the twenty-second aspect, in some embodiments of the twenty-second aspect, the processing unit is further configured to determine the first S-NSSAI based on the second S-NSSAI and a mapping relationship, where the mapping relationship is a correspondence between S-NSSAI of a network slice in the source access network device and S-NSSAI of a network slice in the target access network device; or the processing unit is further configured to determine the first S-NSSAI, where the network slice that is in the target access network device and that corresponds to the first S-NSSAI serves all sessions that need to be handed over from the source access network device to the target access network device.

With reference to the twenty-second aspect, in some embodiments of the twenty-second aspect, the receiving unit is further configured to receive configuration information sent by a management device, where the configuration information includes the first S-NSSAI, and the network slice that is in the target access network device and that corresponds to the first S-NSSAI serves all sessions that need to be handed over from the source access network device to the target access network device; or the receiving unit is further configured to receive configuration information sent by a management device, where the configuration information includes a mapping relationship and S-NSSAI of a network slice in the target access network device, and the mapping relationship is a correspondence between S-NSSAI of a network slice in the source access network device and the S-NSSAI of the network slice in the target access network device.

With reference to the twenty-second aspect, in some embodiments of the twenty-second aspect, the receiving unit is further configured to receive an interface setup response message sent by the core network device, where the interface setup response message includes the first S-NSSAI, and the network slice that is in the target access network device and that corresponds to the first S-NSSAI serves all the sessions that need to be handed over from the source access network device to the target access network device; or the interface setup response message includes the mapping relationship and the S-NSSAI of the network slice in the target access network device, where the mapping relationship is the correspondence between the S-NSSAI of the network slice in the source access network device and the S-NSSAI of the network slice in the target access network device.

With reference to the twenty-second aspect, in some embodiments of the twenty-second aspect, before the terminal device is handed over from the source access network device to the target access network device, the terminal device hands over from the target access network device to the source access network device. The path switch request message further includes third S-NSSAI, and the third S-NSSAI is S-NSSAI of a network slice that is in the target access network device and that serves the session when the session is handed over from the target access network device to the source access network device.

With reference to the twenty-second aspect, in some embodiments of the twenty-second aspect, the path switch request message further includes first indication information, and the first indication information is used to indicate a type of the handover of the terminal device from the source access network device to the target access network device.

With reference to the twenty-second aspect, in some embodiments of the twenty-second aspect, the source access network device supports a non-standalone NSA non-public network NPN, and the target access network device supports a land public mobile network PLMN; or the target access network device supports an NSA NPN, and the source access network device supports a PLMN.

The handover apparatus provided in the twenty-second aspect and any possible implementation of the twenty-second aspect may be configured to perform operations of the target access network device in the seventh aspect and any possible implementation of the seventh aspect. Specifically, the handover apparatus includes a corresponding means (means) configured to perform the steps or functions described in the seventh aspect or any possible implementation of the seventh aspect. The means may be the target access network device in the seventh aspect or a chip or a function module inside the target access network device. The steps or functions may be implemented by software, hardware, or a combination of hardware and software.

According to a twenty-third aspect, a handover apparatus is provided, and includes: a sending unit, configured to send a handover request message to a target access network device, where the handover request message includes an identifier of a session, the session is a session that is of a terminal device and that needs to be handed over from a source access network device to the target access network device, and second single network slice selection assistance information S-NSSAI corresponding to the identifier of the session is S-NSSAI of a network slice that is in the source access network device and that serves the session; and a receiving unit, configured to receive a handover request response message sent by the target access network device, where the handover request response message is used to indicate the terminal device to be handed over from the source access network device to the target access network device, and S-NSSAI of a network slice that is in the target access network device and that serves the session is first S-NSSAI.

With reference to the twenty-third aspect, in some embodiments of the twenty-third aspect, the handover request message further includes the second S-NSSAI.

With reference to the twenty-third aspect, in some embodiments of the twenty-third aspect, before the terminal device is handed over from the source access network device to the target access network device, the terminal device hands over from the target access network device to the source access network device. The handover request message further includes third S-NSSAI, and the third S-NSSAI is S-NSSAI of a network slice that is in the target access network device and that serves the session when the session is handed over from the target access network device to the source access network device.

With reference to the twenty-third aspect, in some embodiments of the twenty-third aspect, the handover request message further includes first indication information, and the first indication information is used to indicate a type of the handover of the terminal device from the source access network device to the target access network device.

With reference to the twenty-third aspect, in some embodiments of the twenty-third aspect, the source access network device supports a non-standalone NSA non-public network NPN, and the target access network device supports a land public mobile network PLMN; or the target access network device supports an NSA NPN, and the source access network device supports a PLMN.

The handover apparatus provided in the twenty-third aspect and any possible implementation of the twenty-third aspect may be configured to perform operations of the source access network device in the eighth aspect and any possible implementation of the eighth aspect. Specifically, the handover apparatus includes a corresponding means (means) configured to perform the steps or functions described in the eighth aspect or any possible implementation of the eighth aspect. The means may be the source access network device in the eighth aspect or a chip or a function module inside the source access network device. The steps or functions may be implemented by software, hardware, or a combination of hardware and software.

According to a twenty-fourth aspect, a handover apparatus is provided, and includes: a receiving unit, configured to receive a path switch request message sent by a target access network device, where the path switch request message includes first S-NSSAI, the first S-NSSAI is determined based on second S-NSSAI and a network slice supported by the target access network device, a network slice that is in the target access network device and that corresponds to the first S-NSSAI serves a session, the second S-NSSAI is S-NSSAI that is of a network slice in a source access network device and that corresponds to an identifier of the session, and the session is a session that is of a terminal device and that needs to be handed over from the source access network device to the target access network device; and a sending unit, configured to send a path switch request response message to the target access network device, where the path switch request response message is used to indicate that a downlink transmission path changes.

With reference to the twenty-fourth aspect, in some embodiments of the twenty-fourth aspect, the path switch request message further includes the second S-NSSAI.

With reference to the twenty-fourth aspect, in some embodiments of the twenty-fourth aspect, the receiving unit is further configured to receive an interface setup request message sent by the target access network device, where the interface setup request message includes the first S-NSSAI, and the network slice that is in the target access network device and that corresponds to the first S-NSSAI serves all the sessions that need to be handed over from the source access network device to the target access network device; or the interface setup request message includes a mapping relationship and S-NSSAI of a network slice in the target access network device, where the mapping relationship is a correspondence between S-NSSAI of a network slice in the source access network device and the S-NSSAI of the network slice in the target access network device.

With reference to the twenty-fourth aspect, in some embodiments of the twenty-fourth aspect, the processing unit is configured to determine the first S-NSSAI based on a preset policy, where the network slice that is in the target access network device and that corresponds to the first S-NSSAI serves all the sessions that need to be handed over from the source access network device to the target access network device; or the processing unit is configured to determine the mapping relationship and the S-NSSAI of the network slice in the target access network device based on a preset policy, where the mapping relationship is the correspondence between the S-NSSAI of the network slice in the source access network device and the S-NSSAI of the network slice in the target access network device.

With reference to the twenty-fourth aspect, in some embodiments of the twenty-fourth aspect, the sending unit is further configured to send an interface setup response message to the target access network device, where the interface setup request message includes the first S-NSSAI, or the interface setup response message includes the mapping relationship and the S-NSSAI of the network slice in the target access network device.

With reference to the twenty-fourth aspect, in some embodiments of the twenty-fourth aspect, the path switch request message further includes second indication information, and the second indication information is used to indicate that the handover request is from the first network device.

With reference to the twenty-fourth aspect, in some embodiments of the twenty-fourth aspect, the source access network device supports a non-standalone NSA non-public network NPN, and the target access network device supports a land public mobile network PLMN; or the target access network device supports an NSA NPN, and the source access network device supports a PLMN.

According to the handover apparatus provided in at least this embodiment of this application, one of the source access network device and the target access network device supports an NSA NPN, and the other supports a PLMN. In other words, in at least this embodiment of this application, the terminal device is handed over between an NSA NPN cell and a PLMN cell.

The handover apparatus provided in the twenty-fourth aspect and any possible implementation of the twenty-fourth aspect may be configured to perform operations of the core network device in the ninth aspect and any possible implementation of the ninth aspect. Specifically, the handover apparatus includes a corresponding means (means) configured to perform the steps or functions described in the ninth aspect or any possible implementation of the ninth aspect. The means may be the core network device in the ninth aspect or a chip or a function module inside the core network device. The steps or functions may be implemented by software, hardware, or a combination of hardware and software.

According to a twenty-fifth aspect, a handover apparatus is provided, and includes: a processing unit, configured to determine first single network slice selection assistance information S-NSSAI based on a preset policy, where a network slice that is in a target access network device and that corresponds to the first S-NSSAI serves all sessions that need to be handed over from a source access network device to the target access network device. The processing unit is alternatively configured to determine a mapping relationship and S-NSSAI of a network slice in a target access network device based on a preset policy, where the mapping relationship is a correspondence between S-NSSAI of a network slice in a source access network device and the S-NSSAI of the network slice in the target access network device.

With reference to the twenty-fifth aspect, in some embodiments of the twenty-fifth aspect, the apparatus further includes a sending unit, configured to send configuration information to the target access network device, where the configuration information includes the first S-NSSAI, or the configuration information includes the mapping relationship and the S-NSSAI of the network slice in the target access network device.

The handover apparatus provided in the twenty-fifth aspect and any possible implementation of the twenty-fifth aspect may be configured to perform operations of the management device in the tenth aspect and any possible implementation of the tenth aspect. Specifically, the handover apparatus includes a corresponding means (means) configured to perform the steps or functions described in the tenth aspect or any possible implementation of the tenth aspect. The means may be the management device in the tenth aspect or a chip or a function module inside the management device. The steps or functions may be implemented by software, hardware, or a combination of hardware and software.

According to a twenty-sixth aspect, a handover apparatus is provided, and includes: a receiving unit, configured to receive an interface setup request message sent by a target access network device, where the interface setup request message includes first single network slice selection assistance information S-NSSAI, and a network slice that is in the target access network device and that corresponds to the first S-NSSAI serves all sessions that need to be handed over from a source access network device to the target access network device; or the interface setup request message includes a mapping relationship and S-NSSAI of a network slice in the target access network device, where the mapping relationship is a correspondence between S-NSSAI of a network slice in a source access network device and the S-NSSAI of the network slice in the target access network device.

The handover apparatus provided in the twenty-sixth aspect and any possible implementation of the twenty-sixth aspect may be configured to perform operations of the core network device in the eleventh aspect and any possible implementation of the eleventh aspect. Specifically, the handover apparatus includes a corresponding means (means) configured to perform the steps or functions described in the eleventh aspect or any possible implementation of the eleventh aspect. The means may be the core network device in the eleventh aspect or a chip or a function module inside the core network device. The steps or functions may be implemented by software, hardware, or a combination of hardware and software.

According to a twenty-seventh aspect, a handover apparatus is provided, and includes: a receiving unit, configured to receive configuration information sent by a management device, where the configuration information includes first S-NSSAI, and a network slice that is in a target access network device and that corresponds to the first S-NSSAI serves all sessions that need to be handed over from a source access network device to the target access network device. The receiving unit is alternatively configured to receive configuration information sent by a management device, where the configuration information includes a mapping relationship and S-NSSAI of a network slice in a target access network device, and the mapping relationship is a correspondence between S-NSSAI of a network slice in a source access network device and the S-NSSAI of the network slice in the target access network device.

With reference to the twenty-seventh aspect, in some embodiments of the twenty-seventh aspect, the apparatus further includes a sending unit, configured to send an interface setup request message to a core network device, where the interface setup request message includes the first S-NSSAI, or the interface setup request message includes the mapping relationship and the S-NSSAI of the network slice in the target access network device.

The handover apparatus provided in the twenty-seventh aspect and any possible implementation of the twenty-seventh aspect may be configured to perform operations of the target access network device in the twelfth aspect and any possible implementation of the twelfth aspect. Specifically, the handover apparatus includes a corresponding means (means) configured to perform the steps or functions described in the twelfth aspect or any possible implementation of the twelfth aspect. The means may be the target access network device in the twelfth aspect or a chip or a function module inside the target access network device. The steps or functions may be implemented by software, hardware, or a combination of hardware and software.

According to a twenty-eighth aspect, a handover apparatus is provided, and includes: a processing unit, configured to determine first single network slice selection assistance information S-NSSAI based on a preset policy, where a network slice that is in a target access network device and that corresponds to the first S-NSSAI serves all sessions that need to be handed over from a source access network device to the target access network device. The processing unit is alternatively configured to determine a mapping relationship and S-NSSAI of a network slice in a target access network device based on a preset policy, where the mapping relationship is a correspondence between S-NSSAI of a network slice in a source access network device and the S-NSSAI of the network slice in the target access network device.

With reference to the twenty-eighth aspect, in some embodiments of the twenty-eighth aspect, the apparatus further includes a sending unit, configured to send configuration information to the target access network device, where the configuration information includes the first S-NSSAI, or the configuration information includes the mapping relationship and the S-NSSAI of the network slice in the target access network device.

The handover apparatus provided in the twenty-eighth aspect and any possible implementation of the twenty-eighth aspect may be configured to perform operations of the management device in the thirteenth aspect and any possible implementation of the thirteenth aspect. Specifically, the handover apparatus includes a corresponding means (means) configured to perform the steps or functions described in the thirteenth aspect or any possible implementation of the thirteenth aspect. The means may be the management device in the thirteenth aspect or a chip or a function module inside the management device. The steps or functions may be implemented by software, hardware, or a combination of hardware and software.

According to a twenty-ninth aspect, a handover apparatus is provided, and includes: a processing unit, configured to determine first S-NSSAI based on a preset policy, where a network slice that is in a target access network device and that corresponds to the first S-NSSAI serves all sessions that need to be handed over from a source access network device to the target access network device. The processing unit is alternatively configured to determine a mapping relationship and S-NSSAI of a network slice in a target access network device based on a preset policy, where the mapping relationship is a correspondence between S-NSSAI of a network slice in a source access network device and the S-NSSAI of the network slice in the target access network device.

With reference to the twenty-ninth aspect, in some embodiments of the twenty-ninth aspect, the apparatus further includes a sending unit, configured to send an interface setup response message to the target access network device, where the interface setup request message includes the first S-NSSAI, or the interface setup response message includes the mapping relationship and the S-NSSAI of the network slice in the target access network device.

The handover apparatus provided in the twenty-ninth aspect and any possible implementation of the twenty-ninth aspect may be configured to perform operations of the core network device in the fourteenth aspect and any possible implementation of the fourteenth aspect. Specifically, the handover apparatus includes a corresponding means (means) configured to perform the steps or functions described in the fourteenth aspect or any possible implementation of the fourteenth aspect. The means may be the core network device in the fourteenth aspect or a chip or a function module inside the core network device. The steps or functions may be implemented by software, hardware, or a combination of hardware and software.

According to a thirtieth aspect, a handover apparatus is provided, and includes: a receiving unit, configured to receive an interface setup response message sent by a core network device, where the interface setup response message includes first S-NSSAI, and a network slice that is in a target access network device and that corresponds to the first S-NSSAI serves all sessions that need to be handed over from a source access network device to the target access network device. The receiving unit is alternatively configured to receive an interface setup response message sent by a core network device, where the interface setup response message includes a mapping relationship and S-NSSAI of a network slice in a target access network device, and the mapping relationship is a correspondence between S-NSSAI of a network slice in a source access network device and the S-NSSAI of the network slice in the target access network device.

The handover apparatus provided in the thirtieth aspect and any possible implementation of the thirtieth aspect may be configured to perform operations of the target access network device in the fifteenth aspect and any possible implementation of the fifteenth aspect. Specifically, the handover apparatus includes a corresponding means (means) configured to perform the steps or functions described in the fifteenth aspect or any possible implementation of the fifteenth aspect. The means may be the target access network device in the fifteenth aspect or a chip or a function module inside the target access network device. The steps or functions may be implemented by software, hardware, or a combination of hardware and software.

According to a thirty-first aspect, a communication device is provided, and includes a processor, a transceiver, and a memory. The memory is configured to store a computer program. The transceiver is configured to perform the receiving and sending steps in the handover method according to any one of the possible embodiments of the first to the fifteenth aspects. The processor is configured to invoke the computer program from the memory and run the computer program, to enable the communication device to perform the handover method according to any one of the possible embodiments of the first to the fifteenth aspects.

Optionally, there are one or more processors, and there are one or more memories.

Optionally, the memory may be integrated with the processor, or the memory and the processor are separately disposed.

Optionally, the transceiver may include a transmitter (transmitter) and a receiver (receiver).

In a possible design, a communication device is provided. The communication device includes a transceiver, a processor, and a memory. The processor is configured to control the transceiver to send and receive a signal, the memory is configured to store a computer program, and the processor is configured to invoke the computer program from the memory and run the computer program, to enable the communication device to perform the method in any one of the first aspect, the ninth aspect, the eleventh aspect, the fourteenth aspect, and the possible embodiments of the first aspect, the ninth aspect, the eleventh aspect, and the fourteenth aspect.

In another possible design, a communication device is provided. The communication device includes a transceiver, a processor, and a memory. The processor is configured to control the transceiver to send and receive a signal, the memory is configured to store a computer program, and the processor is configured to invoke the computer program from the memory and run the computer program, to enable the communication device to perform the method in any one of the second aspect, the eighth aspect, and the possible embodiments of the second aspect and the eighth aspect.

In still another possible design, a communication device is provided. The communication device includes a transceiver, a processor, and a memory. The processor is configured to control the transceiver to send and receive a signal, the memory is configured to store a computer program, and the processor is configured to invoke the computer program from the memory and run the computer program, to enable the communication device to perform the method in any one of the third aspect, the seventh aspect, the twelfth aspect, and the fifteenth aspect, and the possible embodiments of the third aspect, the seventh aspect, the twelfth aspect, and the fifteenth aspect.

In still another possible design, a communication device is provided. The communication device includes a transceiver, a processor, and a memory. The processor is configured to control the transceiver to send and receive a signal, the memory is configured to store a computer program, and the processor is configured to invoke the computer program from the memory and run the computer program, to enable the communication device to perform the method in any one of the fourth aspect, the tenth aspect, and the thirteenth aspect, and the possible embodiments of the fourth aspect, the tenth aspect, and the thirteenth aspect.

In still another possible design, a communication device is provided. The communication device includes a transceiver, a processor, and a memory. The processor is configured to control the transceiver to send and receive a signal, the memory is configured to store a computer program, and the processor is configured to invoke the computer program from the memory and run the computer program, to enable the communication device to perform the method in any one of the fifth aspect, the sixth aspect, and the possible embodiments of the fifth aspect and the sixth aspect.

According to a thirty-second aspect, a system is provided. The system includes the handover apparatus provided in the sixteenth aspect to the thirtieth aspect.

According to a thirty-third aspect, a computer program product is provided. The computer program product includes a computer program (which may also be referred to as code or instructions). When the computer program is run, a computer is enabled to perform the method in any one of the possible embodiments of the first aspect to the fifteenth aspect.

According to a thirty-fourth aspect, a computer-readable medium is provided. The computer-readable medium stores a computer program (which may also be referred to as code or instructions). When the computer program is run on a computer, the computer is enabled to perform the method in any one of the possible embodiments of the first aspect to the fifteenth aspect.

According to a thirty-fifth aspect, a chip system is provided, and includes a memory and a processor. The memory is configured to store a computer program. The processor is configured to invoke the computer program from the memory and run the computer program, so that a communication device on which the chip system is installed performs the method in any one of the possible embodiments of the first aspect to the fifteenth aspect.

DESCRIPTION OF EMBODIMENTS

Figure 1:
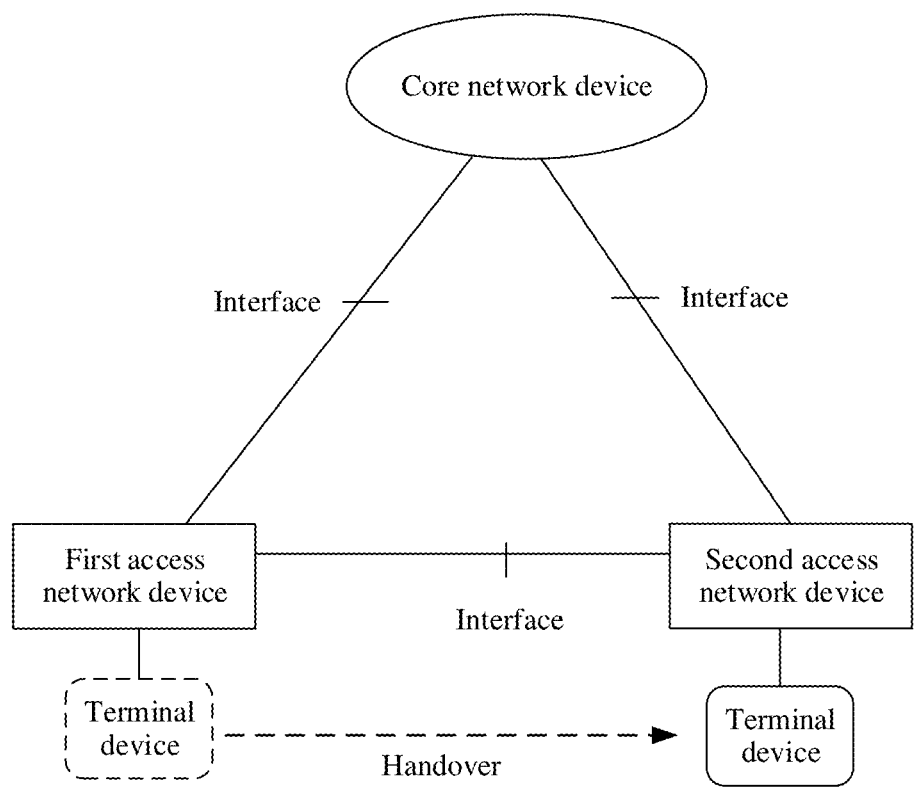
FIG. 1 is a schematic diagram of a communication system 100 to which a handover method according to an embodiment of this application is applicable.

The following describes technical solutions of this application with reference to accompanying drawings.

The technical solutions in the embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system. A 5G mobile communication system in this application includes a non-standalone (NSA) 5G mobile communication system or a standalone (SA) 5G mobile communication system. The technical solutions provided in this application may be further applicable to future communication systems, for example, a sixth generation mobile communication system. Alternatively, the communication system may be a public land mobile network (PLMN), a device-to-device (D2D) communication system, a machine-to-machine (M2M) communication system, an internet of things (IoT) communication system, or another communication system.

A terminal device in the embodiments of this application may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

By way of example rather than limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of the user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device in the embodiments of this application may alternatively be user equipment in an IoT system. IoT is an important part of future development of information technologies. A main technical feature of the IoT is connecting a thing to a network by using a communication technology, to implement an intelligent network for interconnection between a person and a machine or between one thing and another. In the embodiments of this application, an IoT technology may implement massive connections, deep coverage, and terminal power saving by using, for example, a narrowband (NB) technology.

A network device in the embodiments of this application may be any communication device that has a wireless transceiver function and that is configured to communicate with a terminal device. The network device includes but is not limited to an evolved NodeB (eNB), a radio network controller (RNC), a NodeB (NB), a base station controller (BSC), a base transceiver station (BTS), a home base station (a home evolved NodeB, or a home Node B, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (DU), that constitutes a gNB or a transmission point.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (RAN), or may be classified as a network device in a core network (CN). This is not limited in this application. It should be understood that this application mainly describes an access network device, which may be a network device in an NR system or a network device in an LTE system.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a function module that is in the terminal device or the network device and that can invoke and execute the program.

In addition, each aspect or feature of this application may be implemented as a method, an apparatus or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

FIG. 1 is a schematic diagram of a communication system 100 to which a handover method according to an embodiment of this application is applicable. In the schematic diagram, a core network device, a first access network device, a second access network device, and a terminal device are included. The handover method in the embodiments of this application mainly relates to an access and mobility management function (access and mobility management function, AMF) network element in a core network. The AMF network element can provide a function such as mobility management for the terminal device. The AMF network element may also be referred to as an AMF. In addition, the handover method in the embodiments of this application may be applied to handover of the terminal device between an NPN cell and a PLMN cell in an NSA network architecture. When the handover refers to handover from the NPN cell to the PLMN cell, in FIG. 1, the first access network device may be an access network device in the NPN cell, and the second access network device may be an access network device in the PLMN cell. When the handover refers to handover from the PLMN cell to the NPN cell, in FIG. 1, the first access network device may be an access network device in the PLMN cell, and the second access network device may be an access network device in the NPN cell. The radio access network device in this application may include a network device in a 5G communication system or a network device in an LTE communication system. This is not limited in this application. In FIG. 1, there is an interface between the AMF and an access network device, such as an N2 interface, an NG interface, or another interface. This is not limited in this application. An interface exists between the first access network device and the second access network device, which provides a basis for implementing handover of the terminal device between the first access network device and the second access network device.

It should be understood that FIG. 1 is merely a diagram of a scenario to which the handover method provided in the embodiments of this application can be applied, and does not constitute any limitation on the protection scope of this application. The handover method provided in the embodiments of this application may be applied to scenarios such as handover of a terminal device from a PLMN cell to an NPN cell or handover of a terminal device from an NPN cell to a PLMN cell. The scenarios are not enumerated herein one by one.

It should be further understood that the first access network device in FIG. 1 may support both an NPN cell and a PLMN cell, and similarly, the second access network device may support both an NPN cell and a PLMN cell. As shown in FIG. 1, when the terminal device is handed over from the first access network device to the second access network device, this application mainly relates to handover of the terminal device between an NPN cell and a PLMN cell, and imposes no limitation on whether a first access network device corresponding to the NPN cell supports another PLMN cell. In other words, handover in this application refers to handover of the terminal device from one access network device to another access network device, and is handover from an NPN cell of one access network device to a PLMN cell of another access network device, or handover from a PLMN cell of one access network device to an NPN cell of another access network device.

To facilitate understanding of the handover method provided in the embodiments of this application, the following briefly describes several basic concepts in the embodiments of this application.

1. Network Slice Selection Assistance Information (NSSAI)

NSSAI may be standard-defined information, or may be information privately defined in a PLMN. One piece of NSSAI includes a plurality of pieces of single network slice selection assistance information (S-NSSAI), and each piece of S-NSSAI may correspond to a specific network slice. The access network device routes initial access of a terminal device to an AMF based on the NSSAI.

2. S-NSSAI

Figure 2:
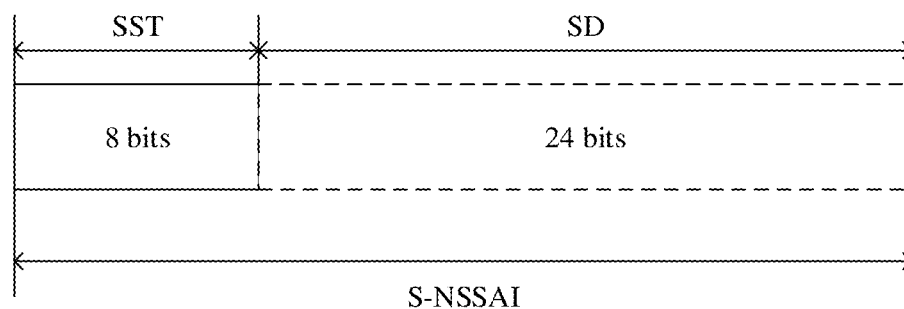
FIG. 2 is a schematic diagram of a structure of S-NSSAI.

S-NSSAI is used to identify a network slice (slice). It should be understood that a network slice is identified by using S-NSSAI. A structure of the S-NSSAI is shown in FIG. 2. FIG. 2 is a schematic diagram of a structure of the S-NSSAI, and the structure may include two parts:

(1) Slice/service type (SST): The SST refers to a function and a service that can be provided by a network slice. According to a protocol, 0 to 127 is a standard value range of the SST, and 128 to 255 is a value range defined by operators.

(2) Network slice differentiator (SD): The SD is optional information, is used as supplementary information of the SST in the S-NSSAI, and is used to distinguish a plurality of network slices having a same SST. Specifically, the SD is used to select a network slice instance (NSI), and is used as supplementary information of the SST. When the SST points to a plurality of NSIs, the SD may further distinguish these NSIs.

For ease of understanding, FIG. 2 uses an example in which a length of the SST is one byte and a length of the SD is three bytes to describe the structure of the S-NSSAI. It should be understood that FIG. 2 merely describes the structure of the S-NSSAI by using an example, and does not constitute any limitation on the protection scope of this application.

3. Target Identifier (Target ID)

A target identifier is used to identify a target for handover (identifies the target for the handover). For example, the target is a target access network device or a target cell. The target identifier may have the following forms: a network device identifier, for example, a global network device identifier (Global eNB-ID) (which may further include a selected tracking area indication (TAI)); a cell identifier, for example, a physical cell ID (PCI) or a cell global identifier (GCI Cell ID); a CU identifier; a DU identifier; and the like. A specific form of the target identifier is not limited in the embodiments of this application, and may be any identifier that can identify the target access network device or the target cell. Details are not described herein again.

4. Tracking Area (Tracking Area, TA)

One TA includes one or more cells. If a TA includes a plurality of cells, the plurality of cells may belong to one network device, or may belong to a plurality of network devices.

5. Registration Area (Registration Area, RA)

One RA includes one or more TAs. If a terminal device moves out of coverage of an RA, the terminal device triggers a registration area update process.

6. Allowed Network Slice (Allowed NSSAI)

The allowed NSSAI is network slice identification information allocated by a core network to a terminal device during registration area update or initial access of the terminal device, and indicates a service that can be initiated by the terminal device in a current registration area, that is, a network slice to which a session that can be initiated belongs is only in the allowed NSSAI.

7. Closed Access Group (CAG)

If a network device or a cell belongs to a closed access group, only a terminal device registered with the closed access group can access a network. In other words, only the terminal device registered with the closed access group can be served by the cell. Different CAGs correspond to different CAG identifiers (identify, ID). It may be understood that, for a special user such a user having an emergency call service, if a terminal initiating the emergency call service is not a terminal device registered with the closed access group, the terminal may also access the network, for example, may be served with a low priority. This is not specifically limited herein. It should be understood that the closed access group in the embodiments of this application is merely a general name, indicating that only a specific user can access the network. The closed access group in the embodiments of this application is merely an example, and does not constitute any limitation on the protection scope of this application. The closed access group in the embodiments of this application may alternatively be another name, for example, a closed subscribe group (closed subscribe group, CSG). This is not limited herein.

The foregoing briefly describes a scenario to which the handover method provided in the embodiments of this application can be applied, and several basic concepts used in the embodiments of this application. Further, to facilitate improvement of the handover method provided in the embodiments of this application, before the handover method provided in the embodiments of this application is described, a procedure and a disadvantage of the handover method are first briefly described.

To prevent a terminal device not in an NPN from accessing the NPN, a network device in the NPN broadcasts a CAG identifier, so that the terminal device not in the NPN chooses not to access the NPN. The NPN in this application is an NPN in an NSA architecture. For brevity of description, the NPN is directly used below.

According to a definition in a current protocol, a cell is either an NPN cell or a PLMN cell. Specifically, S-NSSAI corresponding to the NPN is different from S-NSSAI corresponding to a PLMN. In a current network slicing mechanism, if a target access network device does not support a slice of a source access network device, when the terminal device is handed over between the target access network device and the source access network device, a session corresponding to the slice in sessions performed by the terminal device is terminated. For example, the terminal device is handed over from a network device 1 to a network device 2. It is assumed that the network device 1 supports network slices A and B, the network device 2 supports network slices B and C, and the terminal device is performing two sessions in the network device 1, which are a session 1 and a session 2, where the session 1 corresponds to the network slice A, and the session 2 corresponds to the network slice B. In the process in which the terminal is handed over from the network device 1 to the network device 2, both the session 1 and the session 2 need to be handed over. However, because the network device 2 does not support the network slice A, if an existing solution is used for the session 1, the handover of session 1 is rejected by the network device 2. Corresponding to the NPN, a network slice corresponding to the NPN is different from a network slice of an operator (a PLMN). Therefore, handover from an NPN cell to a PLMN cell may cause a session to be rejected, and session continuity cannot be supported.

It can be learned from the foregoing description that the network slice corresponding to the NPN in the NSA architecture is different from the network slice corresponding to the PLMN. Therefore, when the terminal device is handed over between an NPN cell and a PLMN cell in the NSA architecture, an ongoing session of the terminal device may be rejected by a target cell, affecting session continuity. To ensure session continuity during handover between an NPN cell and a PLMN cell, the embodiments of this application provide a handover method. A target network device learns of S-NSSAI of a network slice that is of a session in a source access network device and that is supported by the target network device, and/or an AMF learns of the S-NSSAI of the network slice that is of the session in the source access network device and that is supported by the target network device, so that the target network device and the AMF configure a network slice in the target network device for the session in the source access network device when the terminal device is handed over from the source access network device to the target network device, to ensure session continuity.

The following describes in detail, from a perspective of signaling interaction, the handover method provided in the embodiments of this application with reference to FIG. 3A to FIG. 7.

Figure 3A:
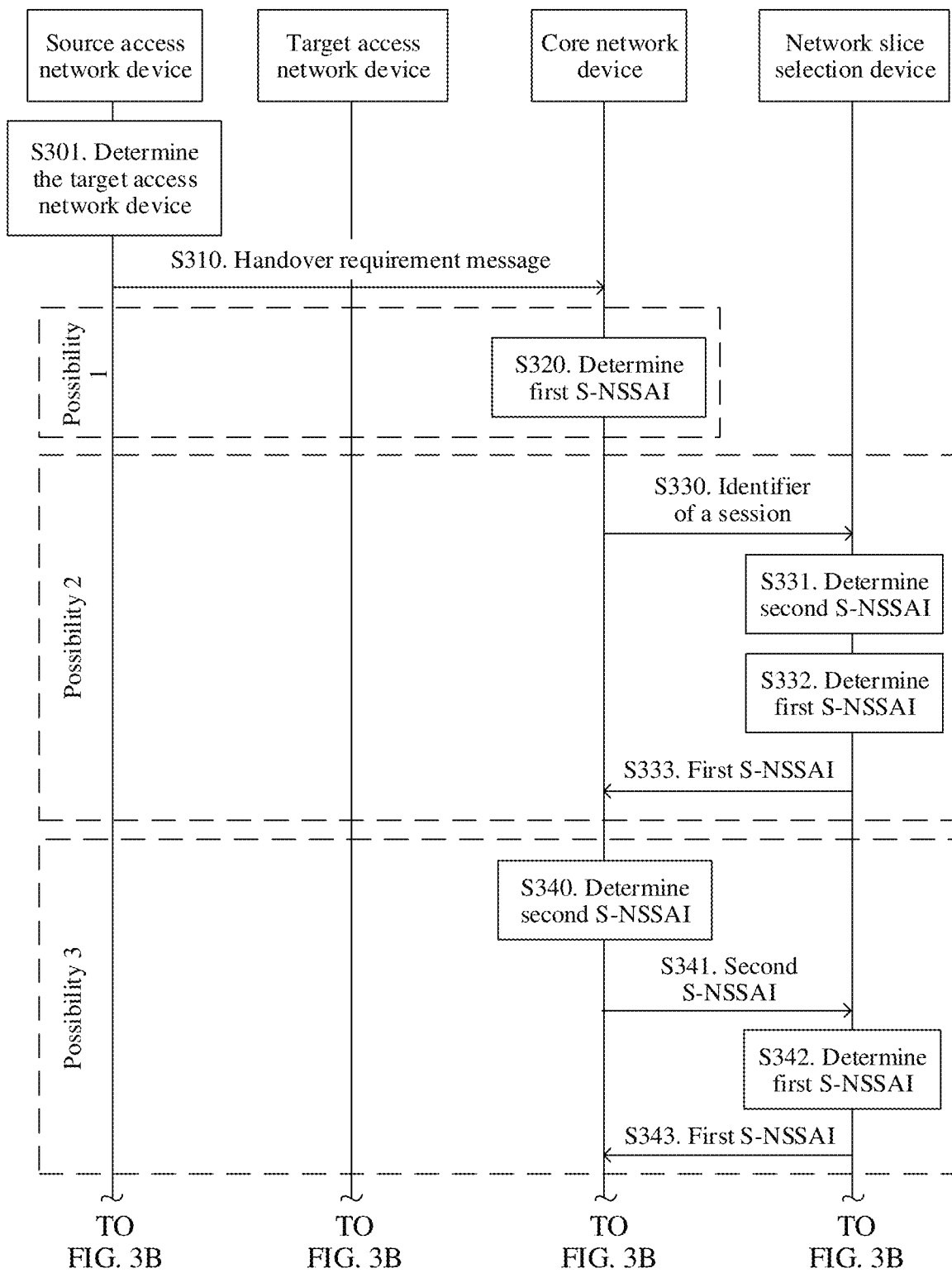
FIG. 3A and FIG. 3B are a schematic flowchart of a handover method according to an embodiment of this application.
Figure 3B:
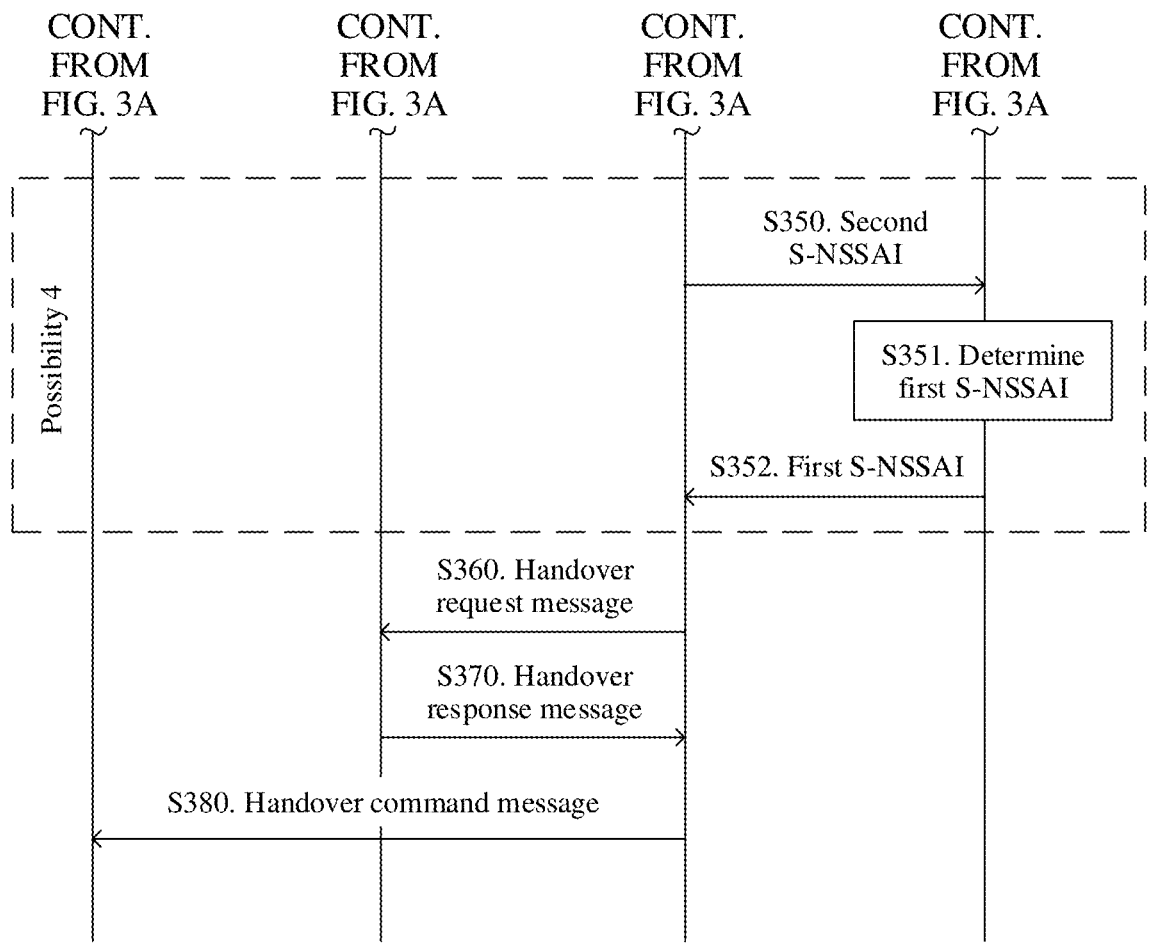

FIG. 3A and FIG. 3B are a schematic flowchart of a handover method according to an embodiment of this application. The procedure involves a source access network device, a target access network device, and a core network device. The source access network device is an access network device connected to a terminal device before the terminal device performs cell handover, and may be referred to as the source access network device. The target access network device is an access network device that needs to be connected to the terminal device after the terminal device performs cell handover, and may be referred to as the target network device. Before the terminal device is handed over, a network slice in the source access network device serves a session of the terminal device. After the terminal device is handed over, a network slice in the target access network device serves the session of the terminal device.

The handover method provided in this application may be applied to a scenario of handover between an NPN cell and a PLMN cell. The source access network device may be an access network device in the NPN cell, and the target access network device may be an access network device in the PLMN cell; the target access network device may be an access network device in the NPN cell, and the source access network device may be an access network device in the PLMN cell; the source access network device supports both an NPN and a PLMN, and the target access network device supports only the NPN; or the source access network device supports only the NPN, and the target access network device supports both the NPN and the PLMN.

It should be understood that the handover method provided in this application may be further applied to a dual-connectivity scenario. For example, after establishing a connection to the source access network device, the terminal device needs to establish a connection to the target access network device. Optionally, the source access network device may be an access network device in an NPN cell, and the target access network device may be an access network device in a PLMN cell. In this case, some sessions of the terminal device need to be handed over to the target access network device, and the target access network device serves the sessions. In this case, in a session handover process, the handover method provided in this application may be used, to maintain session continuity.

The core network device in this application includes a core network control plane device, which may be an AMF in a core network, or another apparatus that can implement a function of the AMF in at least this embodiment.

It should be understood that the handover method provided in at least this embodiment of this application involves signaling interaction between the source access network device, the target access network device, and the core network device. For signaling between a network device and the terminal device, refer to a specification in an existing protocol. This application does not involve improvements in this part. Therefore, FIG. 3A and FIG. 3B do not show the terminal device.

It should be further understood that the NPN in at least this embodiment of this application is an NPN in an NSA architecture. For ease of description, the NPN in the NSA architecture may be briefly described as an NPN in the method procedure in at least this embodiment of this application.

The handover method includes the following steps.

S310. The source access network device sends a handover requirement (handover required) message to the core network device.

The handover requirement message may include an identifier of a session, and the session is a session that is of the terminal device and that needs to be handed over from the source access network device to the target access network device.

It should be understood that when the terminal device is handed over from the source access network device to the target access network device, the terminal device may perform a plurality of sessions, and all of the plurality of sessions need to change from being served by the source access network device to being served by the target access network device. For ease of description, a session that is of the terminal device and that needs to be handed over is used as an example for description in this application. When the foregoing handover occurs, a processing procedure of another session is similar to that of the foregoing session, and details are not described in this application.

Specifically, the handover requirement message further includes a target identifier. The target identifier is used to identify a handover target. In the embodiment shown in FIG. 3A and FIG. 3B, the target identifier is used by the core network device to determine the target access network device. Optionally, the target identifier is an identifier of a target cell to which the terminal device performs cell handover. For example, the target identifier is a physical cell ID, the target identifier is a global cell ID, or the target identifier is a global network device identifier of the target access network device.

It should be understood that, before the source access network device sends the handover requirement message to the core network device, the method procedure in FIG. 3A and FIG. 3B further includes: S301. The source access network device determines the target access network device. For example, the source access network device determines the target access network device based on mapping information. After determining the target access network device, the source access network device can learn of the target identifier, add the target identifier to the handover requirement message, and send the handover requirement message to the core network device, so that the core network device can determine the target access network device based on the target identifier.

A possible manner in which the source access network device determines the target access network device based on the mapping information is as follows: The source access network device determines, based on a mapping relationship between S-NSSAI of a network slice supported by the source access network device and S-NSSAI of a network slice supported by the target access network device and based on S-NSSAI of a corresponding network slice that serves the current session of the terminal device and that is in a cell served by the source access network device and the mapping relationship, whether another network device supports a network slice whose S-NSSAI and the S-NSSAI of the current network slice meet the mapping relationship, to determine which network devices or which network device that may be used as the target access network device.

Another possible manner is as follows: The source access network device determines, based on a mapping relationship between S-NSSAI of a network slice supported by the source access network device and an ID of a CAG to which a cell served by the target access network device belongs and based on S-NSSAI of a current network slice that serves the terminal device and the mapping relationship, whether a cell served by another network device belongs to a CAG whose ID and the current network slice that meet the mapping relationship, to determine which network devices or which network device that may be used as the target access network device.

Another manner is as follows: The source access network device determines, based on a mapping relationship between an ID of a CAG of a cell served by the source access network device and a network slice supported by a target base station, and based on the ID of the current CAG that serves the terminal device and the mapping relationship, that a cell served by another network device supports S-NSSAI of a network slice that meets the mapping relationship, to determine which network devices or which network device that may be used as the target access network device.

Optionally, the source access network device determines, based on a mapping relationship between a network slice supported by the source access network device and a network slice supported by the target access network device and based on a corresponding network slice that serves the current session of the terminal device and the mapping relationship, first S-NSSAI of a network slice that is in the target access network device and that serves the session. In this case, the handover requirement message may further include the first S-NSSAI. For example, the mapping relationship of the network slice of the target access network device is as follows: A network slice corresponding to S-NSSAI #1 is S-NSSAI #A, and a network slice corresponding to S-NSSAI #2 is S-NSSAI #B. If a network slice that corresponds to a PDU session #1 and that serves the terminal device in the source network device is the S-NSSAI #B, the source network device determines that a network slice corresponding to the PDU session #1 in a cell served by the target network device is the S-NSSAI #2.

In another possible manner, the source access network device determines, based on a mapping relationship between a CAG ID and a network slice supported by the target access network device and based on an ID of a current CAG that serves the terminal device and the mapping relationship, first S-NSSAI of a network slice that is in the target access network device and that serves the session. In this case, the handover requirement message further includes the first S-NSSAI. For example, the mapping relationship between the CAG ID and the network slice supported by the target access network device is as follows: A network slice corresponding to a CAG ID #1 is S-NSSAI #A, and a network slice corresponding to a CAG ID #2 is S-NSSAI #B. If an ID of a CAG that corresponds to a PDU session #1 and that serves the terminal device in the source network device is an S-CAG ID #1 (that is, the session belongs the CAG ID #1), the source network device determines that a network slice corresponding to the PDU session #1 in a cell served by the target network device is the S-NSSAI #1.

In another possible manner, the source access network device determines, based on a mapping relationship between a CAG ID and a network slice supported by the target access network device and based on a CAG ID of the target access network device, first S-NSSAI of a network slice that serves the session. In this case, the handover requirement message further includes the first S-NSSAI. For example, the mapping relationship between the CAG ID and the network slice supported by the target access network device is as follows: A network slice corresponding to a CAG ID #1 is S-NSSAI #A, and a network slice corresponding to a CAG ID #2 is S-NSSAI #B. If the source network device determines to hand over a PDU session #1 of the terminal to the CAG ID #2 in the target network device (where for example, the target cell of the handover is the CAG ID #2), the source network device determines that a network slice corresponding to the PDU session #1 in a cell served by the target network device is the S-NSSAI #2.

Optionally, the mapping information may be stored in a local storage system of the source access network device, or stored in a cache system of the source access network device. Similarly, the mapping relationship may be stored in the local storage system of the source access network device, or stored in the cache system of the source access network device.

Optionally, if the session is a protocol data unit session (PDU session), the identifier of the session may be a PDU session ID.

In a possible implementation, before the terminal device is handed over from the source access network device to the target access network device, the terminal device is handed over from the target access network device to the source access network device. In addition, S-NSSAI of the network slice that is in the target access network device and that serves the session performed by the terminal device is third S-NSSAI. In this case, the handover requirement message further includes the third S-NSSAI.

It should be understood that when the handover requirement message includes the third S-NSSAI, the target access network device may serve, by using the network slice corresponding to the third S-NSSAI, the session that needs to be handed over to the target access network device.

In a possible implementation, the handover requirement message further includes handover type information, and the handover type information is used to indicate that the current handover is handover from a communication network to which the source access network device belongs to a communication network to which the target access network device belongs.

For example, if the source access network device is a network device that supports an NPN, and the target access network device is a network device that supports a PLMN, the handover type information is used to indicate that the handover is from the NPN to the PLMN. Alternatively, if the source access network device is a network device that supports a PLMN, and the target access network device is a network device that supports an NPN, the handover type information is used to indicate that the handover is from the PLMN to the NPN. Alternatively, the handover type information is used to indicate handover between a PLMN and an NPN.

It should be understood that the handover type information may be used to assist the core network device in determining a type of a cell from which the terminal device is handed over and a type of cell to which the terminal device is handed over. In this way, a judgment error of the core network device can be avoided. For example, when the target access network device supports both the NPN and the PLMN, when the handover requirement message further includes the handover type information, the core network device can accurately determine whether the terminal device is handed over to the NPN or the PLMN supported by the target access network device.

Further, after receiving the handover requirement message sent by the source access network device, the core network device needs to learn of the first S-NSSAI of the network slice that is in the target access network device and that serves the session, and notify the target access network device of the first S-NSSAI. The first S-NSSAI is determined based on second S-NSSAI and the network slice supported by the target access network device.

In other words, before determining the first S-NSSAI, the core network device needs to first learn of the second S-NSSAI. Specifically, in at least this embodiment of this application, that the core network device learns of the second S-NSSAI includes the following two possible embodiments:

In one possible implementation, the core network device determines the second S-NSSAI based on the identifier of the session included in the handover requirement message. In the other possible implementation, the handover requirement message sent by the terminal device to the core network device includes the second S-NSSAI.

Specifically, in at least this embodiment of this application, that the core network device learns of the first S-NSSAI includes the following several possibilities:

Possibility 1:

After receiving the handover requirement message sent by the source access network device, the core network device determines, based on information included in the handover requirement message, the first S-NSSAI of the network slice that is in the target access network device and that can serve the session. The method procedure shown in FIG. 3A and FIG. 3B further includes: S320. The core network device determines the first S-NSSAI.

It should be understood that, if the handover requirement message includes the first S-NSSAI, the core network device does not need to perform a process of determining the first S-NSSAI, that is, the core network device does not need to perform S320.

Specifically, that the core network device determines the first S-NSSAI based on the information included in the handover requirement message includes two possible cases:

Case 1:

The core network device determines the target access network device based on the target identifier included in the handover requirement message.

The core network device determines the first S-NSSAI based on the second S-NSSAI and a mapping relationship. The mapping relationship is a correspondence between S-NSSAI of a network slice in the source access network device and S-NSSAI of a network slice in the target access network device. Alternatively, the mapping relationship is a mapping relationship between S-NSSAI of a network slice in the source access network device and a CAG ID of a CAG served by the target access network device. In this case, the core network device determines the first S-NSSAI of the network slice in the target access network device based on a CAG ID corresponding to the second S-NSSAI.

Case 2:

The core network device determines the target access network device based on the target identifier included in the handover requirement message. The core network device knows that the target access network device provides only one network slice serving all sessions that need to be handed over from the source access network device to the target access network device, and S-NSSAI of the network slice is the first S-NSSAI. In this case, the core network device determines the first S-NSSAI. Alternatively, the core network device knows a CAG ID of a CAG served by a network slice, in the target access network device, serving all sessions that need to be handed over from the source access network device to the target access network device. In this case, the core network device determines the first S-NSSAI based on the CAG ID.

It should be understood that the foregoing mapping relationship may be a correspondence between S-NSSAI of all network slices in the source access network device and S-NSSAI of some network slices in the target access network device.

For example, the S-NSSAI of all the network slices in the source access network device includes S-NSSAI #1-1 to S-NSSAI #1-10, and S-NSSAI of all network slices in the target access network device includes S-NSSAI #2-1 to S-NSSAI #2-10. In addition, five network slices in the 10 network slices in the target access network device may serve a session that needs to be handed over from the source access network device to the target access network device. S-NSSAI of the five network slices includes the S-NSSAI #2-1 to the S-NSSAI #2-5. The mapping relationship is a correspondence between the S-NSSAI #1-1 to the S-NSSAI #1-10 and the S-NSSAI #2-1 to the S-NSSAI #2-5, where at least one piece of S-NSSAI in the S-NSSAI #1-1 to the S-NSSAI #1-10 corresponds to one piece of S-NSSAI in the S-NSSAI #2-1 to the S-NSSAI #2-5.

Alternatively, the foregoing mapping relationship may be a correspondence between S-NSSAI of all network slices in the source access network device and S-NSSAI of all network slices in the target access network device.

For example, the S-NSSAI of all the network slices in the source access network device includes S-NSSAI #1-1 to S-NSSAI #1-10, and S-NSSAI of all network slices in the target access network device includes S-NSSAI #2-1 to S-NSSAI #2-10. In addition, the 10 network slices in the target access network device may serve a session that needs to be handed over from the source access network device to the target access network device. The mapping relationship is a correspondence between the S-NSSAI #1-1 to the S-NSSAI #1-10 and the S-NSSAI #2-1 to the S-NSSAI #2-10, where one piece of S-NSSAI in the S-NSSAI #1-1 to the S-NSSAI #1-10 corresponds to one piece of S-NSSAI in the S-NSSAI #2-1 to the S-NSSAI #2-10.

Alternatively, the foregoing mapping relationship may be a correspondence between S-NSSAI of some network slices in the source access network device and S-NSSAI of some network slices in the target access network device. Examples are no longer provided one by one herein.

The mapping relationship may be a correspondence between S-NSSAI of M network slices in the source access network device and S-NSSAI of N network slices in the target access network device, where M is a positive integer greater than or equal to N. At least one piece of S-NSSAI in the S-NSSAI of the M network slices corresponds to one piece of S-NSSAI in the S-NSSAI of the N network slices. In other words, one network slice in the target access network device may simultaneously serve sessions served by a plurality of network slice in the source access network device.

Possibility 2:

The core network device sends the identifier of the session to a network slice selection device, where the identifier of the session is used to indicate the network slice selection device to determine the second S-NSSAI; and the core network device receives the first S-NSSAI sent by the network slice selection device, where the first S-NSSAI is determined by the network slice selection device based on the second S-NSSAI. The method procedure shown in FIG. 3A and FIG. 3B further includes: S330. The core network device sends the identifier of the session to the network slice selection device. S331. The network slice selection device determines the second S-NSSAI. S332. The network slice selection device determines the first S-NSSAI. S333. The network slice selection device sends the first S-NSSAI to the core network device.

That the network slice selection device determines the second S-NSSAI includes: The network slice selection device determines the second S-NSSAI based on the received identifier of the session and a mapping relationship between identifiers of sessions and S-NSSAI of network slices in the source access network device.

For example, identifiers of 10 sessions (session identifier #1 to session identifier #10) are in a one-to-one correspondence with S-NSSAI (S-NSSAI #1 to S-NSSAI #10) of 10 network slices in the source access network devices (where the session identifier #1 corresponds to the S-NSSAI #1, the session identifier #2 corresponds to the S-NSSAI #2, the session identifier #3 corresponds to the S-NSSAI #3, . . . , and the session identifier #10 corresponds to the S-NSSAI #10). If the identifier of the session is the session identifier #1, after receiving the session identifier #1, the network slice selection device determines, based on the mapping relationship between identifiers of sessions and S-NSSAI of network slices in the source access network device, that the second S-NSSAI is the S-NSSAI #1.

Further, that the network slice selection device determines the first S-NSSAI includes: The network slice selection device determines the first S-NSSAI based on the second S-NSSAI and the foregoing mapping relationship.

Possibility 3:

The core network device determines the second S-NSSAI based on the identifier of the session; The core network device sends the second S-NSSAI to a network slice selection device, where the second S-NSSAI is used to indicate the network slice selection device to determine the first S-NSSAI; and the core network device receives the first S-NSSAI sent by the network slice selection device. The method procedure shown in FIG. 3A and FIG. 3B further includes: S340. The core network device determines the second S-NSSAI. S341. The core network device sends the second S-NSSAI to the network slice selection device. S342. The network slice selection device determines the first S-NSSAI. S343. The network slice selection device sends the first S-NSSAI to the core network device.

That the core network device determines the second S-NSSAI includes: The core network device determines the second S-NSSAI based on the received identifier of the session and the mapping relationship between identifiers of sessions and S-NSSAI of network slices in the source access network device.

Further, that the network slice selection device determines the first S-NSSAI includes: The network slice selection device determines the first S-NSSAI based on the second S-NSSAI and the foregoing mapping relationship.

Possibility 4:

If the handover requirement message includes the second S-NSSAI, the core network device sends the second S-NSSAI to a network slice selection device, where the second S-NSSAI is used to indicate the network slice selection device to determine the first S-NSSAI; and the core network device receives the first S-NSSAI sent by the network slice selection device. The method procedure shown in FIG. 3A and FIG. 3B further includes: S350. The core network device sends the second S-NSSAI to the network slice selection device. S351. The network slice selection device determines the first S-NSSAI. S352. The network slice selection device sends the first S-NSSAI to the core network device.

That the network slice selection device determines the first S-NSSAI includes: The network slice selection device determines the first S-NSSAI based on the second S-NSSAI and the foregoing mapping relationship.

Optionally, when a cell corresponding to the target identifier is an NPN cell, and the source base station is a PLMN cell, the handover requirement message may further include a CAG ID corresponding to the target identifier. The CAG ID may be used by the AMF to select the S-NSSAI corresponding to the session that is served by the target cell and that is handed over to the target cell. A specific selection manner includes: The AMF determines the first S-NSSAI based on the second S-NSSAI and a mapping relationship between a CAG ID and S-NSSAI.

It should be understood that the network slice selection device in at least this embodiment of this application may be an NSSF or a session management function (session management function, SMF) network element in the core network, or another apparatus that can implement a function of the NSSF or the SMF in at least this embodiment.

Further, after learning of the first S-NSSAI, the core network device notifies the target access network device of the first S-NSSAI. That is, the method procedure shown in FIG. 3A and FIG. 3B may further include: S360. The core network device sends a handover request message to the target access network device.

The handover request message includes the first S-NSSAI, and the first S-NSSAI is determined based on the second S-NSSAI and the network slice supported by the target access network device. The second S-NSSAI is S-NSSAI that is of a network slice, in the source access network device, serving the session and that corresponds to the identifier of the session included in the handover requirement message.

In a possible implementation, the handover request message further includes the identifier of the session.

In a possible implementation, the handover request message further includes the first S-NSSAI, and the target access network device may store the first S-NSSAI. In this case, when the terminal device needs to be handed over from the target access network device to the source access network device next time, the source access network device may reuse the network slice corresponding to the first S-NSSAI, to serve the first session of the terminal device.

In a possible implementation, the handover request message further includes handover type information, and the handover type information is used to indicate that the current handover between network devices is handover from the communication network to which the source access network device belongs to the communication network to which the target access network device belongs.

Specifically, the handover type information included in the handover request message is similar to the handover type information included in the foregoing handover requirement message, and details are not described herein again.

In a possible implementation, the handover request message further includes second indication information, and the second indication information is used to indicate that the handover request is from the source access network device. The target access network device can learn, based on the second indication information, that the handover request is from the source access network device.

Specifically, after receiving the handover request message sent by the core network device, the target access network device sends a handover response message to the core network device. That is, the method procedure shown in FIG. 3A and FIG. 3B further includes: S370. The target access network device sends the handover response message to the core network device. The handover response message may be a handover request acknowledgment message.

Further, after receiving the handover response message sent by the target access network device, the core network device determines that the terminal device can be handed over from the source access network device to the target access network device, and the core network device sends a handover command (handover command) message to the source access network device. That is, the method procedure shown in FIG. 3A and FIG. 3B further includes: S380. The core network device sends the handover command message to the source access network device to complete the handover.

Specifically, the source access network device may determine the target access network device based on network slice information exchanged between the source access network device and the target access network device. For example, the source access network device notifies the target access network device of an identifier of a network slice that is in a cell served by the source access network device and that serves a session in a cell served by the target access network device, and the target access network device notifies the source access network device of an identifier of a network slice that is in the cell served by the target access network device and that serves a session in the cell served by the source access network device.

Figure 4:
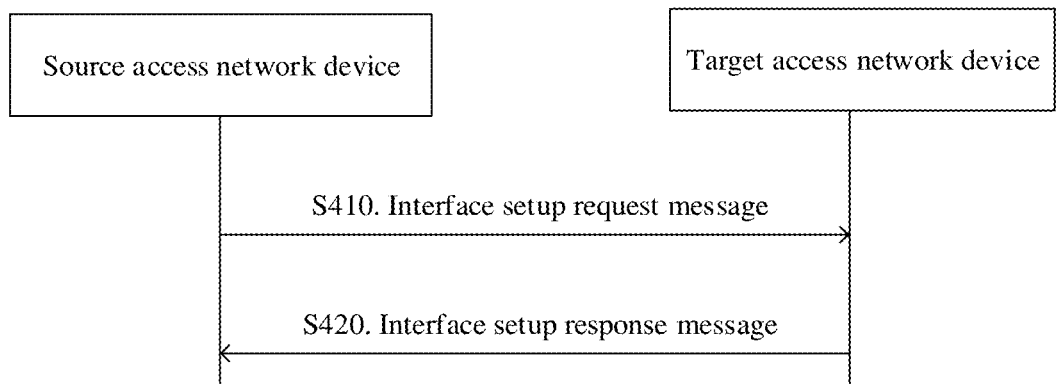
FIG. 4 is a schematic flowchart showing that access network devices exchange information about network slices according to an embodiment of this application.

With reference to FIG. 4, an example in which the source access network device supports an NPN cell and the target access network device supports a PLMN cell is used below to describe a procedure that the source access network device and the target access network device exchange network slice information.

FIG. 4 is a schematic flowchart showing that access network devices exchange information about network slices according to an embodiment of this application. The flowchart includes the source access network device and the target access network device.

It should be understood that, when the target access network device does not support a network slice corresponding to a session served by the source access network device, the target access network device may notify the source access network device of a network slice that is in a cell served by the target access network device and that is used to serve a session served by the source access network device. Similarly, when the source access network device does not support a network slice corresponding to a session served by the target access network device, the source access network device may notify the target access network device of a network slice that is in a cell served by the source access network device and that is used to serve a session served by the target access network device.

A method for exchanging network slice information includes the following steps.

S410. The source access network device sends an interface setup request message to the target access network device.

Specifically, the interface setup request message includes first configuration information.

Optionally, the interface setup request message may be an Xn interface setup request message.

In a possible implementation, when the cell served by the source access network device uses one network slice to serve a PLMN service, the first configuration information includes S-NSSAI corresponding to the network slice.

Optionally, the first configuration information further includes S-NSSAI of a network slice supported by the target access network device.

In another possible implementation, when the cell served by the source access network device uses a plurality of network slices to serve PLMN services, the first configuration information includes a plurality of pieces of S-NSSAI corresponding to the plurality of network slices and a mapping relationship between the plurality of pieces of S-NSSAI and S-NSSAI of network slices serving the PLMN services in the target access network device.

For example, S-NSSAI #1 of a first access network device may be used to establish sessions corresponding to S-NSSAI #A and S-NSSAI #B of a second access network device, and S-NSSAI #2 of the first access network device may be used to establish sessions corresponding to S-NSSAI #C and S-NSSAI #D of the second access network device. That is, the foregoing mapping relationship includes that the S-NSSAI #1 corresponds to the S-NSSAI #A and the S-NSSAI #B, and that the S-NSSAI #2 corresponds to the S-NSSAI #C and the S-NSSAI #D. The first access network device may be the source access network device, and the second access network device may be the target access network device. Alternatively, the first access network device may be the target access network device, and the second access network device may be the source access network device.

In another possible implementation, a first cell is a PLMN cell served by the source access network device, and a second cell is an NPN cell served by the target access network device. When the first cell uses one network slice to serve an NPN service, the first configuration information includes only S-NSSAI corresponding to the network slice and/or a CAG ID of a CAG served by the network slice. Alternatively, when the first cell uses a plurality of network slices to serve NPN services, the first configuration information includes a mapping relationship between a plurality of pieces of S-NSSAI corresponding to the plurality of network slices and a plurality of CAG IDs corresponding to a plurality of CAGs served by the plurality of network slices.

For example, S-NSSAI #1 of a first access network device may be used to establish sessions corresponding to a CAG ID #A and a CAG ID #B of a second access network device, and S-NSSAI #2 of the first access network device may be used to establish sessions corresponding to CAG ID #C and CAG ID #D of the second access network device. That is, the foregoing mapping relationship includes that the S-NSSAI #1 corresponds to the CAG ID #A and the CAG ID #B, and that the S-NSSAI #2 corresponds to the CAG ID #C and the CAG ID #D. The first access network device may be the source access network device, and the second access network device may be the target access network device. Alternatively, the first access network device may be the target access network device, and the second access network device may be the source access network device. S420. The target access network device sends an interface setup response message to the source access network device.

Specifically, the interface setup response message includes second configuration information.

In a possible implementation, when the cell served by the target access network device uses one network slice to serve an NPN service, or the source access network device does not support S-NSSAI corresponding to a session served by the target access network device, the second configuration information includes S-NSSAI corresponding to the network slice.

Optionally, the second configuration information further includes S-NSSAI of a network slice supported by the source access network device.

In another possible implementation, when the cell served by the target access network device uses a plurality of network slices to serve NPN services, the second configuration information includes a plurality of pieces of S-NSSAI corresponding to the plurality of network slices and a mapping relationship between the plurality of pieces of S-NSSAI and S-NSSAI of network slices serving the NPN services in the source access network device.

For example, S-NSSAI #1 of a first access network device may be used to establish sessions corresponding to S-NSSAI #A and S-NSSAI #B of a second access network device, and S-NSSAI #2 of the first access network device may be used to establish sessions corresponding to S-NSSAI #C and S-NSSAI #D of the second access network device. That is, the foregoing mapping relationship includes that the S-NSSAI #1 corresponds to the S-NSSAI #A and the S-NSSAI #B, and that the S-NSSAI #2 corresponds to the S-NSSAI #C and the S-NSSAI #D. The first access network device may be the source access network device, and the second access network device may be the target access network device. Alternatively, the first access network device may be the target access network device, and the second access network device may be the source access network device.

In another possible implementation, a first cell is a PLMN cell served by the source access network device, and a second cell is an NPN cell served by the target access network device. When the second cell uses one network slice to serve an NPN service, the second configuration information includes only S-NSSAI corresponding to the network slice and/or a CAG ID of a CAG served by the network slice. Alternatively, when the second cell uses a plurality of network slices to serve NPN services, the second configuration information includes a mapping relationship between a plurality of pieces of S-NSSAI corresponding to the plurality of network slices and a plurality of CAG IDs corresponding to a plurality of CAGs served by the plurality of network slices.

For example, S-NSSAI #1 of a first access network device may be used to establish sessions corresponding to a CAG ID #A and a CAG ID #B of the target access network device, and S-NSSAI #2 of the first access network device may be used to establish sessions corresponding to CAG ID #C and CAG ID #D of the target access network device. That is, the foregoing mapping relationship includes that the S-NSSAI #1 corresponds to the CAG ID #A and the CAG ID #B, and that the S-NSSAI #2 corresponds to the CAG ID #C and the CAG ID #D. The first access network device may be the source access network device, and the second access network device may be the target access network device. Alternatively, the first access network device may be the target access network device, and the second access network device may be the source access network device.

It should be understood that, in FIG. 4, network slice information is exchanged between a network device that supports an NPN and a network device that supports a PLMN, so that when a terminal device is handed over between an NPN cell and a PLMN cell, the network device supporting the NPN can determine to use which network device supporting the PLMN as a target access network device, or the network device supporting the PLMN can determine to use which network device supporting the NPN as a target access network device. However, this application imposes no limitation on that the network slice information can be exchanged only between the network device that supports the NPN and the network device that supports the PLMN. Two network devices that support the NPN may also exchange network slice information, or two network devices that support the PLMN may exchange network slice information or information about mapping between a CAG identifier and a network slice.

For example, when two network devices that support the NPN exchange network slice information, the interface setup request message and the interface setup response message may include information about network slices corresponding to PLMN services served by the two network devices. A specific interaction procedure is similar to that in FIG. 4, and details are not described herein again.

It should be understood that, in FIG. 4, an example in which the target access network device and the source access network device exchange information about network slices corresponding to services served by the target access network device and the source access network device is used to describe a case in which different access network devices may exchange information about network slices in the different access network devices. However, this application imposes no limitation on that such exchange of network slice information can occur only between two different access network devices, but may occur between the core network device and different access network devices. For example, the target access network device and the source access network device separately send information about network slices of the target access network device and the source access network device to the core network device, and the core network device can determine the target access network device. For another example, the target access network device and the source access network device separately send information about network slices of the target access network device and the source access network device to the core network device, and the core network device forwards the information about the network slice of the target access network device to the source access network device, and forwards the information about the network slice of the source access network device to the target access network device. The target access network device and the source access network device may separately send the information about the network slices of the target access network device and the source access network device to the core network device by using existing signaling or newly added signaling. Details are not described herein.

It should be further understood that in at least this embodiment of this application, the network slice selection device can learn of the mapping relationship because the core network device learns of the mapping relationship and sends the mapping relationship to the network slice selection device, or the network slice selection device can determine the mapping relationship based on an operator policy. This is not limited in this application.

Figure 5:
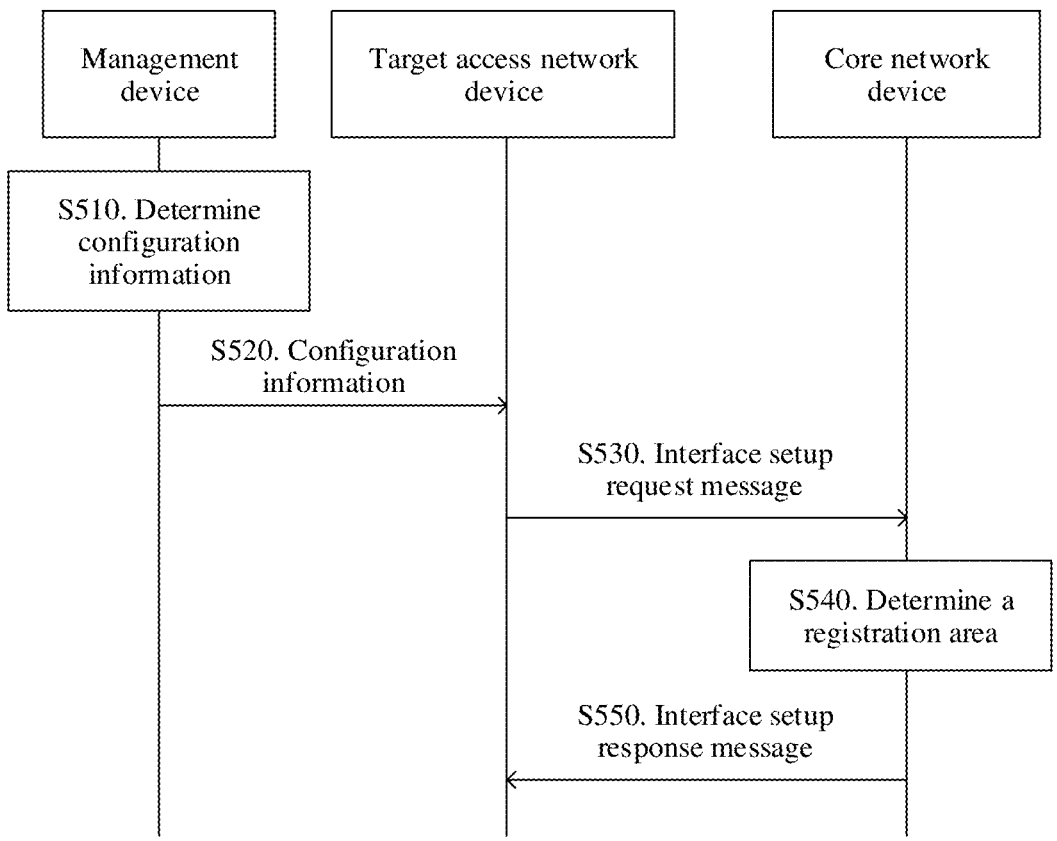
FIG. 5 is a schematic flowchart of a method used by a core network device to learn of first S-NSSAI or a mapping relationship according to an embodiment of this application.
Figure 6:
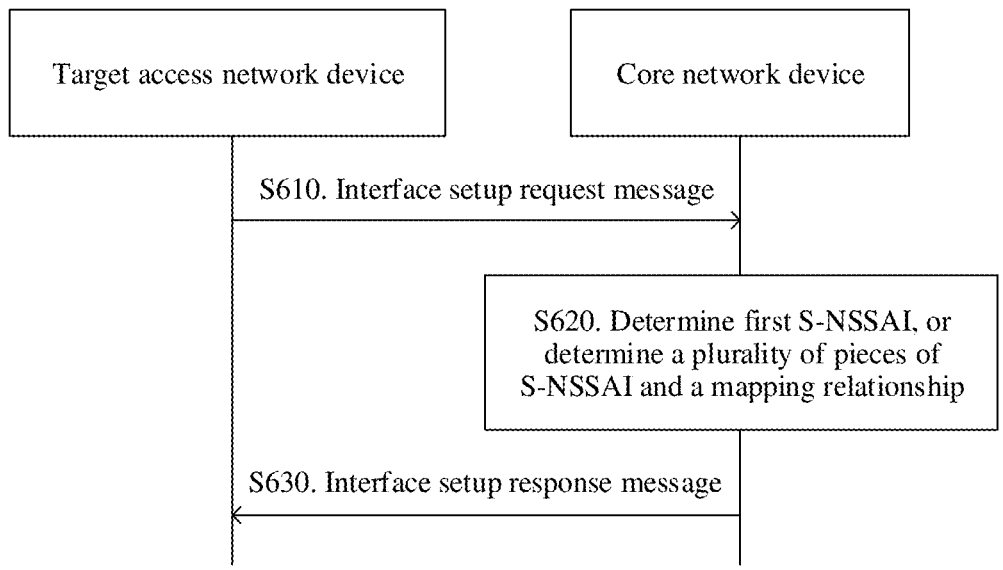
FIG. 6 is a schematic flowchart of another method used by a core network device to learn of first S-NSSAI or a mapping relationship according to an embodiment of this application.

With reference to FIG. 5 and FIG. 6, the following describes in detail how the core network device learns that the target access network device serves all sessions in the source access network device by using the network slice corresponding to the first S-NSSAI or by using the foregoing mapping relationship.

FIG. 5 is a schematic flowchart of a method used by a core network device to learn of first S-NSSAI or a mapping relationship according to an embodiment of this application. A management device, a target access network device, and the core network device are included.

The management device in this application may be an operation administration and maintenance (OAM) device, or another apparatus that can implement a function of the OAM device.

The method used by the core network device to learn of the first S-NSSAI or the mapping relationship includes the following steps.

S510. The management device determines configuration information.

Possibility 1: Corresponding to the case 1 in the possibility 1 in S320, the management device determines, based on an operator policy, that there are a plurality of network slices that are in a cell served by the target access network device and that serve sessions in a cell served by the source access network device. The plurality of network slices correspond to a plurality of pieces of S-NSSAI. In this case, after determining the plurality of pieces of S-NSSAI corresponding to the plurality of network slices, the management device further needs to determine a session that is in the cell served by the source access network device and that is served by a network slice corresponding to each S-NSSAI in the plurality of pieces of S-NSSAI corresponding to the plurality of network slices, that is, determine a mapping relationship between S-NSSAI of network slices in the cell served by the source access network device and the plurality of pieces of S-NSSAI, or determine a mapping relationship between CAG IDs supported in the cell served by the source access network device and the plurality of pieces of S-NSSAI.

Possibility 2: Corresponding to the case 2 in the possibility 1 in S320, the management device determines, based on an operator policy, that there is only one network slice that is in a cell served by the target access network device and that serves a session in a cell served by the source access network device. In this case, S-NSSAI of the network slice is preset S-NSSAI, and the preset S-NSSAI is the first S-NSSAI described above. Alternatively, the management device determines, based on an operator policy, that there is only one network slice that is in a cell served by the target access network device and that serves a session in a cell served by the source access network device, and determines a CAG ID corresponding to the network slice.

S520. The management device sends the configuration information to the target access network device.

Corresponding to the possibility 1 in S510, the configuration information includes the foregoing plurality of pieces of S-NSSAI and the mapping relationship between the plurality of pieces of S-NSSAI and the S-NSSAI in the cell served by the source access network device, or the configuration information includes the foregoing plurality of pieces of S-NSSAI and a mapping relationship between the plurality of pieces of S-NSSAI and the CAG IDs supported in the cell served by the source access network device, to indicate that the plurality of network slices corresponding to the plurality of pieces of S-NSSAI are used in the cell served by the target access network device to serve all sessions in the cell served by the source access network device.

For example, if the source access network device is a network device that supports an NPN, and the target access network device is a network device that supports a PLMN, the network device in the PLMN serves all sessions in the NPN by using network slices corresponding to a plurality of pieces of S-NSSAI. That is, for S-NSSAI corresponding to a network slice that serves a session in the NPN, network slices corresponding to one or more pieces of S-NSSAI may be used in the PLMN to serve the session.

Corresponding to the possibility 2 in S510, the configuration information includes the first S-NSSAI described above, to indicate that a network slice corresponding to one piece of S-NSSAI is used in the cell served by the target access network device to serve all sessions in the source access network device. Alternatively, the configuration information includes a CAG ID of a CAG served by the one network slice.

For example, if the source access network device is a network device in the NPN, and the target access network device is a network device in the PLMN, the network device in the PLMN serves all sessions in the NPN by using a network slice corresponding to S-NSSAI. The S-NSSAI is the first S-NSSAI.

It should be understood that only one target access network device is used as an example for description in FIG. 5, and this does not constitute any limitation on the protection scope of this application. For example, the management device may perform the foregoing configuration for a plurality of target access network devices. A configuration of each target access network device is similar to that described in S510, and details are not described herein again.

After receiving the configuration information, the target access network device may send an interface setup request message to the core network device. To be specific, the method procedure shown in FIG. 5 further includes: S530. The target access network device sends the interface setup request message to the core network device. For possible cases in which the configuration information is different, the interface setup request message includes the first S-NSSAI, or the interface setup request message includes the plurality of pieces of S-NSSAI and the mapping relationship.

It should be understood that the interface setup request message in at least this embodiment of this application may be an NG interface setup request message.

After receiving the interface setup request message, the core network device may determine a registration area, so that the core network device can determine that for a session, all cells in the registration area can support a network slice corresponding to the session. That is, the method procedure shown in FIG. 5 further includes: S540. The core network device determines the registration area. Specifically, the core network device determines the registration area based on the second S-NSSAI included in the received interface setup request message, or an S-NSSAI set and a preset mapping relationship that are included in the interface setup request message, and the core network device determines that for a session, all cells in a registration area can support a network slice corresponding to the session.

For example, depending on whether a PLMN cell includes a network slice that corresponds to one piece of S-NSSAI and that serves a session served by network slices corresponding to one or more pieces of S-NSSAI in an NPN cell, the core network device determines whether both the NPN cell and the PLMN cell can be included in a registration area of user equipment.

After receiving the NG interface setup request message, the core network device may send an interface setup response message to the target access network device. That is, the method procedure shown in FIG. 5 further includes:

S550. The core network device sends the interface setup response message to the target access network device.

It should be understood that the interface setup response message in at least this embodiment of this application may be an NG interface setup response message.

What is described in FIG. 5 is that the management device determines the first S-NSSAI corresponding to the network slice, in the target access network device, serving all sessions that need to be handed over from the source access network device to the target access network device, or determines that the management device determines the mapping relationship and the plurality of pieces of S-NSSAI corresponding to the plurality of network slices, in the target access network device, serving all sessions that need to be handed over from the source access network device to the target access network device.

In another possible solution, the core network device determines the first S-NSSAI corresponding to the network slice, in the target access network device, serving all sessions that need to be handed over from the source access network device to the target access network device, or the core network device determines the mapping relationship and the plurality of pieces of S-NSSAI corresponding to the plurality of network slices, in the target access network device, serving all sessions that need to be handed over from the source access network device to the target access network device. In addition, the core network device notifies the target access network device of the determined information. The following describes the solution with reference to FIG. 6.

FIG. 6 is a schematic flowchart of another method used by a core network device to learn of first S-NSSAI or a mapping relationship according to an embodiment of this application. A target access network device and the core network device are included.

The method used by the core network device to learn of first S-NSSAI or a mapping relationship includes the following steps.

S610. The core network device receives an interface setup request message sent by the target access network device.

Optionally, the interface setup request message is an NG interface setup request message specified in an existing protocol.

S620. The core network device determines the first S-NSSAI, or determines a plurality of pieces of S-NSSAI and the mapping relationship.

Possibility 1: Corresponding to the case 1 in the possibility 1 in S320, the core network device determines, based on an operator policy, that there are a plurality of network slices that are in a cell served by the target access network device and that serve sessions in a cell served by the source access network device. The plurality of network slices correspond to a plurality of pieces of S-NSSAI. In this case, after determining the plurality of pieces of S-NSSAI corresponding to the plurality of network slices, the core network device further needs to determine a session that is in the source access network device and that is served by a network slice corresponding to each S-NSSAI in the plurality of pieces of S-NSSAI corresponding to the plurality of network slices, that is, determine a mapping relationship between S-NSSAI of network slices in the cell served by the source access network device and the plurality of pieces of S-NSSAI, or determine a mapping relationship between CAG IDs supported in the cell served by the source access network device and the plurality of pieces of S-NSSAI.

Possibility 2: Corresponding to the case 2 in the possibility 1 in S320, the core network device determines, based on an operator policy, that there is only one network slice that is in a cell served by the target access network device and that serves a session in a cell served by the source access network device. In this case, S-NSSAI of the network slice is preset S-NSSAI, and the preset S-NSSAI is the first S-NSSAI described above. Alternatively, the management device determines, based on an operator policy, that there is only one network slice that is in a cell served by the target access network device and that serves a session in a cell served by the source access network device, and determines a CAG ID corresponding to the network slice.

S630. The core network device sends an interface setup response message to the target access network device.

Corresponding to the possibility 1 in S620, the interface setup response message includes the foregoing plurality of pieces of S-NSSAI and the mapping relationship between the plurality of pieces of S-NSSAI and the S-NSSAI in the cell served by the source access network device, or the interface setup response message includes the foregoing plurality of pieces of S-NSSAI and a mapping relationship between the plurality of pieces of S-NSSAI and the CAG IDs supported in the cell served by the source access network device, to indicate that the plurality of network slices corresponding to the plurality of pieces of S-NSSAI are used in the cell served by the target access network device to serve all sessions in the cell served by the source access network device.

For example, if the source access network device is a network device that supports an NPN, and the target access network device is a network device that supports a PLMN, the network device in the PLMN serves all sessions in the NPN by using network slices corresponding to a plurality of pieces of S-NSSAI. That is, for S-NSSAI corresponding to a network slice that serves a session in the NPN, network slices corresponding to one or more pieces of S-NSSAI may be used in the PLMN to serve the session.

Corresponding to the possibility 2 in S620, the interface setup response message includes the first S-NSSAI described above, to indicate that a network slice corresponding to one piece of S-NSSAI is used in the cell served by the target access network device to serve all sessions in the source access network device. Alternatively, the interface setup response message includes a CAG ID of a CAG served by the one network slice.

For example, if the source access network device is a network device in the NPN, and the target access network device is a network device in the PLMN, the network device in the PLMN serves all sessions in the NPN by using a network slice corresponding to S-NSSAI. The S-NSSAI is the first S-NSSAI.

It should be understood that only one target access network device is used as an example for description in FIG. 6, and this does not constitute any limitation on the protection scope of this application. For example, the core network device may perform the foregoing configuration for a plurality of target access network devices. A configuration of each target access network device is similar to that described in S620, and details are not described herein again.

FIG. 5 and FIG. 6 show that the core network device learns of the first S-NSSAI or learns of the plurality of pieces of S-NSSAI and the mapping relationship.

In the method procedure shown in FIG. 3A and FIG. 3B, the core network device sends the first S-NSSAI to the target access network device, so that the target access network device determines, based on the received first S-NSSAI, that the network slice corresponding to the first S-NSSAI serves the session. This application further provides a handover method. A target access network device can determine first S-NSSAI, and does not need to receive the first S-NSSAI from a core network device. The following describes the handover method in detail with reference to FIG. 7.

Figure 7:
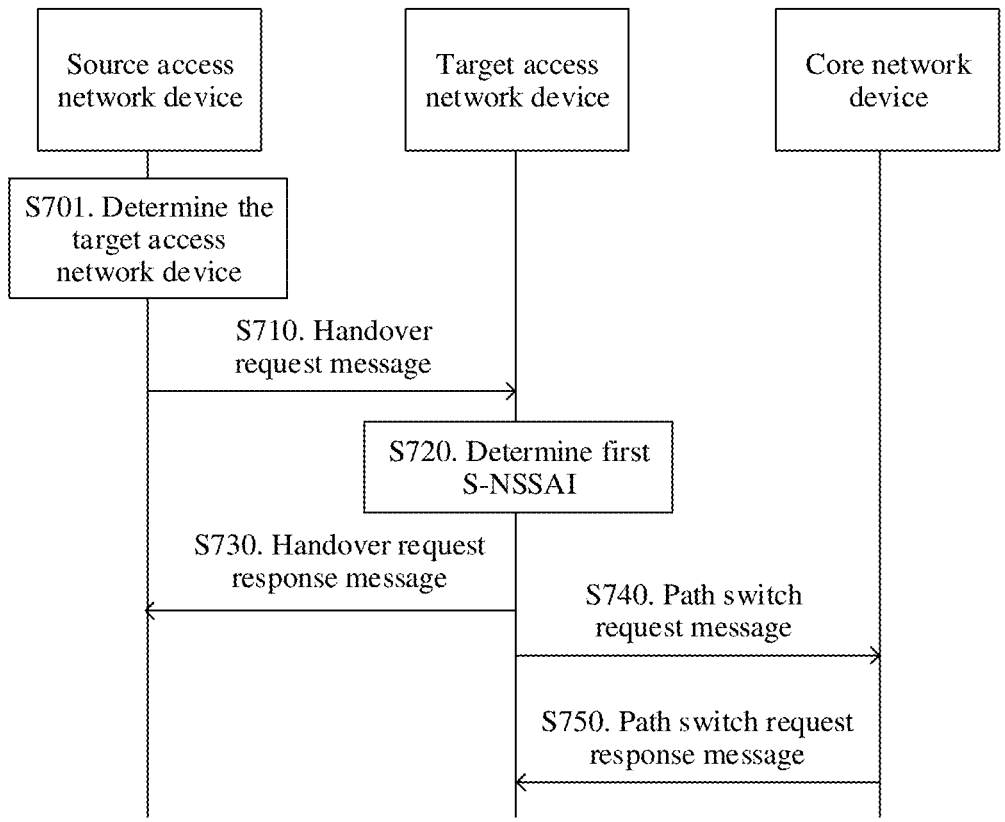
FIG. 7 is a schematic flowchart of another handover method according to an embodiment of this application.

FIG. 7 is a schematic flowchart of another handover method according to an embodiment of this application. The flowchart includes a source access network device, a target access network device, and a core network device. The source access network device is an access network device connected to a terminal device before the terminal device performs cell handover, and may be referred to as the source access network device. The target access network device is an access network device that needs to be connected to the terminal device after the terminal device performs cell handover, and may be referred to as the target network device.

The handover method includes the following steps.

S710. The source access network device sends a handover request message to the target access network device.

The handover request message includes an identifier of a session, the session is a session that is of a terminal device and that needs to be handed over from the source access network device to the target access network device, and second S-NSSAI corresponding to the identifier of the session is S-NSSAI of a network slice that is in the source access network device and that serves the session.

Optionally, the source access network device determines, based on a mapping relationship between a network slice supported by the source access network device and a network slice supported by the target access network device and based on a corresponding network slice that serves the current session of the terminal device and the mapping relationship, first S-NSSAI of a network slice that is in the target access network device and that serves the session. In this case, the handover request message may further include the first S-NSSAI. For example, the mapping relationship of the network slice of the target access network device is as follows: A network slice corresponding to S-NSSAI #1 is S-NSSAI #A, and a network slice corresponding to S-NSSAI #2 is S-NSSAI #B. If a network slice that corresponds to a PDU session #1 and that serves the terminal device in the source network device is the S-NSSAI #B, the source network device determines that a network slice corresponding to the PDU session #1 in a cell served by the target network device is the S-NSSAI #2.

In another possible manner, the source access network device determines, based on a mapping relationship between a CAG ID and a network slice supported by the target access network device and based on an ID of a current CAG that serves the terminal device and the mapping relationship, first S-NSSAI of a network slice that is in the target access network device and that serves the session. In this case, the handover request message further includes the first S-NSSAI. For example, the mapping relationship between the CAG ID and the network slice supported by the target access network device is as follows: A network slice corresponding to a CAG ID #1 is S-NSSAI #A, and a network slice corresponding to a CAG ID #2 is S-NSSAI #B. If an ID of a CAG that corresponds to a PDU session #1 and that serves the terminal device in the source network device is an S-CAG ID #1 (that is, the session belongs the CAG ID #1), the source network device determines that a network slice corresponding to the PDU session #1 in a cell served by the target network device is the S-NSSAI #1.

In another possible manner, the source access network device determines, based on a mapping relationship between a CAG ID and a network slice supported by the target access network device and based on a CAG ID of the target access network device, first S-NSSAI of a network slice that serves the session. In this case, the handover request message further includes the first S-NSSAI. For example, the mapping relationship between the CAG ID and the network slice supported by the target access network device is as follows: A network slice corresponding to a CAG ID #1 is S-NSSAI #A, and a network slice corresponding to a CAG ID #2 is S-NSSAI #B. If the source network device determines to hand over a PDU session #1 of the terminal to the CAG ID #2 in the target network device (where for example, the target cell of the handover is the CAG ID #2), the source network device determines that a network slice corresponding to the PDU session #1 in a cell served by the target network device is the S-NSSAI #2.

It should be understood that, similar to the session in FIG. 3A and FIG. 3B, when the terminal device is handed over from the source access network device to the target access network device, the terminal device may perform a plurality of sessions, and all of the plurality of sessions need to change from being served by the source access network device to being served by the target access network device. For ease of description, a session that is of the terminal device and that needs to be handed over is used as an example for description in this application. When the foregoing handover occurs, a processing procedure of another session is similar to that of the foregoing first session, and details are not described in this application.

It should be further understood that, before the source access network device sends the handover request message to the target access network device, the method procedure in FIG. 7 further includes: S701. The source access network device determines the target access network device. Specifically, the source access network device determines the target access network device based on mapping information. After determining the target access network device, the source access network device can send the foregoing handover request message to the target access network device.

Specifically, the source access network device may determine the target access network device based on network slice information exchanged between the source access network device and the target access network device. For a process of exchanging network slice information between the source access network device and the target access network device, refer to FIG. 4. Details are not described herein again.

Optionally, the session is a PDU session, and correspondingly, the identifier of the session may be a PDU session ID.

In a possible implementation, before the terminal device is handed over from the source access network device to the target access network device, the terminal device is handed over from the target access network device to the source access network device. In addition, S-NSSAI of the network slice that is in the target access network device and that serves the first session performed by the terminal device is third S-NSSAI. In this case, the handover request message further includes the third S-NSSAI.

It should be understood that when the handover request message includes the third S-NSSAI, the target access network device may serve the first session by using a network slice corresponding to the third S-NSSAI.

In another possible implementation, the handover request message further includes the second S-NSSAI.

Further, after the target access network device receives the handover request message sent by the source access network device, the target access network device can determine the first S-NSSAI based on the information included in the handover request message, and the network slice that is in the target access network device and that corresponds to the first S-NSSAI serves the session. That is, the method procedure shown in FIG. 7 further includes: S720. The target access network device determines the first S-NSSAI. Alternatively, when the handover request message includes the first S-NSSAI, the target access network device does not need to perform S720.

Specifically, the target access network device determines the first S-NSSAI based on the second S-NSSAI. In at least this embodiment of this application, that the target access network device learns of the second S-NSSAI includes the following two possible embodiments:

In one possible implementation, the target access network device determines the second S-NSSAI based on the identifier of the session included in the handover request message. In the other possible implementation, the handover request message sent by the terminal device to the core network device includes the second S-NSSAI.

Specifically, that the core network device determines the first S-NSSAI based on the information included in the handover requirement message includes two possible cases:

Case 1:

The target access network device determines the first S-NSSAI based on the second S-NSSAI and a mapping relationship, where the mapping relationship is a correspondence between S-NSSAI of a network slice in the source access network device and S-NSSAI of a network slice in the target access network device. Alternatively, the mapping relationship is a mapping relationship between S-NSSAI of a network slice in the source access network device and a CAG ID of a CAG served by the target access network device. In this case, the target access network device determines the first S-NSSAI based on a CAG ID corresponding to the second S-NSSAI.

Case 2:

The target access network device knows that the target access network device provides only one network slice serving all sessions that need to be handed over from the source access network device to the target access network device, and S-NSSAI of the network slice is the first S-NSSAI. In this case, the core network device determines the first S-NSSAI. Alternatively, the target access network device knows a CAG ID of a CAG served by a network slice, in the target access network device, serving all sessions that need to be handed over from the source access network device to the target access network device. In this case, the target access network device determines the first S-NSSAI based on the CAG ID.

With reference to FIG. 5 and FIG. 6, the foregoing has described in detail the case in which the target access network device learns that the target access network device uses the network slice corresponding to the first S-NSSAI to serve all the sessions that need to be handed over from the source access network device to the target access network device, or the case in which the target access network device learns of the foregoing mapping relationship and learns that the target access network device uses the plurality of network slice corresponding to the plurality of pieces of S-NSSAI to serve all the sessions that need to be handed over from the source access network device to the target access network device. Details are not described herein again.

In a possible implementation, the handover request message further includes handover type information, and the handover type information is used to indicate that the current handover between network devices is handover from the communication network to which the source access network device belongs to the communication network to which the target access network device belongs.

For example, if the source access network device is a network device that supports an NPN, and the target access network device is a network device that supports a PLMN, the handover type information is used to indicate that the handover is from the NPN to the PLMN. Alternatively, if the source access network device is a network device that supports a PLMN, and the target access network device is a network device that supports an NPN, the handover type information is used to indicate that the handover is from the PLMN to the NPN. Alternatively, the handover type information is used to indicate handover between a PLMN and an NPN.

Specifically, after determining the first S-NSSAI, the target access network device sends a handover request response message to the source access network device. To be specific, the method procedure shown in FIG. 7 further includes: S730. The target access network device sends the handover request response message to the source access network device. The handover request response message is used to indicate that the target access network device is ready for handover, and the terminal device may be handed over from the source access network device to the target access network device.

Further, to notify the core network device that a downlink path changes, the method procedure shown in FIG. 7 further includes: S740. The target access network device sends a path switch request message to the core network device, where the path switch request message includes the identifier of the session.

In a possible implementation, the path switch request message includes the second S-NSSAI.

In a possible implementation, the path switch request message includes the first S-NSSAI.

In a possible implementation, when the handover request message further includes the third S-NSSAI, the path switch request message includes the third S-NSSAI.

In a possible implementation, when the handover request message further includes the handover type information, the path switch request message includes the handover type information.

Further, the method procedure shown in FIG. 7 further includes: S750. The core network device sends a path switch (path switch) request response message to the target access network device, where the path switch request response message is used to indicate that the core network device has learned that the downlink transmission path changes.

It should be understood that sequence numbers of the foregoing processes do not mean an execution sequence in the foregoing method embodiments. The execution sequence of the processes should be determined based on functions and internal logic of the processes, and should not constitute any limitation on the implementation processes of the embodiments of this application.

The foregoing describes in detail the handover methods provided in the embodiments of this application with reference to FIG. 3A to FIG. 7. The following describes in detail handover apparatuses provided in the embodiments of this application with reference to FIG. 8 to FIG. 13.

Figure 8:
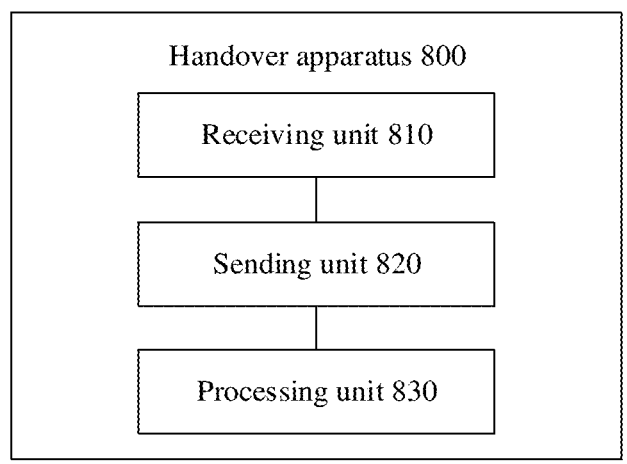
FIG. 8 is a schematic diagram of a handover apparatus 800 according to this application.

FIG. 8 is a schematic diagram of a handover apparatus 800 according to this application. As shown in FIG. 8, the apparatus 800 includes a receiving unit 810, a sending unit 820, and a processing unit 830.

The receiving unit 810 is configured to receive a handover requirement message sent by a source access network device, where the handover requirement message includes an identifier of a session, and the session is a session that is of a terminal device and that needs to be handed over from the source access network device to a target access network device.

The sending unit 820 is configured to send a handover request message to the target access network device, where the handover request message includes first single network slice selection assistance information S-NSSAI.

The first S-NSSAI is determined based on second S-NSSAI and a network slice supported by the target access network device, a network slice that is in the target access network device and that corresponds to the first S-NSSAI serves the session, and the second S-NSSAI is S-NSSAI that is of a network slice in the source access network device and that corresponds to the identifier of the session.

The apparatus 800 exactly corresponds to the core network device in the method embodiments. The apparatus 800 may be the core network device in the method embodiments, or a chip or a function module in the core network device in the method embodiments. The corresponding units of the apparatus 800 are configured to perform corresponding steps performed by the core network device in the method embodiments shown in FIG. 3A to FIG. 7.

The receiving unit 810 of the apparatus 800 performs the receiving steps performed by the core network device in the method embodiments, for example, step S310 of receiving the handover requirement message sent by the source access network device in FIG. 3A and FIG. 3B, step S333 of receiving the first S-NSSAI sent by the network slice selection device in FIG. 6, step S343 of receiving the first S-NSSAI sent by the network slice selection device in FIG. 6, step S352 of receiving the first S-NSSAI sent by the network slice selection device in FIG. 6, step S370 of receiving the handover response message sent by the target access network device in FIG. 6, step S530 of receiving the interface setup request message sent by the target access network device in FIG. 5, step S610 of receiving the interface setup request message sent by the target access network device in FIG. 6, and step S740 of receiving the path switch request message sent by the target access network device in FIG. 7.

The sending unit 820 of the apparatus 800 performs the sending steps performed by the core network device in the method embodiments, for example, step S330 of sending the identifier of the session to the network slice selection device in FIG. 3A and FIG. 3B, step S341 of sending the second S-NSSAI to the network slice selection device in FIG. 3A and FIG. 3B, step S350 of sending the second S-NSSAI to the network slice selection device in FIG. 3A and FIG. 3B, step S360 of sending the handover request message to the target access network device in FIG. 3A and FIG. 3B, step S550 of sending the interface setup response message to the target access network device in FIG. 5, step S630 of sending the interface setup response message to the target access network device in FIG. 6, and step S750 of sending the path switch request response message to the target access network device in FIG. 7.

The processing unit 830 of the apparatus 800 performs steps implemented or processed inside the core network device in the method embodiments, for example, step S320 of determining the first S-NSSAI in FIG. 3A and FIG. 3B, step S340 of determining the second S-NSSAI in FIG. 3A and FIG. 3B, step S540 of determining the registration area in FIG. 5, step S620 of determining the first S-NSSAI or determining the plurality of pieces of S-NSSAI and the mapping relationship in FIG. 6.

The receiving unit 810 and the sending unit 820 may form a transceiver unit, which has both receiving and sending functions. The processing unit 830 may be a processor. The sending unit 820 may be a transmitter. The receiving unit 810 may be a receiver. The receiver and the transmitter may be integrated to form a transceiver.

Figure 9:
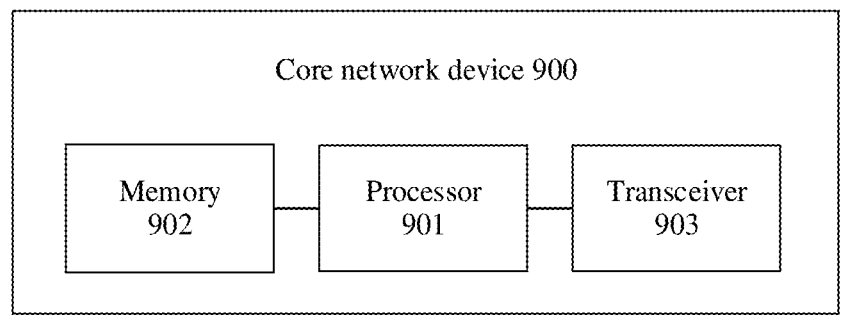
FIG. 9 shows a core network device 900 according to an embodiment of this application.

As shown in FIG. 9, an embodiment of this application further provides a core network device 900. The core network device 900 includes a processor 901, a memory 902, and a transceiver 903. The memory 902 stores instructions or a program, and the processor 903 is configured to execute the instructions or the program stored in the memory 902. When the instructions or the program stored in the memory 902 are/is executed, the transceiver 903 is configured to perform operations performed by the receiving unit 810 and the sending unit 820 in the embodiment shown in FIG. 8, and the processor 901 is configured to perform operations performed by the processing unit 830 in the embodiment shown in FIG. 8.

Figure 10:
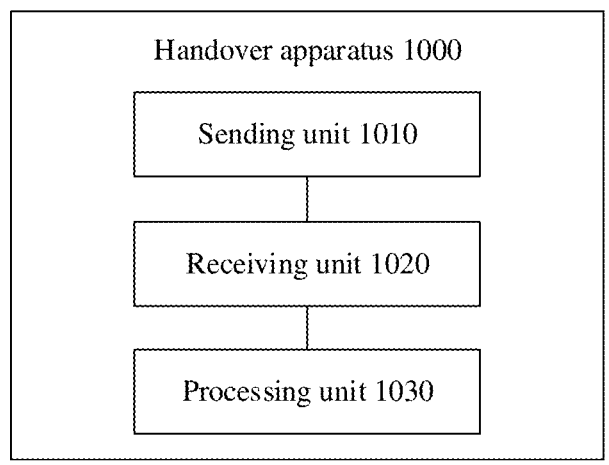
FIG. 10 is a schematic diagram of a handover apparatus 1000 according to this application.

FIG. 10 is a schematic diagram of a handover apparatus 1000 according to this application. As shown in FIG. 10, the apparatus 1000 includes a sending unit 1010, a receiving unit 1020, and a processing unit 1030.

The sending unit 1010 is configured to send a handover requirement message to a core network device, where the handover requirement message includes an identifier of a session, the session is a session that is of a terminal device and that needs to be handed over from a source access network device to a target access network device, and second single network slice selection assistance information S-NSSAI corresponding to the identifier of the session is S-NSSAI of a network slice that is in the source access network device and that serves the session.

The receiving unit 1020 is configured to receive a handover command message sent by the core network device, where the handover command message is used to indicate the terminal device to be handed over from the source access network device to the target access network device, S-NSSAI of a network slice that is in the target access network device and that serves the session is first S-NSSAI, and the first S-NSSAI is determined based on the second S-NSSAI and a network slice supported by the target access network device.

The apparatus 1000 exactly corresponds to the source access network device in the method embodiments. The apparatus 1000 may be the source access network device in the method embodiments, or a chip or a function module in the source access network device in the method embodiments. The corresponding units of the apparatus 1000 are configured to perform corresponding steps performed by the source access network device in the method embodiments shown in FIG. 3A to FIG. 7.

The sending unit 1010 of the apparatus 1000 performs the sending steps performed by the source access network device in the method embodiments, for example, step S310 of sending the handover requirement message to the core network device in FIG. 3A and FIG. 3B, step S410 of sending the interface setup request message to the target access network device in FIG. 4, and step S410 of sending the handover request message to the target access network device in FIG. 7.

The receiving unit 1020 of the apparatus 1000 performs the receiving steps performed by the source access network device in the method embodiments, for example, step S380 of receiving the handover command message sent by the core network device in FIG. 3A and FIG. 3B, step S420 of receiving the interface setup response message sent by the target access network device in FIG. 4, and step S730 of receiving the handover request response message sent by the target access network device in FIG. 7.

The processing unit 1030 of the apparatus 1000 performs steps implemented or processed inside the source access network device in the method embodiments, for example, step S301 of determining the target access network device in FIG. 3A and FIG. 3B and step S701 of determining the target access network device in FIG. 7.

The sending unit 1010 and the receiving unit 1020 may form a transceiver unit, which has both receiving and sending functions. The processing unit 1030 may be a processor. The sending unit 1010 may be a transmitter. The receiving unit 1020 may be a receiver. The receiver and the transmitter may be integrated to form a transceiver.

Figure 11:
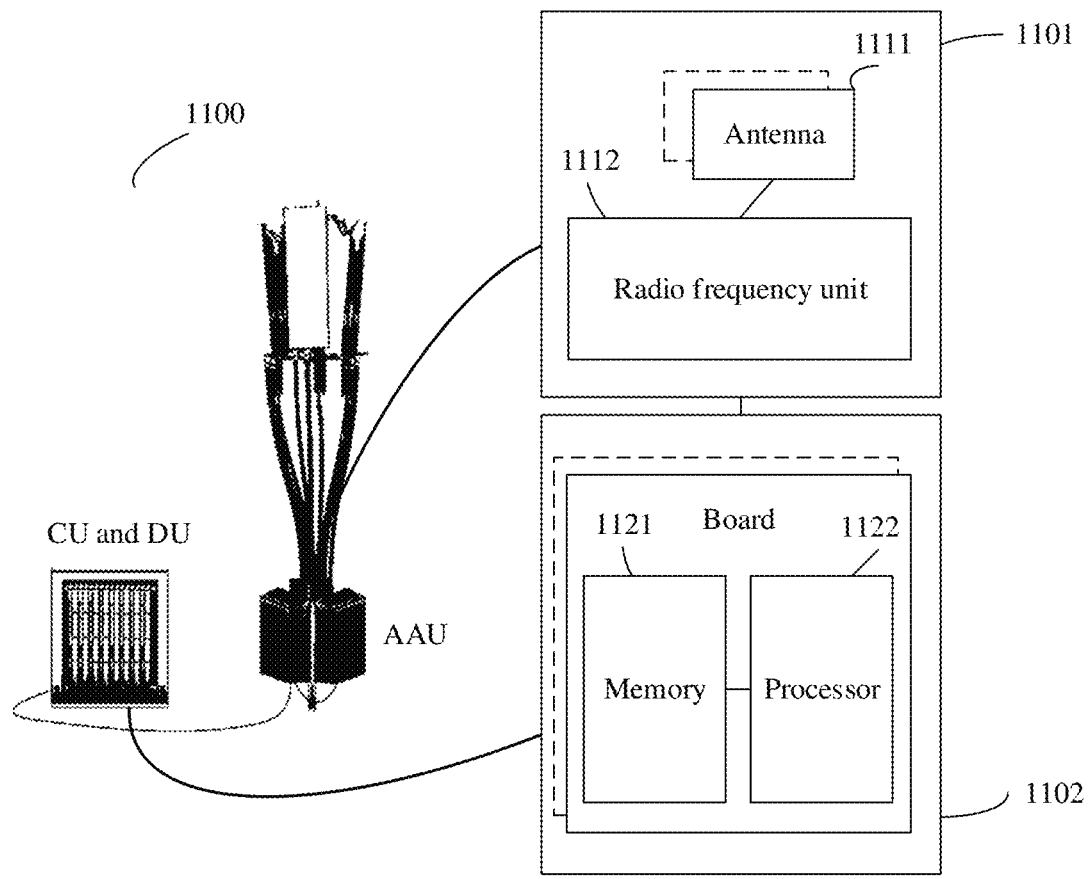
FIG. 11 shows a source access network device 1100 according to an embodiment of this application.

FIG. 11 is a schematic diagram of a structure of a source access network device 1100 applicable to an embodiment of this application, and the source access network device 1100 may be configured to implement a function of the source access network device in the foregoing handover methods. For example, FIG. 11 may be a schematic diagram of a structure of a base station. As shown in FIG. 11, the source access network device may be applied to the system shown in FIG. 1.

In a 5G communication system, the source access network device 1100 may include a CU, a DU, and an AAU. In comparison with a source access network device including one or more radio frequency units, for example, a remote radio unit (RRU), and one or more baseband units (BBU) in an LTE communication system, a non-real-time part of the original BBU is split and redefined as a CU, which is responsible for processing a non-real-time protocol and service, some physical layer processing functions of the BBU are combined with the original RRU and a passive antenna into an AAU, and the remaining functions of the BBU are redefined as a DU, which is responsible for processing a physical layer protocol and a real-time service. In short, a CU and a DU are distinguished between each other based on real-time performance of processed content, and an AAU is a combination of an RRU and an antenna.

The CU, the DU, and the AAU may be deployed separately or together. Therefore, there may be a plurality of network deployment forms. A possible deployment form is shown in FIG. 11, and is consistent with that of a conventional 4G source access network device, in which the CU and the DU are deployed on same hardware. It should be understood that FIG. 11 is merely an example, and constitutes no limitation on the protection scope of this application. For example, the deployment form may alternatively be that DUs are deployed in a 5G BBU room, CUs or DUs are deployed together, or CUs are centralized at a higher level.

The AAU may implement a transceiver function, is referred to as a transceiver unit 1101, and corresponds to the receiving unit 1020 and the sending unit 1010 in FIG. 10. Optionally, the transceiver unit 1101 may also be referred to as a transceiver machine, a transceiver circuit, a transceiver, or the like, and may include at least one antenna 1111 and a radio frequency unit 1112. Optionally, the transceiver unit 1101 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The AAU is mainly configured to: receive and send a radio frequency signal, and perform conversion between a radio frequency signal and a baseband signal, for example, configured to send control information in the foregoing embodiments to a terminal device. The CU and the DU may implement an internal processing function, and are referred to as a processing unit 1102, which is configured to perform baseband processing, control a base station, and the like. The AAU and the CU together with the DU may be physically disposed together, or may be physically disposed separately, that is, a distributed base station.

The CU and the DU are a control center of the source access network device, and may also be referred to as a processing unit, which may correspond to the processing unit 1030 and is mainly configured to complete a baseband processing function, such as channel coding, multiplexing, modulation, and spreading. For example, the CU and DU (the processing unit 1030) 1102 may be configured to control the source access network device 1100 to perform an operation procedure related to the source access network device in the foregoing method embodiments, for example, determining a length of a symbol that carries control information of the terminal device.

In an example, the CU and the DU may include one or more boards, and a plurality of boards may together support a radio access network (for example, an LTE system, or a 5G system) of a single access standard, or may separately support radio access networks of different access standards. The CU and the DU further include a memory 1121 and a processor 1122. The memory 1121 is configured to store necessary instructions and necessary data. For example, the memory 1121 stores a codebook in the foregoing embodiments. The processor 1122 is configured to control the base station to perform a necessary action, for example, configured to control the base station to perform an operation procedure related to the source access network device in the foregoing method embodiments. The memory 1121 and the processor 1122 may serve the one or more boards. In other words, the memory and the processor may be separately disposed on each board. Alternatively, a plurality of boards may share a same memory and a same processor. In addition, a necessary circuit may be further disposed on each board.

The CU and DU 1102 may be configured to perform an action implemented inside the source access network device in the foregoing method embodiments, and the AAU may be configured to perform an action of sending from the source access network device to the terminal device in the foregoing embodiments or an action of receiving from the terminal device in the foregoing method embodiments. For details, refer to the descriptions in the foregoing method embodiments. Details are not described herein again.

In addition, the source access network device is not limited to the form shown in FIG. 11, and may also be in another form. For example, the source access network device includes a BBU and an adaptive radio unit (ARU), includes a BBU and an active antenna unit (AAU), may be customer premises equipment (CPE), or may be in another form. This is not limited in this application.

It should be understood that the source access network device 1100 shown in FIG. 11 can implement functions of the source access network device in the method embodiments in FIG. 3A to FIG. 7. Operations and/or functions of the units of the source access network device 1100 are separately used to implement corresponding procedures performed by the source access network device in the foregoing method embodiments of this application. Detailed descriptions are properly omitted herein, to avoid repetition. The structure of the source access network device shown in FIG. 11 is merely a possible form, but shall not constitute any limitation on the embodiments of this application. According to this application, a possibility that a source access network device in another form in the future is not excluded.

Figure 12:
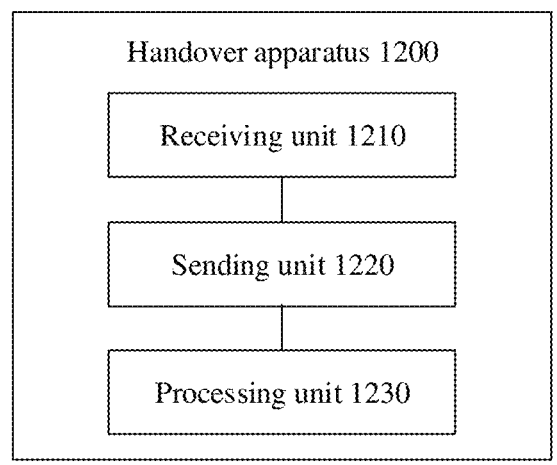
FIG. 12 is a schematic diagram of a handover apparatus 1200 according to this application.

FIG. 12 is a schematic diagram of a handover apparatus 1200 according to this application. As shown in FIG. 12, the apparatus 1200 includes a receiving unit 1210, a sending unit 1220, and a processing unit 1230.

The receiving unit 1210 is configured to receive a handover request message sent by a core network device, where the handover request message includes first S-NSSAI.

The first S-NSSAI is determined based on second S-NSSAI and a network slice supported by a target access network device, a network slice that is in the target access network device and that corresponds to the first S-NSSAI serves a session, and the second S-NSSAI is S-NSSAI that is in a source access network device and that corresponds to an identifier of the session, and the session is a session that is of a terminal device and that needs to be handed over from the source access network device to the target access network device.

The sending unit 1220 is configured to send a handover response message to the core network device, where the handover response message is used to indicate that the terminal device can be handed over to the target access network device.

The apparatus 1200 exactly corresponds to the target access network device in the method embodiments. The apparatus 1200 may be the target access network device in the method embodiments, or a chip or a function module in the target access network device in the method embodiments. The corresponding units of the apparatus 1200 are configured to perform corresponding steps performed by the target access network device in the method embodiments shown in FIG. 3A to FIG. 7.

The receiving unit 1210 of the apparatus 1200 performs the receiving steps performed by the target access network device in the method embodiments, for example, step S360 of receiving the handover request message sent by the core network device in FIG. 3A and FIG. 3B, step S420 of receiving the interface setup request message sent by the source access network device in FIG. 4, step S520 of receiving the configuration information sent by the management device in FIG. 5, step S550 of receiving the interface setup response message sent by the core network device in FIG. 5, step S630 of receiving the interface setup response message sent by the core network device in FIG. 6, and step S750 of receiving the path switch request response message sent by the core network device in FIG. 7.

The sending unit 1220 of the apparatus 1200 performs the sending steps performed by the target access network device in the method embodiments, for example, step S370 of sending the handover response message to the core network device in FIG. 3A and FIG. 3B, step S420 of sending the interface setup response message to the source access network device in FIG. 4, step S530 of sending the interface setup request message to the core network device in FIG. 5, step S610 of sending the interface setup request message to the core network device in FIG. 6, and step S740 of sending the path switch request message to the core network device in FIG. 7.

The processing unit 1230 of the apparatus 1200 performs steps implemented or processed inside the target access network device in the method embodiments, for example, step S720 of determining the first S-NSSAI in FIG. 7.

The sending unit 1220 and the receiving unit 1210 may form a transceiver unit, which has both receiving and sending functions. The processing unit 1230 may be a processor. The sending unit 1220 may be a transmitter. The receiving unit 1210 may be a receiver. The receiver and the transmitter may be integrated to form a transceiver.

Figure 13:
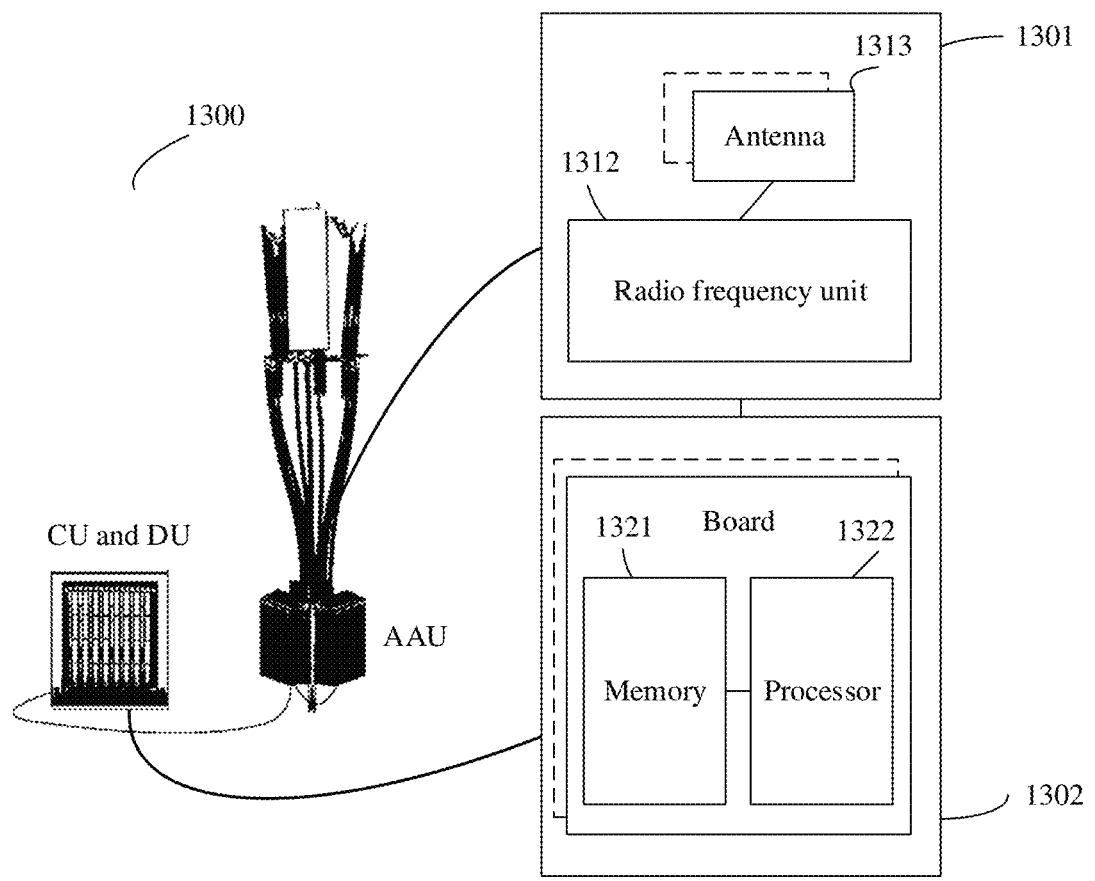
FIG. 13 shows a target access network device 1300 according to an embodiment of this application.

FIG. 13 is a schematic diagram of a structure of a target access network device 1300 applicable to an embodiment of this application, and the target access network device 1300 may be configured to implement a function of the target access network device in the foregoing handover methods. For example, FIG. 13 may be a schematic diagram of a structure of a base station. As shown in FIG. 13, the target access network device may be applied to the system shown in FIG. 1.

In a 5G communication system, the target access network device 1300 may include a CU, a DU, and an AAU. In comparison with a target access network device including one or more radio frequency units, for example, an RRU, and one or more baseband units BBUs in an LTE communication system, a non-real-time part of the original BBU is split and redefined as a CU, which is responsible for processing a non-real-time protocol and service, some physical layer processing functions of the BBU are combined with the original RRU and a passive antenna into an AAU, and the remaining functions of the BBU are redefined as a DU, which is responsible for processing a physical layer protocol and a real-time service. In short, a CU and a DU are distinguished between each other based on real-time performance of processed content, and an AAU is a combination of an RRU and an antenna.

The AAU may implement a transceiver function, is referred to as a transceiver unit 1321, and corresponds to the receiving unit 1210 and the sending unit 1220 in FIG. 12. Optionally, the transceiver unit 1321 may also be referred to as a transceiver machine, a transceiver circuit, a transceiver, or the like, and may include at least one antenna 1313 and a radio frequency unit 1312. Optionally, the transceiver unit 1321 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The AAU is mainly configured to: receive and send a radio frequency signal, and perform conversion between a radio frequency signal and a baseband signal, for example, configured to send control information in the foregoing embodiments to a terminal device. The CU and the DU may implement an internal processing function, and are referred to as a processing unit 1322. The AAU and the CU together with the DU may be physically disposed together, or may be physically disposed separately, that is, a distributed base station.

The CU and the DU are a control center of the target access network device, and may also be referred to as a processing unit, which may correspond to the processing unit 1230 and is mainly configured to complete a baseband processing function, such as channel coding, multiplexing, modulation, and spreading. For example, the CU and DU (the processing unit 1230) 1322 may be configured to control the target access network device 1320 to perform an operation procedure related to the target access network device in the foregoing method embodiments, for example, determining a length of a symbol that carries control information of the terminal device.

In an example, the CU and the DU may include one or more boards, and a plurality of boards may together support a radio access network (for example, an LTE system, or a 5G system) of a single access standard, or may separately support radio access networks of different access standards. The CU and the DU further include a memory 1321 and a processor 1322. The memory 1321 is configured to store necessary instructions and necessary data. For example, the memory 1321 stores a codebook in the foregoing embodiments. The processor 1322 is configured to control the base station to perform a necessary action, for example, configured to control the base station to perform an operation procedure related to the target access network device in the foregoing method embodiments. The memory 1321 and the processor 1322 may serve the one or more boards. In other words, the memory and the processor may be separately disposed on each board. Alternatively, a plurality of boards may share a same memory and a same processor. In addition, a necessary circuit may be further disposed on each board.

The CU and the DU may be configured to perform an action implemented inside the target access network device in the foregoing method embodiments, and the AAU may be configured to perform an action of sending from the target access network device to the terminal device in the foregoing embodiments or an action of receiving from the terminal device in the foregoing method embodiments. For details, refer to the descriptions in the foregoing method embodiments. Details are not described herein again.

In addition, the target access network device is not limited to the form shown in FIG. 13, and may also be in another form. For example, the target access network device includes a BBU and an adaptive radio unit (ARU), includes a BBU and an active antenna unit (AAU), may be customer premises equipment (CPE), or may be in another form. This is not limited in this application.

It should be understood that the target access network device 1300 shown in FIG. 13 can implement functions of the target access network device in the method embodiments in FIG. 3A to FIG. 7. Operations and/or functions of the units in the target access network device 1320 are separately used to implement corresponding procedures performed by the network device in the foregoing method embodiments of this application. Detailed descriptions are properly omitted herein, to avoid repetition. The structure of the network device shown in FIG. 13 is merely a possible form, but shall not constitute any limitation on the embodiments of this application. In this application, a possibility that there may be a network device in another form in the future is not excluded.

Figure 14:
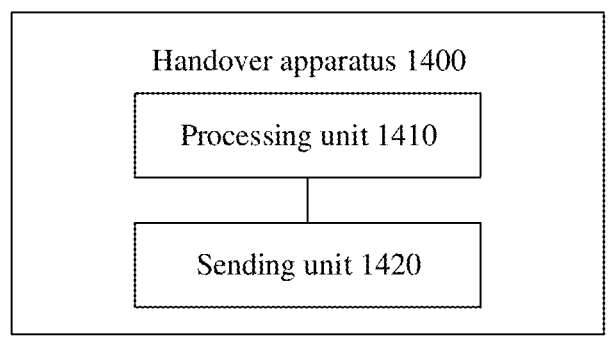
FIG. 14 is a schematic diagram of a handover apparatus 1400 according to this application.

FIG. 14 is a schematic diagram of a handover apparatus 1400 according to this application. As shown in FIG. 14, the apparatus 1400 includes a processing unit 1410 and a sending unit 1420.

The processing unit 1410 is configured to determine first single network slice selection assistance information S-NSSAI based on a preset policy, where a network slice that is in a target access network device and that corresponds to the first S-NSSAI serves all sessions that need to be handed over from a source access network device to the target access network device.

The processing unit 1410 is alternatively configured to determine a mapping relationship and S-NSSAI of a network slice in a target access network device based on a preset policy, where the mapping relationship is a correspondence between S-NSSAI of a network slice in a source access network device and the S-NSSAI of the network slice in the target access network device.

The sending unit 1420 is configured to send configuration information to the target access network device, where the configuration information includes the first S-NSSAI, or the configuration information includes the mapping relationship and the S-NSSAI of the network slice in the target access network device.

The apparatus 1400 exactly corresponds to the management device in the method embodiments. The apparatus 1400 may be the management device in the method embodiments, or a chip or a function module in the management device in the method embodiments. The corresponding units of the apparatus 1400 are configured to perform corresponding steps performed by the management device in the method embodiments shown in FIG. 3A to FIG. 7.

The processing unit 1410 of the apparatus 1400 performs steps implemented or processed inside the management device in the method embodiments, for example, step S510 of determining the configuration information in FIG. 5.

The sending unit 1420 of the apparatus 1400 performs the sending steps performed by the management device in the method embodiments, for example, step S330 of sending the identifier of the session to the network slice selection device in FIG. 3A and FIG. 3B and step S520 is performed to sending the configuration information to the target access network device in FIG. 5.

The management device may further include a receiving unit, configured to receive information sent by another device. The receiving unit and the sending unit 1420 may form a transceiver unit, which has both receiving and sending functions. The processing unit 1410 may be a processor. The sending unit 1420 may be a transmitter. The receiving unit may be a receiver. The receiver and the transmitter may be integrated to form a transceiver.

Figure 15:
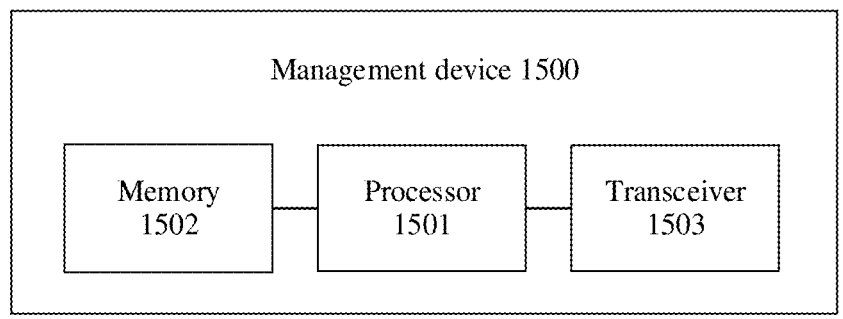
FIG. 15 shows a management device 1500 according to an embodiment of this application.

As shown in FIG. 15, an embodiment of this application further provides a management device 1500. The management device 1500 includes a processor 1501, a memory 1502, and a transceiver 1503. The memory 1502 stores instructions or a program, and the processor 1503 is configured to execute the instructions or the program stored in the memory 1502. When the instructions or the program stored in the memory 1502 are/is executed, the transceiver 1503 is configured to perform operations performed by the receiving unit and the sending unit 1420 in the embodiment shown in FIG. 14, and the processor 1501 is configured to perform operations performed by the processing unit 1410 in the embodiment shown in FIG. 14.

Figure 16:
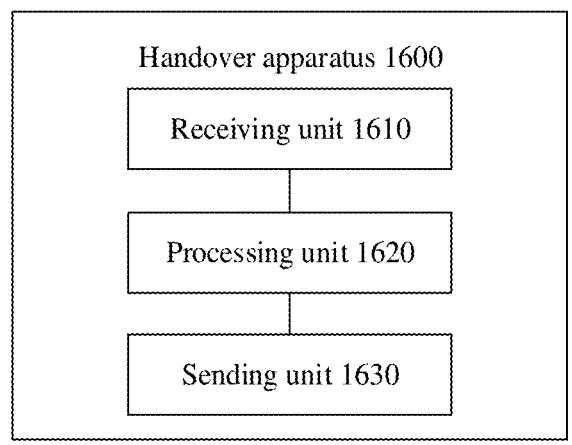
FIG. 16 is a schematic diagram of a handover apparatus 1600 according to this application.

FIG. 16 is a schematic diagram of a handover apparatus 1600 according to this application. As shown in FIG. 16, the apparatus 1600 includes a receiving unit 1610, a processing unit 1620, and a sending unit 1630.

The receiving unit 1610 configured to receive second single network slice selection assistance information S-NSSAI sent by a core network device, where the second S-NSSAI is S-NSSAI that is of a network slice in a source access network device and that corresponds to an identifier of a session, and the session is a session that is of a terminal device and that needs to be handed over from the source access network device to a target access network device.

The processing unit 1620 is configured to determine first S-NSSAI based on the second S-NSSAI, where a network slice that is in the target access network device and that corresponds to the first S-NSSAI serves the session.

The sending unit 1630 is configured to send the first S-NSSAI to the core network device.

The apparatus 1600 exactly corresponds to the network slice selection device in the method embodiments. The apparatus 1600 may be the network slice selection device in the method embodiments, or a chip or a function module in the network slice selection device in the method embodiments. The corresponding units of the apparatus 1600 are configured to perform corresponding steps performed by the network slice selection device in the method embodiments shown in FIG. 3A to FIG. 7.

The receiving unit 1610 of the apparatus 1600 performs the receiving steps performed by the network slice selection device in the method embodiments, for example, step S330 of receiving the identifier of the session sent by the core network device in FIG. 3A and FIG. 3B, step S341 of receiving the second S-NSSAI sent by the core network device in FIG. 3A and FIG. 3B, and step S350 of receiving the second S-NSSAI sent by the core network device in FIG. 3A and FIG. 3B.

The processing unit 1620 of the apparatus 1600 performs steps implemented or processed inside the network slice selection device in the method embodiments, for example, step S310 of determining the second S-NSSAI in FIG. 3A and FIG. 3B, step 332 of determining the first S-NSSAI in FIG. 3A and FIG. 3B, step 342 of determining the first S-NSSAI in FIG. 3A and FIG. 3B, and step 351 of determining the first S-NSSAI in FIG. 3A and FIG. 3B.

The sending unit 1630 of the apparatus 1600 performs the sending steps performed by the network slice selection device in the method embodiments, for example, step S333 of sending the first S-NSSAI to the core network device in FIG. 3A and FIG. 3B, step S343 of sending the first S-NSSAI to the core network device in FIG. 3A and FIG. 3B, and step S352 of sending the first S-NSSAI to the core network device in FIG. 3A and FIG. 3B.

The receiving unit 1610 and the sending unit 1630 may form a transceiver unit, which has both receiving and sending functions. The processing unit 1620 may be a processor. The sending unit 1630 may be a transmitter. The receiving unit 1610 may be a receiver. The receiver and the transmitter may be integrated to form a transceiver.

Figure 17:
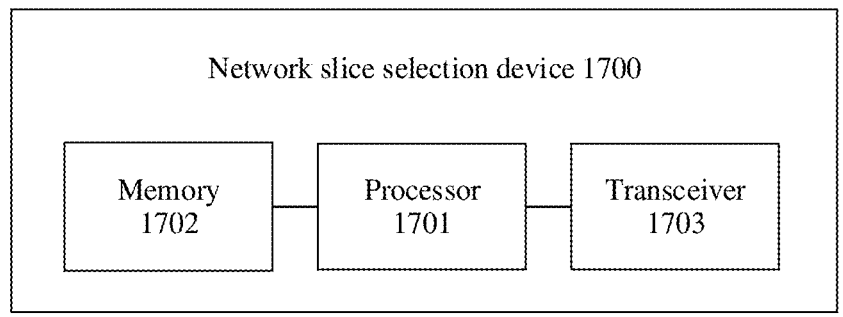
FIG. 17 shows a network slice selection device 1700 according to an embodiment of this application.

As shown in FIG. 17, an embodiment of this application further provides a network slice selection device 1700. The network slice selection device 1700 includes a processor 1701, a memory 1702, and a transceiver 1703. The memory 1702 stores instructions or a program, and the processor 1703 is configured to execute the instructions or the program stored in the memory 1702. When the instructions or the program stored in the memory 1702 are/is executed, the transceiver 1703 is configured to perform operations performed by the receiving unit 1610 and the sending unit 1630 in the embodiment shown in FIG. 16, and the processor 1701 is configured to perform operations performed by the processing unit 1620 in the embodiment shown in FIG. 16.

A person skilled in the art may understand that for ease of description, FIG. 17 shows only one memory and one processor. An actual intermediate node may include a plurality of processors and a plurality of memories. The memory may also be referred to as a storage medium, a storage device, or the like. This is not limited in at least this embodiment of this application.

The handover apparatus in the foregoing apparatus embodiments corresponds to the handover apparatus in the method embodiments. A corresponding module or unit performs a corresponding step. For example, a communication unit (a transceiver) performs a receiving step or a sending step in the method embodiments, and a processing unit (a processor) may perform another step other than the sending step and the receiving step. For a function of a specific unit, refer to a corresponding method embodiment. There may be one or more processors.

An embodiment of this application further provides a communication system, including the foregoing handover apparatus.

This application further provides a computer-readable storage medium. The computer-readable storage medium stores instructions. When the instructions are run on a computer, the computer is enabled to perform steps performed by the core network device in the methods shown in FIG. 3A to FIG. 7.

This application further provides a computer-readable storage medium. The computer-readable storage medium stores instructions. When the instructions are run on a computer, the computer is enabled to perform steps performed by the source access network device in the methods shown in FIG. 3A to FIG. 7.

This application further provides a computer-readable storage medium. The computer-readable storage medium stores instructions. When the instructions are run on a computer, the computer is enabled to perform steps performed by the target access network device in the methods shown in FIG. 3A to FIG. 7.

This application further provides a computer-readable storage medium. The computer-readable storage medium stores instructions. When the instructions are run on a computer, the computer is enabled to perform steps performed by the management device in the methods shown in FIG. 3A to FIG. 7.

This application further provides a computer-readable storage medium. The computer-readable storage medium stores instructions. When the instructions are run on a computer, the computer is enabled to perform steps performed by the network slice selection device in the methods shown in FIG. 3A to FIG. 7.

This application further provides a computer program product including instructions. When the computer program product runs on a computer, the computer is enabled to perform steps performed by the core network device in the methods shown in FIG. 3A to FIG. 7.

This application further provides a computer program product including instructions. When the computer program product runs on a computer, the computer is enabled to perform steps performed by the source access network device in the methods shown in FIG. 3A to FIG. 7.

This application further provides a computer program product including instructions. When the computer program product runs on a computer, the computer is enabled to perform steps performed by the target access network device in the methods shown in FIG. 3A to FIG. 7.

This application further provides a computer program product including instructions. When the computer program product runs on a computer, the computer is enabled to perform steps performed by the management device in the methods shown in FIG. 3A to FIG. 7.

This application further provides a computer program product including instructions. When the computer program product runs on a computer, the computer is enabled to perform steps performed by the network slice selection device in the methods shown in FIG. 3A to FIG. 7.

This application further provides a chip, including a processor. The processor is configured to read a computer program stored in a memory and run the computer program, to perform a corresponding operation and/or procedure performed by the core network device in the handover methods provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

This application further provides a chip, including a processor. The processor is configured to invoke a computer program stored in a memory and run the computer program, to perform a corresponding operation and/or procedure performed by the source access network device in the handover methods provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

This application further provides a chip, including a processor. The processor is configured to invoke a computer program stored in a memory and run the computer program, to perform a corresponding operation and/or procedure performed by the target access network device in the handover methods provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

This application further provides a chip, including a processor. The processor is configured to invoke a computer program stored in a memory and run the computer program, to perform a corresponding operation and/or procedure performed by the management device in the handover methods provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

This application further provides a chip, including a processor. The processor is configured to invoke a computer program stored in a memory and run the computer program, to perform a corresponding operation and/or procedure performed by the network slice selection device in the handover methods provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It may be understood that the memory mentioned in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. Through example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or transistor logic device, or a discrete hardware component, the memory (storage module) is integrated into the processor.

It should be noted that the memory described in this specification is intended to include, but is not limited to, these memories and any other appropriate types of memories.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

In addition, the term "and/or" in this application describes only an association relationship between associated objects and represents that three relationships may exist. For example, A and/or B may represent the following three cases: Only A exists, both A and B exist, and only B exists. In addition, the character "I" in this specification generally indicates an "or" relationship between the associated objects. The term "at least one" in this application may represent "one" and "two or more". For example, at least one of A, B, and C may represent the following seven cases: Only A exists, only B exists, only C exists, both A and B exist, both A and C exist, both C and B exist, and A, B, and C exist.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes various media that can store program code, for example, a USB flash drive, a removable hard disk, a read-only memory (ROM), a random access memory (RAM), a magnetic disk, and an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method, comprising:
   receiving, by a core network device, a handover requirement message from a source access network device, wherein the handover requirement message comprises an identifier of a session of a terminal device, and the session is to be handed over from the source access network device to a target access network device;
   determining, by the core network device, the second single network slice selection assistance information (S-NSSAI) based on the identifier of the session;
   sending, by the core network device, the second S-NSSAI to a network slice selection device;
   receiving, by the core network device, the first S-NSSAI from the network slice selection device;
   sending, by the core network device, a handover request message to the target access network device, wherein the handover request message comprises first S-NSSAI, and a first network slice of the target access network device and that corresponds to the first S-NSSAI serves the session; and
   receiving, by the core network device, an interface setup request message sent by the target access network device, wherein
   the first S-NSSAI is determined based on second S-NSSAI and the first network slice supported by the target access network device, and the second S-NSSAI is of a second network slice of the source access network device and that corresponds to the identifier of the session, and
   wherein the interface setup request message comprises the first S-NSSAI, and the first network slice of the target access network device and that corresponds to the first S-NSSAI serves each session that is to be handed over from the source access network device to the target access network device; or
   the interface setup request message comprises a mapping relationship and S-NSSAI of the first network slice of the target access network device, wherein the mapping relationship is a correspondence between S-NSSAI of the second network slice of the source access network device and the S-NSSAI of the first network slice of the target access network device.

2. The method according to claim 1, wherein the handover requirement message further comprises a target identifier, and the method further comprises:
   determining, by the core network device, the target access network device based on the target identifier; and at least one of:
   determining, by the core network device, the first S-NSSAI based on the second S-NSSAI and a mapping relationship, wherein the mapping relationship is a correspondence between S-NSSAI of the second network slice of the source access network device and S-NSSAI of the first network slice of the target access network device; or
   determining, by the core network device, the first S-NSSAI based on the second S-NSSAI, wherein the first network slice of the target access network device and that corresponds to the first S-NSSAI serves each session that is to be handed over from the source access network device to the target access network device.

3. The method according to claim 2, wherein before the determining, by the core network device, the first S-NSSAI based on the second S-NSSAI and the mapping relationship, the method further comprises:
receiving, by the core network device, the handover requirement message from the source access network device, wherein the handover requirement message comprises the second S-NSSAI; or
determining, by the core network device, the second S-NSSAI based on the identifier of the session.

4. The method according to claim 1, wherein the handover requirement message further comprises third S-NSSAI, and the third S-NSSAI corresponds to the first network slice of the target access network device and that serves the session in response to the session being handed over from the target access network device to the source access network device.

5. A handover method, comprising:
receiving, by a target access network device, a handover request message from a core network device, wherein the handover request message comprises first single network slice selection assistance information (S-NSSAI), and a first network slice of the target access network device and that corresponds to the first S-NSSAI serves a session; and
the first S-NSSAI is determined based on second S-NSSAI and the first network slice supported by the target access network device, the second S-NSSAI is of a source access network device and that corresponds to an identifier of the session of a terminal device, the session is to be handed over from the source access network device to the target access network device, and the second S-NSSAI is determined based on the identifier of the session;
sending, by the target access network device, a handover response message to the core network device, wherein the handover response message is useable to indicate that the terminal device is able to be handed over to the target access network device; and
sending, by the target access network device, an interface setup request message to the core network device, wherein the interface setup request message comprises:
the first S-NSSAI, or
a mapping relationship and S-NSSAI of the first network slice of the target access network device.

6. The method according to claim 5, wherein the method further comprises:
receiving, by the target access network device, configuration information from a management device, wherein the configuration information comprises the first S-NSSAI, and the first network slice of the target access network device and that corresponds to the first S-NSSAI serves each session that is to be handed over from the source access network device to the target access network device; or
receiving, by the target access network device, configuration information from the management device, wherein the configuration information comprises a mapping relationship and S-NSSAI of the first network slice of the target access network device, and the mapping relationship is a correspondence between S-NSSAI of the second network slice of the source access network device and the S-NSSAI of the first network slice of the target access network device.

7. The method according to claim 5 wherein the method further comprises:
receiving, by the target access network device, an interface setup response message from the core network device, wherein the interface setup response message comprises the first S-NSSAI, and the first network slice of the target access network device and that corresponds to the first S-NSSAI serves each session that is to be handed over from the source access network device to the target access network device; or
receiving, by the target access network device, the interface setup response message from the core network device, wherein the interface setup response message comprises the mapping relationship and the S-NSSAI of the first network slice of the target access network device, and the mapping relationship is the correspondence between sS-NSSAI of the second network slice of the source access network device and the S-NSSAI of the first network slice of the target access network device.

8. A handover apparatus, comprising:
at least one processor; and
a non-transitory computer-readable storage medium coupled to the at least one processor, and configured to store non-transitory instructions, and the at least one processor is configured to execute the non-transitory instructions that cause the handover apparatus to:
receive a handover requirement message from a source access network device, wherein the handover requirement message comprises an identifier of a session of a terminal device, and the session is to be handed over from the source access network device to a target access network device;
determine the second single network slice selection assistance information (S-NSSAI) based on the identifier of the session;
send the second S-NSSAI to a network slice selection device;
receive the first S-NSSAI from the network slice selection device;
send a handover request message to the target access network device, wherein the handover request message comprises first S-NSSAI, and a first network slice of the target access network device and that corresponds to the first S-NSSAI serves the session; and
receive an interface setup request message sent by the target access network device,
wherein the first S-NSSAI is determined based on second S-NSSAI and the first network slice supported by the target access network device, and the second S-NSSAI is of a second network slice of the source access network device and that corresponds to the identifier of the session, and
wherein the interface setup request message comprises the first S-NSSAI, and the first network slice of the target access network device and that corresponds to the first S-NSSAI serves each session that is to be handed over from the source access network device to the target access network device; or
the interface setup request message comprises a mapping relationship and S-NSSAI of the first network slice of the target access network device, wherein the mapping relationship is a correspondence between S-NSSAI of the second network slice of the source access network device and the S-NSSAI of the first network slice of the target access network device.

9. The apparatus according to claim 8, wherein the at least one processor is further configured to execute the non-transitory instructions thereby causing the handover apparatus to:
determine the target access network device based on the target identifier, and at least one of:
determine the first S-NSSAI based on the second S-NSSAI and a mapping relationship, wherein the mapping relationship is a correspondence between S-NSSAI of the second network slice of the source access network device and S-NSSAI of the first network slice of the target access network device; or
determine the first S-NSSAI based on the second S-NSSAI, wherein the first network slice of the target access network device and that corresponds to the first S-NSSAI serves each session that is to be handed over from the source access network device to the target access network device.

10. The apparatus according to claim 8, wherein at least one processor is further configured to execute the non-transitory instructions thereby causing the handover apparatus to:
receive the handover requirement message from the source access network device, wherein the handover requirement message comprises the second S-NSSAI; or
determine the second S-NSSAI based on the identifier of the session.

11. A handover apparatus, comprising:
at least one processor; and
a non-transitory computer-readable storage medium coupled to the at least one processor, and configured to store non-transitory instructions, and the at least one processor is configured to execute the non-transitory instructions that cause the handover apparatus to:
send a handover requirement message to a core network device, wherein the handover requirement message comprises an identifier of a session of a terminal device, the session is to be handed over from a source access network device to a target access network device, and second single network slice selection assistance information (S-NSSAI) corresponding to the identifier of the session a second network slice of the source access network device and that serves the session, and the second S-NSSAI is determined based on the identifier of the session;
receive a handover command message from the core network device, wherein the handover command message is usable to indicate the terminal device is able to be handed over from the source access network device to the target access network device, S-NSSAI of a first network slice of the target access network device and that serves the session is first S-NSSAI, and the first S-NSSAI is determined based on the second S-NSSAI and the second network slice supported by the target access network device; and
sending, by the target access network device, an interface setup request message to the core network device, wherein the interface setup request message comprises:
the first S-NSSAI, or
a mapping relationship and S-NSSAI of the first network slice of the target access network device.

12. The handover apparatus of claim 11, wherein the handover requirement message further includes the second S-NSSAI.

13. The handover apparatus of claim 11, wherein the handover requirement message further includes first indication information, and the first indication information is useable to indicate a type of handover of the terminal device from the source access network device to the target access network device.

14. The handover apparatus of claim 11, wherein the source access network device is configured to support a non-standalone (NSA) non-public network (NPN), and the target access network device is configured to support a land public mobile network (PLMN); or
the target access network device is configured to support an NSA NPN, and the source access network device is configured to support a PLMN.

15. A handover method, comprising:
receiving, by a core network device, a handover requirement message from a source access network device, wherein the handover requirement message comprises an identifier of a session of a terminal device, and the session is to be handed over from the source access network device to a target access network device;
determining, by the core network device, the second single network slice selection assistance information (S-NSSAI) based on the identifier of the session;
sending, by the core network device, the second S-NSSAI to a network slice selection device;
receiving, by the core network device, the first S-NSSAI from the network slice selection device;
sending, by the core network device, a handover request message to the target access network device, wherein the handover request message comprises first S-NSSAI, and a first network slice of the target access network device and that corresponds to the first S-NSSAI serves the session;
sending, by the core network device, an interface setup response message to the target access network device; and
one of:
determining, by the core network device, the first S-NSSAI based on a preset policy, wherein the first network slice of the target access network device and that corresponds to the first S-NSSAI serves each session that is to be handed over from the source access network device to the target access network device; or
determining, by the core network device, a mapping relationship and S-NSSAI of the first network slice of the target access network device based on the preset policy, wherein the mapping relationship is a correspondence between S-NSSAI of the second network slice of the source access network device and the S-NSSAI of the first network slice of the target access network device,
wherein the first S-NSSAI is determined based on second S-NSSAI and the first network slice supported by the target access network device, and the second S-NSSAI is of a second network slice of the source access network device and that corresponds to the identifier of the session, and
wherein the interface setup request message comprises:
the first S-NSSAI, or
the mapping relationship and the S-NSSAI of the first network slice of the target access network device.

* * * * *